United States Patent
Wang et al.

(10) Patent No.: US 8,520,975 B2
(45) Date of Patent: Aug. 27, 2013

(54) METHODS AND APPARATUS FOR CHATTER REDUCTION IN VIDEO OBJECT SEGMENTATION USING OPTICAL FLOW ASSISTED GAUSSHOLDING

(75) Inventors: Jue Wang, Kenmore, WA (US); David P. Simons, Seattle, WA (US); Daniel M. Wilk, Seattle, WA (US); Xue Bai, Minneapolis, MN (US)

(73) Assignee: Adobe Systems Incorporated, San Jose, CA (US)

( * ) Notice: Subject to any disclaimer, the term of this patent is extended or adjusted under 35 U.S.C. 154(b) by 541 days.

(21) Appl. No.: 12/871,719

(22) Filed: Aug. 30, 2010

(65) Prior Publication Data
US 2013/0121577 A1  May 16, 2013

Related U.S. Application Data

(60) Provisional application No. 61/256,849, filed on Oct. 30, 2009.

(51) Int. Cl.
| | |
|---|---|
| G06K 9/34 | (2006.01) |
| G06K 9/00 | (2006.01) |
| G06K 9/62 | (2006.01) |
| G06K 9/20 | (2006.01) |
| G06K 9/36 | (2006.01) |
| H04N 1/387 | (2006.01) |
| H04N 5/225 | (2006.01) |
| H04N 7/12 | (2006.01) |
| H04N 11/02 | (2006.01) |
| H04N 11/04 | (2006.01) |
| H04B 1/66 | (2006.01) |
| G09G 5/00 | (2006.01) |

(52) U.S. Cl.
USPC ........... 382/283; 382/165; 382/173; 382/224; 375/240.15; 345/626; 358/453; 348/169

(58) Field of Classification Search
USPC ................. 382/100, 103, 115, 162, 164–165, 382/173, 181, 190, 195, 199, 224, 254, 256, 382/265–266, 276, 283, 305; 348/15–156, 348/169; 345/619–628; 375/240.01–240.16; 358/453
See application file for complete search history.

(56) References Cited

U.S. PATENT DOCUMENTS

| 5,875,040 A | 2/1999 | Matraszek et al. |
|---|---|---|
| 6,115,052 A | 9/2000 | Freeman |

(Continued)

FOREIGN PATENT DOCUMENTS

| CN | 101676953 | 3/2010 |
|---|---|---|
| CN | 1030572 | 8/2012 |

OTHER PUBLICATIONS

Chuang, Yung-Yu, et al. "Video matting of complex scenes." ACM Transactions on Graphics (TOG). vol. 21. No. 3. ACM, 2002.*

(Continued)

*Primary Examiner* — Randolph I Chu
*Assistant Examiner* — Nathan Bloom
(74) *Attorney, Agent, or Firm* — Wolfe-SBMC

(57) ABSTRACT

Systems, methods, and computer-readable storage media for chatter reduction in video object segmentation using optical flow assisted gaussholding. An optical flow assisted gaussholding method may be applied to segmentation masks generated for a video sequence. For each frame of at least some frames in a video sequence, for each of one or more other frames prior to and one or more other frames after the current frame, optical flow is computed for the other frame in relation to the current frame and used to warp the contour of the segmentation mask of the other frame to generate warped segmentation mask for the other frames. The weighted average of the warpedsegmentation masks and the segmentation mask of the current frame is then computed; this weighted average may be blurred spatially, for example using a Gaussian filter. The initial smoothed mask may be thresholded to produce a binary smoothed mask.

20 Claims, 38 Drawing Sheets

(56) References Cited

U.S. PATENT DOCUMENTS

| | | | |
|---|---|---|---|
| 6,724,915 B1 | 4/2004 | Toklu et al. | |
| 6,912,310 B1 | 6/2005 | Park et al. | |
| 6,917,692 B1 | 7/2005 | Murching et al. | |
| 7,142,600 B1 * | 11/2006 | Schonfeld et al. | 375/240.16 |
| 7,242,809 B2 | 7/2007 | Hunter et al. | |
| 7,349,922 B2 | 3/2008 | Brandt et al. | |
| 7,397,935 B2 | 7/2008 | Kimmel et al. | |
| 7,440,589 B2 | 10/2008 | Garoutte | |
| 7,965,875 B2 | 6/2011 | Ionita et al. | |
| 8,009,184 B2 | 8/2011 | Saquib | |
| 8,103,093 B2 * | 1/2012 | Blake et al. | 382/164 |
| 8,345,956 B2 * | 1/2013 | Ward et al. | 382/154 |
| 8,358,691 B1 * | 1/2013 | Wang et al. | 375/240.02 |
| 8,411,931 B2 * | 4/2013 | Zhou et al. | 382/154 |
| 8,422,775 B2 | 4/2013 | Wang | |
| 2007/0297651 A1 | 12/2007 | Schubert | |
| 2008/0131004 A1 | 6/2008 | Farmer et al. | |
| 2010/0046830 A1 | 2/2010 | Wang | |
| 2012/0213432 A1 | 8/2012 | Wang et al. | |

OTHER PUBLICATIONS

Sylvain Paris: Edge-Preserving Smoothing and Mean-Shift Segmentation of Video Streams. ECCV (2) 2008: 460-473.*

Bai, Xue, Jue Wang, and Guillermo Sapiro. "Dynamic color flow: a motion-adaptive color model for object segmentation in video." Computer Vision-ECCV 2010. Springer Berlin Heidelberg, 2010. 617-630.*

Price, Brian L., Bryan S. Morse, and Scott Cohen. "Livecut: Learning-based interactive video segmentation by evaluation of multiple propagated cues." Computer Vision, 2009 IEEE 12th International Conference on. IEEE, 2009.*

Bai, Xue, and Guillermo Sapiro. "A geodesic framework for fast interactive image and video segmentation and matting." Computer Vision, 2007. ICCV 2007. IEEE 11th International Conference on. IEEE, 2007.*

Huang, Yuchi, Qingshan Liu, and Dimitris Metaxas. "Video object segmentation by hypergraph cut." Computer Vision and Pattern Recognition, 2009. CVPR 2009. IEEE Conference on. IEEE, 2009.*

Yogesh Raja, et al., "Segmentation and Tracking Using Color Mixture Models," Lecture Notes in Computer Science; vol. 1351 archive, Proceedings of the Third Asian Conference on Computer Vision-vol. I—vol. I table of contents, pp. 607-614, Year of Publication: 1998.

Yogesh Raja, et al., "Tracking and Segmenting People in Varying Lighting Conditions using Colour," Proceedings of the 3rd. International Conference on Face & Gesture Recognition, p. 228, Year of Publication: 1998.

Stephen J. McKenna, et al., "Tracking colour objects using adaptive mixture models," Image and Vision Computing 17 (1999) 225-231.

Apostoloff, et al., "Automatic Video Segmentation Using Spatiotemporal T-junctions," 2006.

Porikli, et al., "Automatic Video Object Segmentation Using Volume Growing and Hierarchical Clustering," EURASIP Journal on Applied Signal Processing 2004:6, pp. 814, 832, 2004 Hindawi Publishing Corporation.

Zhong, et al., "Interactive Tracker-A Semi-Automatic Video Object Tracking and Segmentation System," Microsoft Research China, IEEE, 2001, 4 pages.

U.S. Appl. No. 12/275,096, filed Nov. 20, 2008.

U.S. Appl. No. 12/609,590, filed Oct. 30, 2009.

"Non-Final Office Action", U.S. Appl. No. 12/275,096, (Sep. 19, 2011), 5 pages.

"Non-Final Office Action", U.S. Appl. No. 13/448,162, (Sep. 26, 2012), 5 pages.

"Notice of Allowance", U.S. Appl. No. 12/275,096, (Jan. 5, 2012), 7 pages.

"Notice of Allowance", U.S. Appl. No. 12/871,724, (Sep. 14, 2012), 10 pages.

"Notice of Allowance", U.S. Appl. No. 13/448,162, (Jan. 18, 2013), 7 pages.

* cited by examiner

METHODS AND APPARATUS FOR CHATTER REDUCTION IN VIDEO OBJECT SEGMENTATION USING OPTICAL FLOW ASSISTED GAUSSHOLDING

PRIORITY INFORMATION

This application claims benefit of priority of U.S. Provisional Application Ser. No. 61/256,849 entitled "Methods and Apparatus for Chatter Reduction in Video Object Segmentation" filed Oct. 30, 2009, the content of which is incorporated by reference herein in its entirety.

BACKGROUND

Description of the Related Art

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, polygons, Bézier curves, and text characters) may be based upon mathematical equations to represent parts of digital images.

Digital image processing is the process of analyzing and/or modifying digital images using a computing device, e.g., a computer system. Using specialized software programs, digital images may be manipulated and transformed in a variety of ways.

There are many digital video applications that require segmentation of each video image or frame, e.g., into a foreground image or object/region of interest and a background. Prior art approaches to such segmentation involve manually segmenting each frame image using various image editing tools. However, such manual segmentation is time-consuming, tedious, and error prone. Furthermore, when a segmented sequence (a foreground object composited on clean backgrounds) is played at a normal speed, it may present temporal chattering, a visual artifact to which human eyes are sensitive.

SUMMARY

Various embodiments of systems, methods, and computer-readable storage media for chatter reduction in video object segmentation using optical flow assisted gaussholding are described. When a segmented sequence (a foreground object composited on clean backgrounds) is played at a normal speed, it may present temporal chattering, a visual artifact to which human eyes are sensitive. To reduce or eliminate this chatter, embodiments of an optical flow assisted gaussholding method may be applied to the segmentation masks generated for a video sequence in a post-processing step.

In general, gaussholding is a boundary-smoothing operation which uses a convolution followed by a threshold operation. In at least some embodiments, gaussholding may be applied across both time and space. This may be done by computing a (weighted) average of the segmentation masks for a sequence of frames including a current frame, and then applying a spatial Gaussian convolution kernel, followed by a thresholding operation, to generate a smoothed segmentation mask for the current frame. In the optical flow assisted gaussholding method, a video sequence comprising a plurality of frames and a plurality of segmentation masks each corresponding to one of the plurality of frames may be obtained. For each frame of at least some frames in the video sequence, for each of one or more other frames prior to and one or more other frames after the current frame, optical flow is computed for the other frame in relation to the current frame and used to warp the contour of the segmentation mask of the other frame. To warp the contour, for each point on the contour, the locally smoothed flow vector is found, and the contour point is moved to follow the motion vector. After the contours for the other frames are warped, the region enclosed by the warped contour are the warped segmentation masks for the other frames. The weighted average of the warped segmentation masks and the segmentation mask of the current frame is then computed. The weighted average may be blurred spatially. For example, a spatial Gaussian convolution kernel or other spatial convolution technique may be applied to the weighted average to generate a smoothed mask for the current frame. In at least some embodiments, the initial smoothed mask may be thresholded to produce a binary smoothed mask (i.e., a mask where background pixels are 0 and foreground pixels are 255, assuming an 8-bit alpha channel.)

In some embodiments, the plurality of segmentation masks may have been generated according to a variable bandwidth search region method. In at least some embodiments, the variable bandwidth search region generation method may be applied to a uniform search region to generate a variable bandwidth search region that reduces the search range for segmentation methods such as a graph cut method. The method may identify parts of the contour that are moving slowly, and reduce the search region bandwidth in those places to stabilize the segmentation. This method may determine a bandwidth for each of a plurality of local windows of an image according to an estimate of how much an object in the image has moved from a previous image. The method may blend the bandwidths for the plurality of local windows to generate a blended map. The method may then generate a variable bandwidth search region for an object according to the blended map.

Embodiments of the methods for chatter reduction in video object segmentation may, for example, be applied in at least some embodiments of a method for automatically determining segmentation in a digital video image sequence described herein. However, it is to be noted that embodiments of the methods for chatter reduction in video object segmentation as described herein are not limited to such an application.

Figure 1:
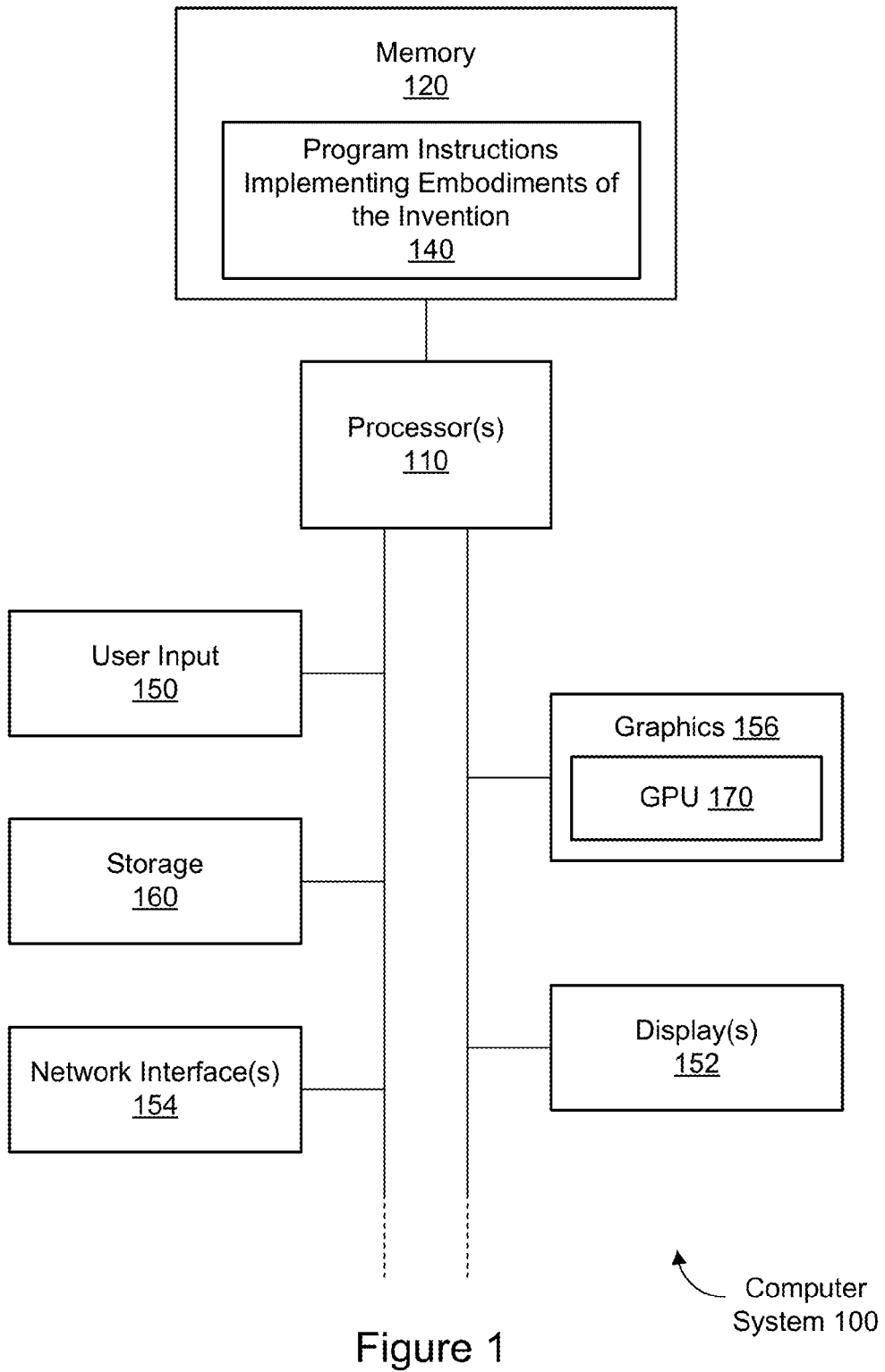
FIG. 1 is a block diagram of an example system configured to implement embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Automatic Video Image Segmentation

Various embodiments of systems, methods, and computer-readable storage media for performing automatic segmentation of images in a video sequence are presented.

Embodiments of the systems and methods described herein may be used to automatically perform video image segmentation, e.g., of a region or object of interest, e.g., a foreground object, in a digital video sequence. More specifically, embodiments of the systems and methods disclosed herein may be used to analyze sequential digital video images or frames, and to propagate an initial image segmentation of a frame to one or more subsequent frames, e.g., to automatically generate a sequence of foreground masks for corresponding video frames in a video sequence, based on an initial pre-existing segmentation or mask for an initial or key frame in the sequence. Examples of applications for such masks include, but are not limited to, special effects in digital films, e.g., removing or replacing backgrounds, applying effects to different image layers, and so forth, as well as image decomposition and analysis, e.g., for scientific or security applications, e.g., monitoring, surveillance, face recognition, etc.

FIG. 1 is a block diagram illustrating constituent elements of a computer system 100 that is configured to implement embodiments of the systems and methods described herein. The computer system 100 may include one or more processors 110 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 100, such as various versions of Unix, Linux, Windows® from Microsoft Corporation, MacOS® from Apple Inc., or any other operating system that enables the operation of software on a hardware platform. The processor(s) 110 may be coupled to one or more of the other illustrated components, such as a memory 120, by at least one communications bus.

In one embodiment, a specialized graphics card or other graphics component 156 may be coupled to the processor(s) 110. The graphics component 156 may include a graphics processing unit (GPU) 170, which in some embodiments may be used to perform at least a portion of the techniques described below. Additionally, the computer system 100 may include one or more imaging devices 152. The one or more imaging devices 152 may include various types of raster-based imaging devices such as monitors and printers. In one embodiment, one or more display devices 152 may be coupled to the graphics component 156 for display of data provided by the graphics component 156.

In one embodiment, program instructions 140 that may be executable by the processor(s) 110 to implement aspects of the techniques described herein may be partly or fully resident within the memory 120 at the computer system 100 at any point in time. The memory 120 may be implemented using any appropriate medium such as any of various types of ROM or RAM (e.g., DRAM, SDRAM, RDRAM, SRAM, etc.), or combinations thereof. The program instructions may also be stored on a storage device 160 accessible from the processor(s) 110. Any of a variety of storage devices 160 may be used to store the program instructions 140 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 160 may be coupled to the processor(s) 110 through one or more storage or I/O interfaces. In some embodiments, the program instructions 140 may be provided to the computer system 100 via any suitable computer-readable storage medium including the memory 120 and storage devices 160 described above.

The computer system 100 may also include one or more additional I/O interfaces, such as interfaces for one or more user input devices 150. In addition, the computer system 100 may include one or more network interfaces 154 providing access to a network. It should be noted that one or more components of the computer system 100 may be located remotely and accessed via the network. The program instructions may be implemented in various embodiments using any desired programming language, scripting language, or combination of programming languages and/or scripting languages, e.g., C, C++, C#, Java™, Perl, etc. The computer system 100 may also include numerous elements not shown in FIG. 1, as illustrated by the ellipsis.

Figure 2:
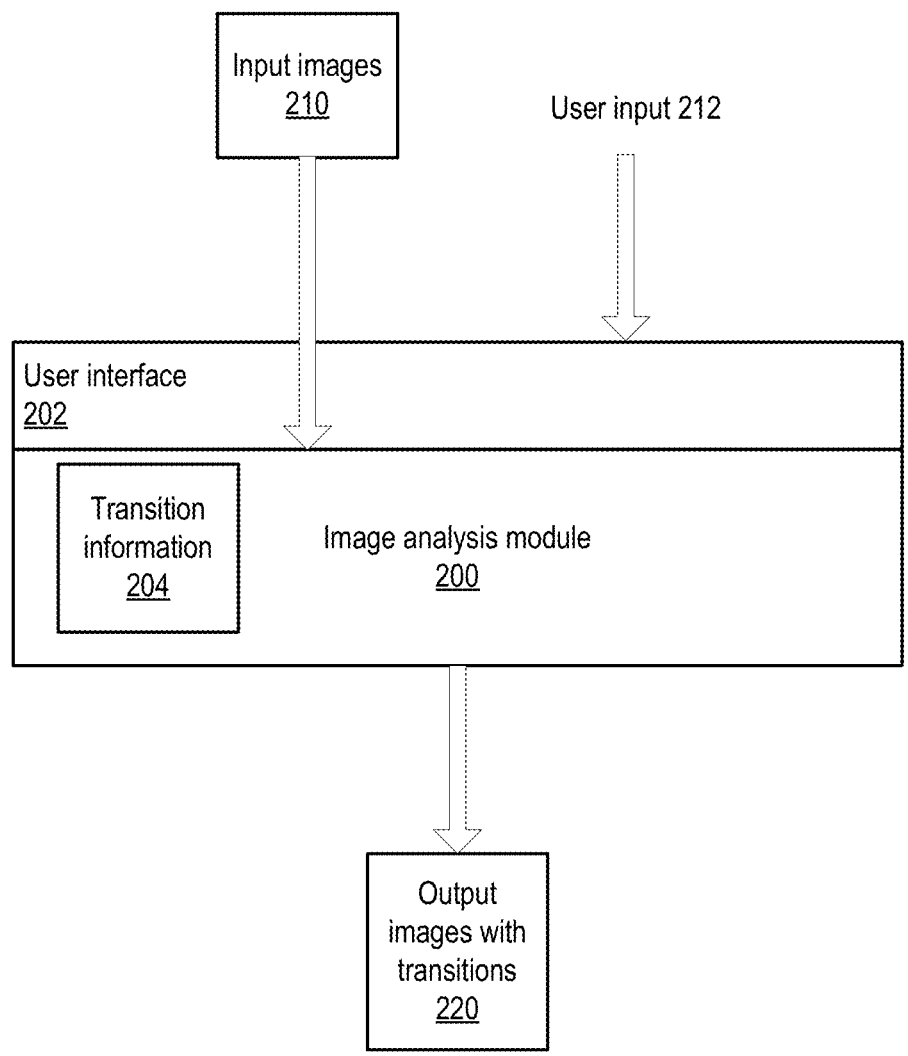
FIG. 2 illustrates an example video image processing module, according to one embodiment.

FIG. 2 illustrates an example image analysis module that may implement embodiments of a method for automatically propagating video image segmentation, for example as described below with reference to FIG. 6. In one embodiment, module 200 may provide a user interface 202 that includes one or more user interface elements via which a user may initiate, interact with, direct, and/or control the method performed by module 200. Module 200 may obtain a set of digital video images 210 and, optionally, user input 212, analyze an initially segmented image or frame and one or more subsequent frames, and propagate the initial image segmentation to the subsequent one or more frames. Segmentation information 204, e.g., information specifying or facilitating segmentation, and may be used to perform the image analysis or processing.

Image analysis module 200 may be implemented as or in a stand-alone application or as a module of or plug-in for a video processing and/or presentation application. Examples of types of applications in which embodiments of module 200 may be implemented may include, but are not limited to, video editing, processing, and/or presentation applications, as well as applications in security or defense, educational, scientific, medical, publishing, digital photography, digital films, games, animation, marketing, and/or other applications in which digital video image editing or presentation may be performed, e.g., where operations are to be directed to different layers of images. Specific examples of applications in which embodiments may be implemented include, but are not limited to, Adobe® After Effects®, Adobe® Photoshop® and Adobe® Illustrator®. "Adobe", "After Effects", "Photoshop", and "Illustrator" are either registered trademarks or trademarks of Adobe Systems Incorporated in the United States and/or other countries. In addition to generating output images 220, module 200 may be used to display, manipulate, modify, and/or store the output images, for example to a memory medium such as a storage device or storage medium.

Overview

One embodiment disclosed herein provides a robust interactive system and method for video object segmentation. Based on pre-existing segmentation information for a previous (or any other) frame in a video sequence, e.g., provided by a user, e.g., via manual segmentation of the previous frame, the segmentation may be propagated to future or subsequent frames in the video sequence. As will be explained below in more detail, in some embodiments, a sliding window approach may be employed, where each window comprises or is associated with a local classifier that integrates color and shape information from the previous frame, e.g., a color model and a shape prediction, referred to as "priors", to classify pixels covered by the classifier as foreground or background pixels. These two priors may be combined with adaptive weights related to the discriminativity of the color model. Classification results from individual local classifiers may then be combined to form an accurate feature map, and a binary segmentation of the image performed based on the feature map. This process may iterate until the segmentation contour converges. Note that in some embodiments, the iterations for each window may be terminated as each window converges.

Figure 3:
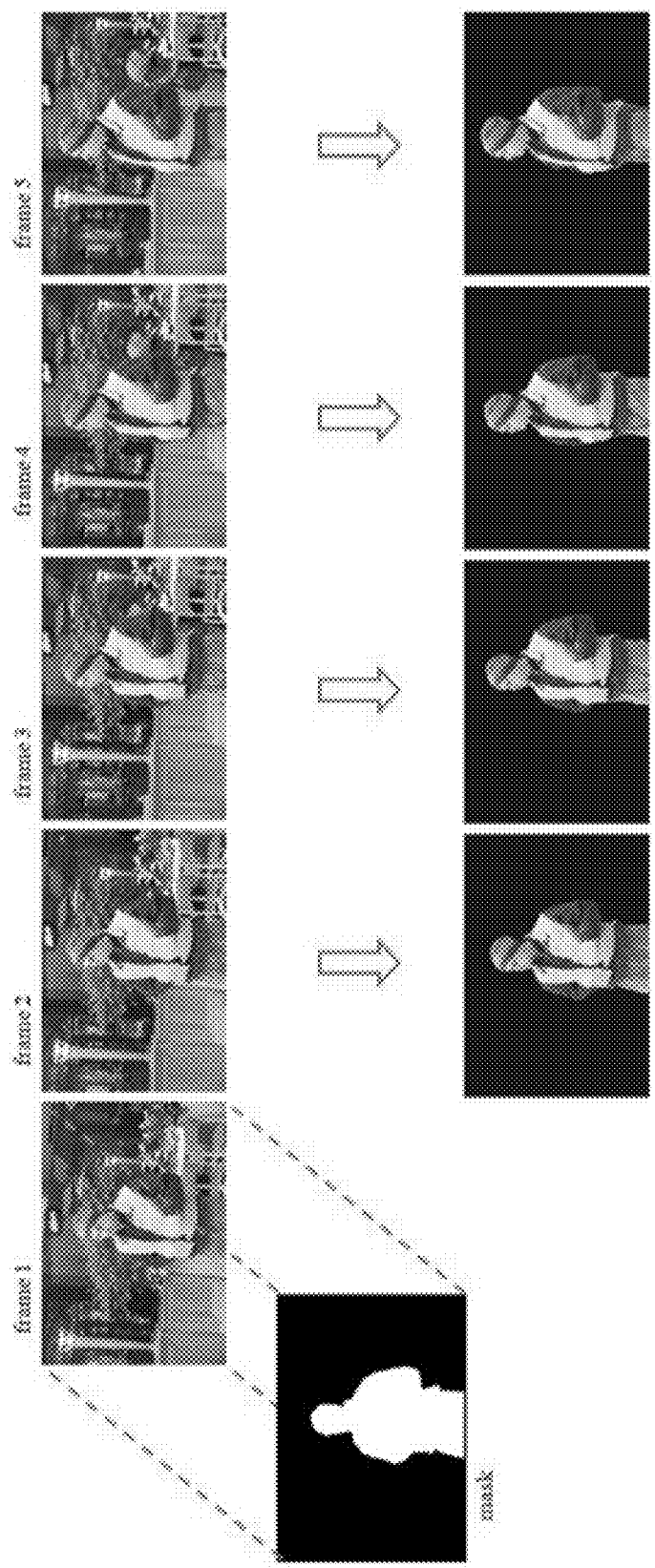
FIG. 3 illustrates an example video sequence with segmentation/masking, according to one embodiment.

FIG. 3 illustrates an example video sequence, specifically, frames 1 through 5, where a segmentation has been performed, e.g., manually, on the first image (frame 1) of the sequence, as illustrated by the binary mask associated with the first image, where the white region of the mask corresponds to the foreground and the black region corresponds to the background. Below frames 2 through 5 are shown corresponding video images where respective masks have been applied to each image to remove all background image information, leaving only the foreground object of each image. In embodiments described herein, the segmentation of each image (into foreground and background portions) upon which such masking is based may be determined automatically from previous segmentation information, e.g., from the segmentation of frame 1.

Figure 4:
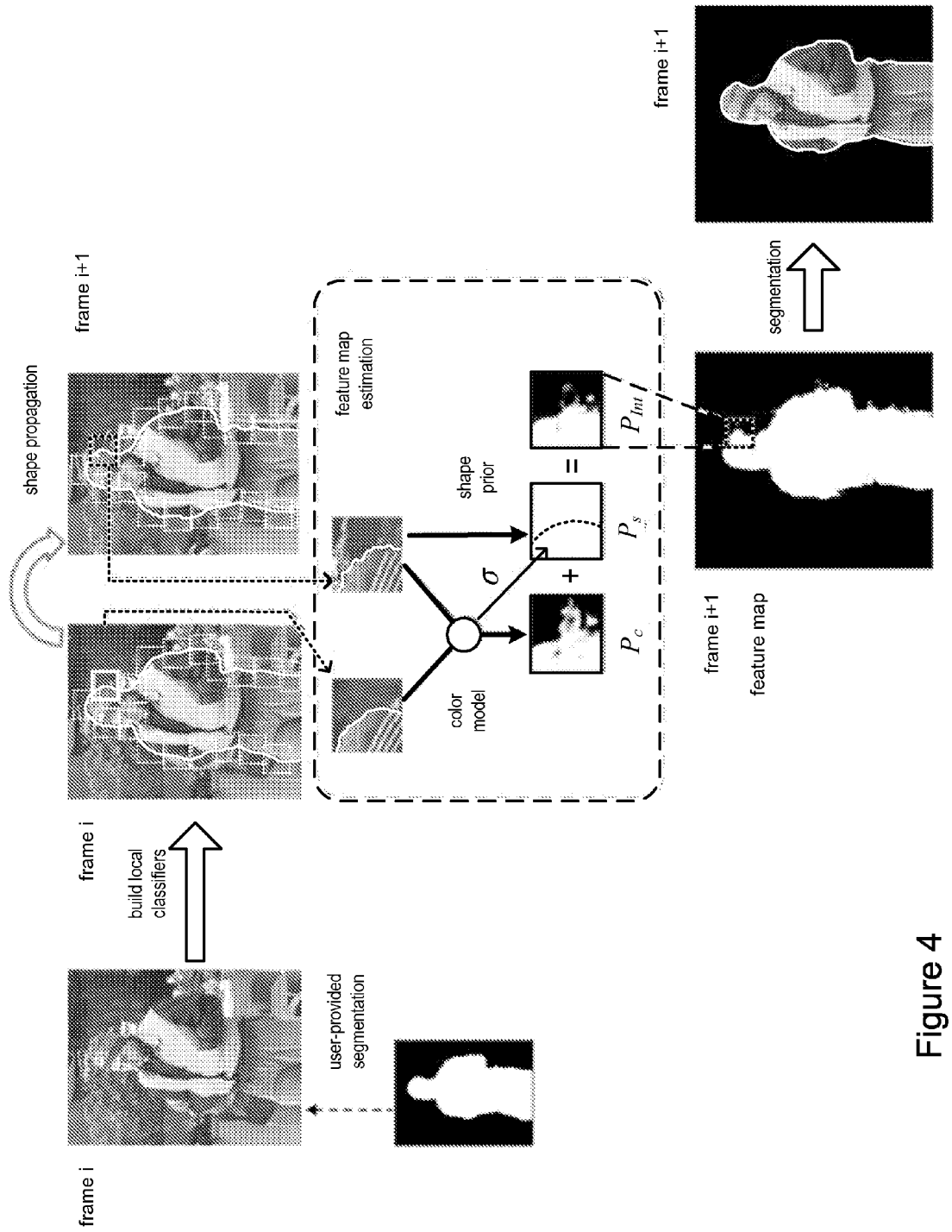
FIG. 4 is a high level diagram of an example single frame propagation approach to automatic image segmentation, according to one embodiment.

In one set of embodiments, referred to as one-frame-propagation model embodiments, each frame's segmentation contour, i.e., the boundary between the background and the foreground, may determined based on that of the previous frame. FIG. 4 is a high level diagram of an example single frame propagation technique illustrating key concepts, according to one embodiment. As may be seen, in this approach a user-provided segmentation of a first frame (frame i), e.g., a segmentation contour of the image, may be used to determine a segmentation shape prediction (referred to in FIG. 4 as a shape "prior") for a current image (frame i+1) via a plurality of local classifiers, represented in FIG. 4 by dotted line boxes or windows along the segmentation contours of frames i and i+1. These classifiers or windows may be used to characterize the images' color and shape attributes in local regions, specifically along the contour, which may then be used to generate multiple local feature maps that together compose a feature map of the image, also referred to as a probability map (with respect to foreground and background pixel classification), from which may be determined the contour (segmentation) of the current image or frame, as will be described in more detail below.

Figure 5:
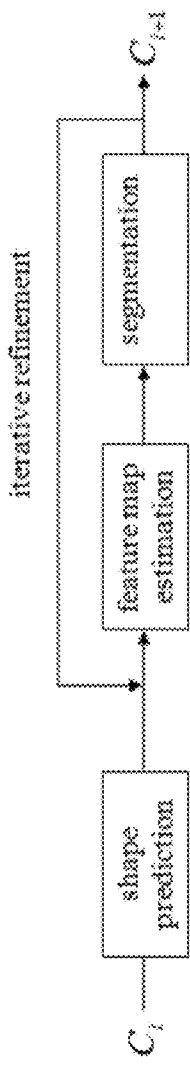
FIG. 5 illustrates an iterative aspect of the single frame propagation approach of FIG. 4, according to one embodiment.

In one embodiment, this single-frame approach may include an iterative component, as indicated in FIG. 5, where, from a contour of a frame i, denoted as $C_i$, a shape prediction is generated and used to create a feature map estimation, which in turn is used to compute a segmentation (contour) of the current frame i+1. Note that in the embodiment of FIG. 5, the feature map estimation and segmentation (computation of contour) may be iterated to refine the computed contour. For example, the computed contour from one iteration may be used to generate a refined feature map estimation, which may then be used to determine a refined segmentation or contour. This iteration may be repeated until some convergence condition is met, e.g., until the differences between successive computed contours is below some specified threshold.

Described in a slightly different manner, the single-frame-propagation model, which may be considered to be the fundamental building block of the system, transfers or transforms an object contour $C_i$ in frame i to an object contour $C_{i+i}$ in frame i+1. The basic idea is to perform a rough shape prediction to generate a predicted contour, and then refine the contour around the predicted shape. The process may involve several separate steps. For example, in one embodiment, the initial contour $C_i$ may be transformed by SIFT key point matching and optical flow. A set of local classifiers may be built or constructed along the contour to separate foreground/background pixels, where the classifiers integrate both color and shape information, e.g., of the local region of the classifier, to characterize or specify the contour in that region. The local classification results may then be combined to generate an accurate feature map of the object in frame i+1, which may be followed by a binary segmentation. This estimation-segmentation step may be repeated several times until $C_{i+1}$ converges.

In another set of embodiments, referred to as multi-frame-propagation model embodiments, segmentation information from one frame, e.g., an initial frame such as frame 1, may be used to determine segmentation for multiple subsequent frames. For example, various techniques may be used to robustly track the windows/classifiers as they are propagated through successive frames. An example embodiment of such a multi-frame propagation model is illustrated in FIG. 6, where, as may be seen, a segmentation of frame 1 (or i), represented by the mask of frame 1 in the figure, may be used to propagate a segmentation contour from frame 1 to a subsequent frame 2 (or i+1), similar to the single-frame approach described above with respect to FIG. 4, possibly including an iterative process as indicated by the "iterate" denotations above frames 2 and 3, and as described above with reference to FIG. 5. As FIG. 6 indicates, in this embodiment, once the segmentation of frame 2 (i+1) is determined, this segmentation information may be used to determine the segmentation (contour) of the subsequent frame, e.g., frame 3 (i+2), and so on. Note, however, that in some embodiments, along with the segmentation information from the previous frame, information from the initial frame may also be used, e.g., a color map or other segmentation-related information, as will be discussed in more detail below.

Figure 7:
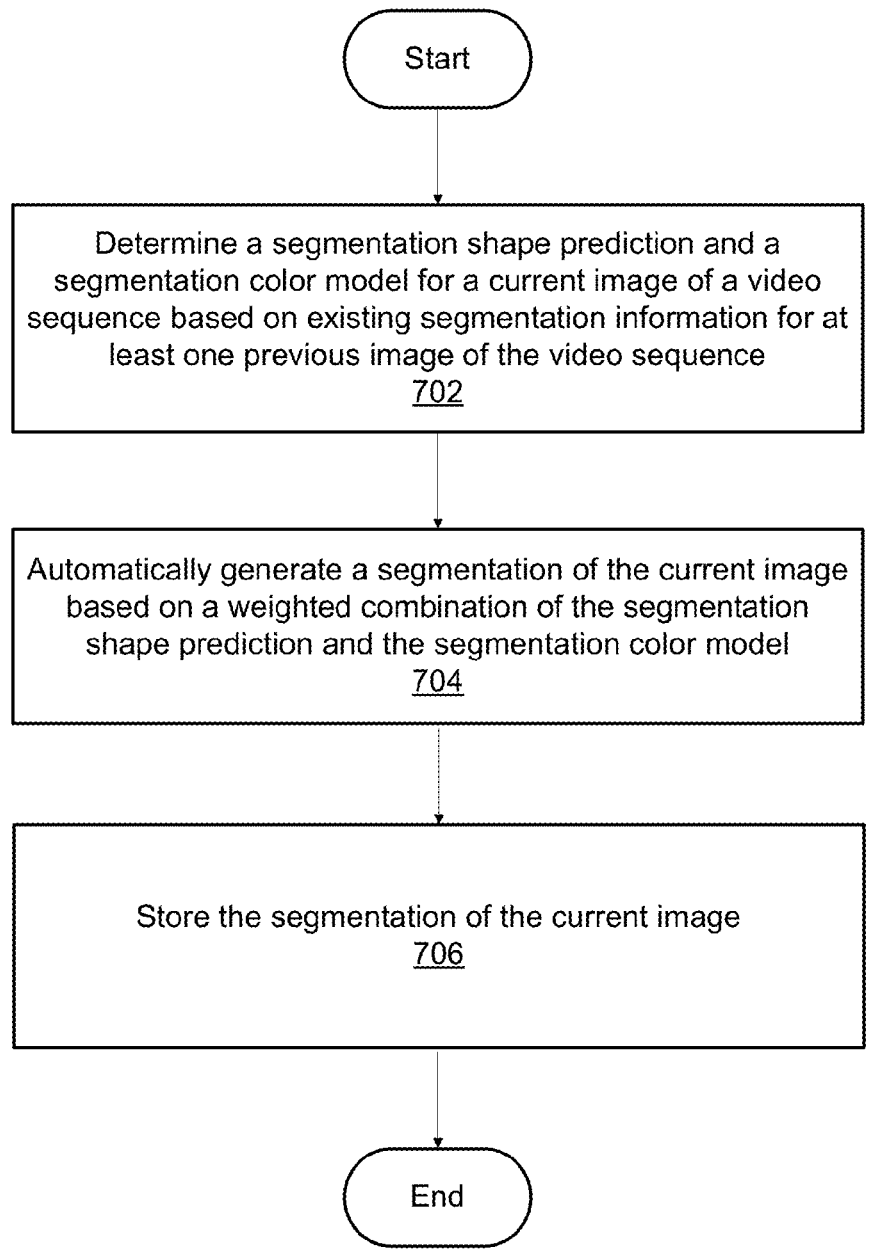
FIG. 7 is a flowchart illustrating a method for performing automatic segmentation of images in a video sequence, according to one embodiment.

FIG. 7—Flowchart of a Method for Performing Automatic Image Segmentation in a Video Sequence FIG. 7 is a flowchart illustrating a method for automatically determining segmentation in a digital video sequence. The method shown in FIG. 7 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 702, a segmentation shape prediction and a segmentation color model for a current image (e.g., a first image) of a video sequence may be determined based on existing segmentation information for at least one previous image of the video sequence. For example, in one embodiment, a user may manually segment the current image into a foreground and a background, storing the segmentation information for this current image, including a segmentation contour that divides the background from foreground, e.g., a foreground object, in the image.

The determination of the shaped prediction and color model may be performed via any of a variety of techniques, as desired. For example, regarding shape prediction, in one embodiment, scale invariant feature transform (SIFT) techniques may be employed to generate an estimate or rough version of the segmentation contour for the current image based on the at least one previous image of the sequence, i.e., based on the pre-existing segmentation contour. SIFT key points are reliable features for consecutive frames in videos. By matching the SIFT key points of the previous image/frame with corresponding key points in the current image/frame, one can determine a good initial guess of the contour in the current (or new) frame. Thus, more specifically, the method may search in the current frame for a best match for each (SIFT) key point inside the foreground object of the previous frame. From the point correspondence, an affine transform (e.g., specifying translation, rotation, shearing, and possibly scaling) may be determined that transforms $\{x_j\}$ to $\{y_j\}$ (j=1, 2, ... n), e.g., in a least squares estimate sense.

Figure 8:
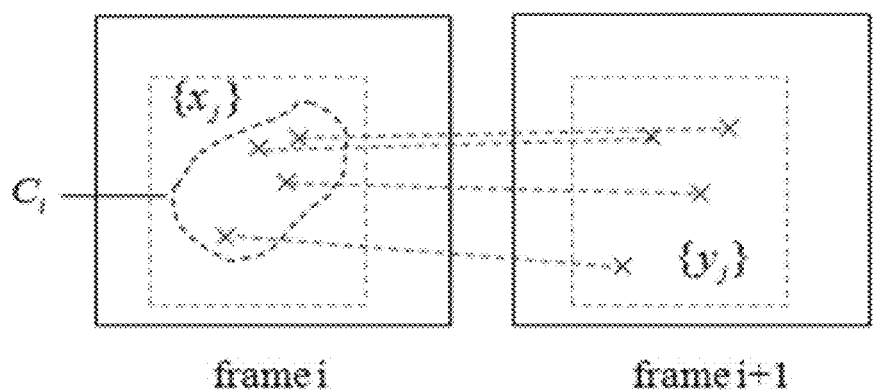
FIGS. 8 and 9 illustrate scale invariant feature transform (SIFT) of key points in consecutive video frames, according to one embodiment.

FIG. 8 shows an example of matched key points (i.e., feature points) in consecutive video frames. As shown, each key point x in frame i corresponds to a key point in frame i+1. When determining these key points, in some embodiments, for efficiency and robustness, the search range may be limited to a region enclosing the contour, e.g., a rectangle slightly larger than the bounding box of the contour, as indicated by the dashed box surrounding the object bounded by the contour $C_i$. Moreover, in some embodiments, outliers may be omitted when fitting these points.

Figure 6:
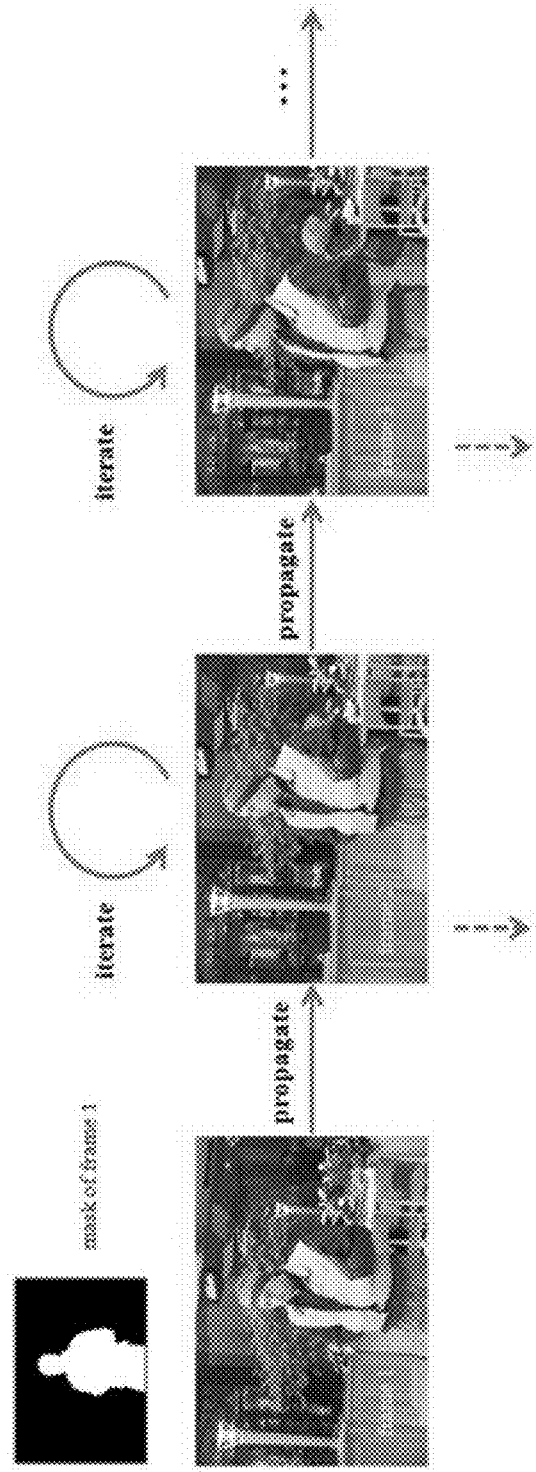
FIG. 6 is a high level diagram of an example multi-frame propagation approach to automatic image segmentation, according to one embodiment.
Figure 6:
Figure 9:
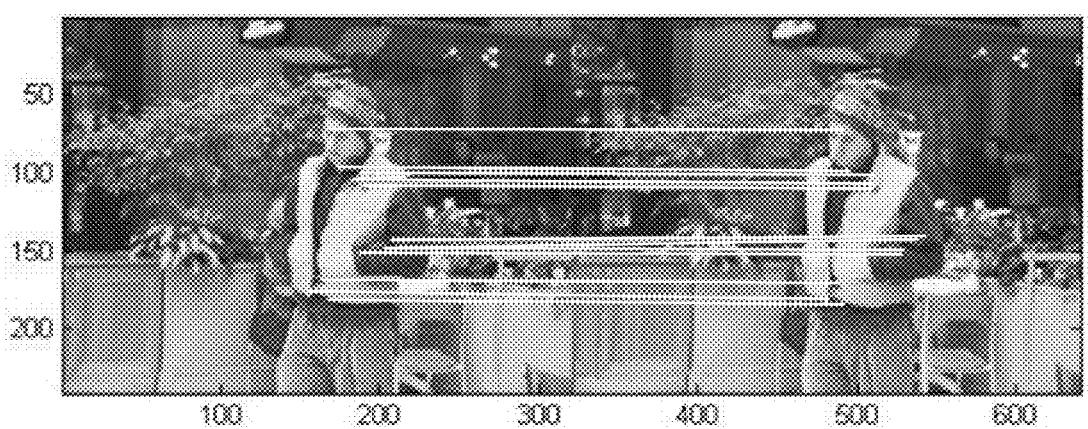

FIG. 9 illustrates such key points and their matches or correspondences in two consecutive frames of the example video sequence introduced in FIG. 3 (and also used in FIGS. 4 and 6). Note that because the image changes between two consecutive frames are small, detecting and correlating the key points will generally be straightforward and quite reliable. Thus, the affine transform determined based on these points may provide ready means for generating a rough estimate of the initial contour, e.g., by propagating the contour via the transform to the next frame.

Thus, once the affine transform has been determined based on the matching key points in the two frames, the initial contour may be transformed to generate a rough estimate or predicted shape of the contour for the subsequent frame. As mentioned above, in some embodiments, a plurality of local classifiers may be constructed along the contour and used to perform operations with respect to the contour. For example, in some embodiments, a sliding window approach may be employed, where each classifier, whose center point lies on the contour, defines and operates on a local region around a respective contour point (the classifier's center), integrating color and shape information from the previous frame, e.g., a color model and a shape prediction, and determining the predicted contour accordingly. In one embodiment, the classifiers, represented in FIG. 4 as small rectangles along the segmentation contour of frames i and i+1, may be defined such that every point in the contour is covered by (e.g., contained by) at least two classifiers. Thus, each classifier box or window preferably overlaps at least two other classifiers. In other words, the respective region of each local classifier of the plurality of local classifiers overlaps the respective regions of at least two other local classifiers of the plurality of local classifiers Thus, the shape alignment process may operate to roughly align the classifier windows with the foreground object in frame i+1.

Note that in prior art approaches, color models are generally constructed for the entire foreground object and the background, which may be of limited relevance to specific local regions of the foreground and background. As described above, in some embodiments, determining the segmentation shape prediction and the segmentation color model may include constructing a plurality of local classifiers for the at least one previous image, where each local classifier includes a respective region of the at least one previous image that contains a respective portion of a shape contour of the at least one previous image, and where the plurality of local classifiers cover the shape contour of the at least one previous image. Then, for each local classifier of the plurality of classifiers, a local segmentation shape prediction for the current image may be generated based on the respective portion of the shape contour of the at least one previous image contained in the local classifier.

More specifically, in some embodiments, generating a local segmentation shape prediction based on the respective portion of the shape contour may include generating an initial local segmentation shape prediction via scale invariant feature transform (SIFT) applied to a plurality of key points in the respective region, and generating the local segmentation shape prediction by refining the estimate of the initial local segmentation shape prediction using optical flow applied to points along the respective portion of the shape contour. In one embodiment, generating the local segmentation shape prediction by refining the estimate of the initial local segmentation shape prediction using optical flow applied to points along the respective portion of the shape contour may include determining a local average flow vector based on optical flow of foreground pixels in the respective region, and applying the local average flow vector to the points along the respective portion of the shape contour to generate the local segmentation shape prediction.

Finally, a local segmentation color model may be generated based at least on color information for the respective region of the at least one previous image included in the local classifier. Thus, the use of local classifiers to characterize and operate on local regions of the image may significantly enhance the accuracy and results of segmentation, particularly regarding images with complex foreground objects and/or backgrounds.

Figure 10:
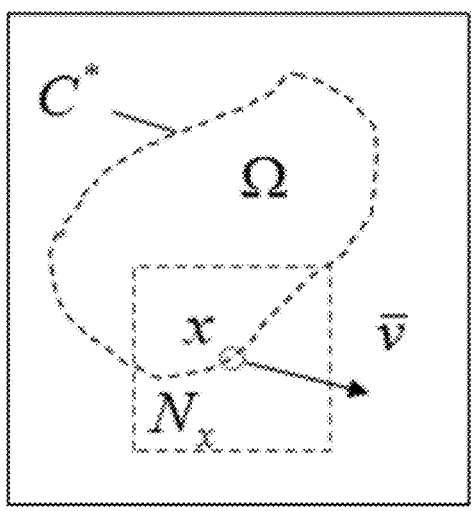
FIG. 10 illustrates optical flow of a contour point in a video frame, according to one embodiment.

While applying the transform to each point on the contour (or some specified subset of such points, such as equally spaced sample points along the contour) will generate a rough estimate of the contour that approximately aligns the contour to the image of the subsequent frame, this transformation generally captures the object's principle rigid motion between the two frames, and thus may generally omit motion effects specific to local motion of parts of the object. To determine a better prediction of the contour, optical flow of contour pixels between the transformed frame and the next frame may be computed. However, due to the unreliability of optical flow on the boundary, e.g., where occlusion occurs, directly adding the flow vector to the contour points, i.e., at the pixel level, may produce erratic results. Thus, in on embodiment, rather than computing the optical flow based on the contour points themselves (using the center point per classifier), a local average flow inside the contour may be used. For example, turning now to FIG. 10, let x be a point on the transformed contour $C^*$. $\Omega$ is the inside region of $C^*$, and $N_x$ is a local classifier or window centered at x. Now, point x is moved by the average flow vector $\bar{v}$ in region $\Omega \forall N_x$, i.e. $x'=x+\bar{v}$. In other words, the flow vector applied to x is the average of the flow vectors of all points that are in both the inner region $\Omega$ and the classifier window, i.e., that are in the intersection of these two point sets. This regional or local average optical flow is much more robust than that generated from single points, primarily due to the fact that the object's motion is generally locally smooth. By incorporating local averaged optical flow into the process, a more accurate and robust estimated contour may be generated.

Figure 11:
FIG. 11 illustrates prediction of a segmentation contour in successive video frames, according to one embodiment.

Thus, from these two steps (transformation/alignment plus average optical flow), one may generate a prediction of the contour, or, more accurately, a plurality of predicted or estimated contour portions or segments, each covered by and associated with a respective classifier. This predicted or estimated contour may then be used as a shape prior (shape prediction) and may specify positions of the local classifiers. FIG. 11 illustrates a first frame (labeled frame 1) with user provided segmentation indicated by a white contour line around the foreground object, and a second frame (labeled frame 2) with the contour after alignment and optical flow. Note that the contour in frame 2, which corresponds to frame i+1 of FIG. 4, is very similar to the original contour (of frame 1), but is still not perfect, being an estimate or prediction. However, this contour, specifically, the contour segments composing the contour, may be used by the classifiers in determining an even better contour, as will now be described.

Building Local Classifiers

Figure 12:
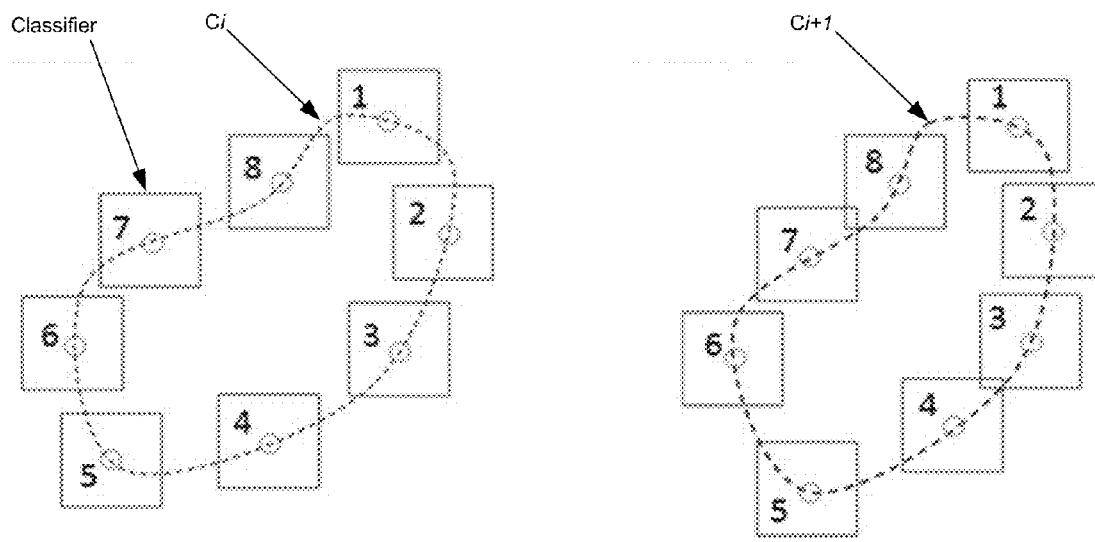
FIG. 12 illustrates local classifiers in successive video frames, according to one embodiment.

As noted above, in some embodiments, local classifiers may comprise a set of sliding windows along the contour. In one example embodiment, the typical size of a classifier box or window may vary from 50×50 to 70×70 pixels in size, although any other sizes may be used as desired. In one embodiment, the centers of these windows may be equally spaced along the contour $C_i$, as shown in FIG. 12 (note that for illustration only a few non-overlapping windows are shown). As also noted above, the number of windows may be set such that each point near the contour is covered by at least two windows. As described above, the centers of these overlapping windows may be transformed and (average optically) flowed into the next frame together with the contour. In other words, each of the classifiers, along with their respective contour segments or portions, may be propagated from frame 1 to frame 2 via shape alignment and local average optical flow, thus resulting in two sets of sliding windows or classifiers with one-to-one correspondence, denoted as $\{W_k^i\},\{W_k^{i+1}\}$, k=1, 2, ... N. In the below description, pairs of these two sets of classifiers may referred to as first and second classifiers for convenience. Said another way, a plurality of local classifiers for the current image corresponding to the plurality of local classifiers for the at least one previous image may be generated by applying the average flow vector to the plurality of local classifiers for the at least one previous image, wherein each local classifier for the current image comprises a respective region of the current image that contains a respective portion of a shape contour of the current image, and wherein the plurality of local classifiers of the current image cover the shape contour of the current image.

Per FIG. 12, given the labeled pixels in $W_k^i$ (first classifier), the pixels in $W_k^{i+1}$ (second classifier) may be classified as foreground or background pixels based on their strong temporal correlation in color and shape. In other words, for each classifier, given the strong correlation between the shape and color of frame i and frame i+1, the classification of pixels of frame i (as foreground or background) may be used to classify those of frame i+1.

Figure 13:
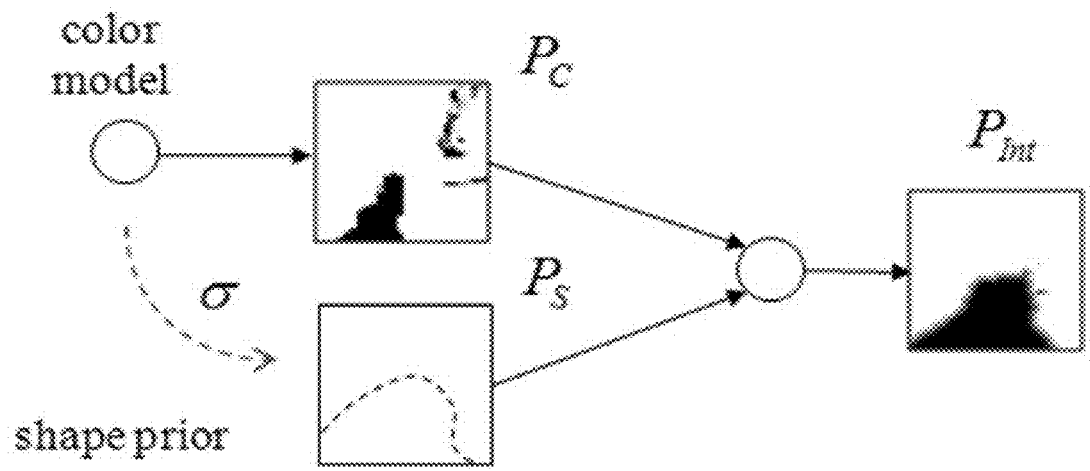
FIG. 13 illustrates local color and shape integration with adaptive weights, according to one embodiment.

FIG. 13 illustrates color and shape integration with adaptive weights, according to one embodiment. In this example embodiment, a color model and predicted shape (shape prior) for a particular local classifier are combined based on confidence levels pertaining to their respective background or foreground characterizations to generate a resultant feature map for the local region of the classifier. For example, as FIG. 13 indicates, based on a measure of the discriminativity of the color model for the classifier, denoted by σ, the contributions of the shape prior and the color model, denoted by $P_c$ (foreground probability based on the color model) and $P_s$ (foreground probability based on the shape prior) may be weighted and summed to generate an integrated probability (feature) map denoting foreground and background likelihoods for the pixels of the classifier. Said another way, the color and shape clues may be fused with adaptive weights depending on the discriminativity of the color model. The practical rule embodied in this process may be stated thusly: when colors are separable, trust colors; otherwise trust the shape. In other words, if the color model for the classifier makes a clear distinction between foreground colors and background colors, rely on the color model to classify the pixels of the region, and if the color model does not make a clear distinction, rely more on the shape prior to classify the pixels. In some embodiments, this approach may be considered to be a type of fuzzy logic pixel classification scheme, where color models and predicted shapes are used as appropriate to classify pixels as foreground or background pixels. More details regarding this process are provided below.

Determining the Color Model

One approach to calculating the foreground probabilities for the pixels in a propagated classifier $W_k^{i+1}$ is via a Gaussian Mixture Model (GMM). In this approach, all the pixels in the local region or window of the second classifier are sampled except for a narrow band around the contour, which in some embodiments may be defined by ($|d_x|<\Delta$), where $\Delta$ is the width of an uncertainty band in the first classifier, and where $d_x$ is the maximum distance of a pixel x from the contour in the classifier. In other words, pixels near the estimated contour are more difficult to classify as foreground or background pixels because the estimated or predicted contour almost certainly has come error, and so pixels near the estimated contour on the FG side may actually be on the BG side of the actual (unknown) boundary, and vice versa.

Figure 14:
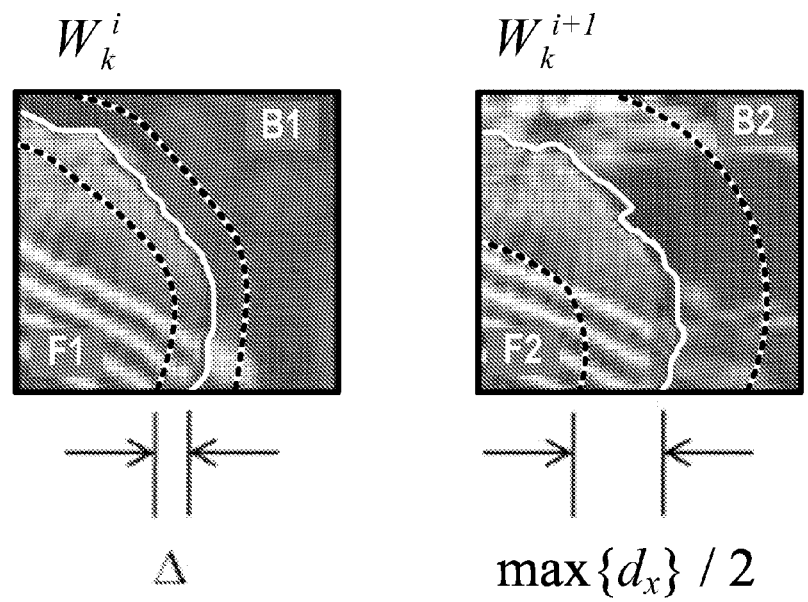
FIG. 14 illustrates candidate local color models, according to one embodiment.

FIG. 14 illustrates regions for correlated classifiers, e.g., first and second classifiers, $W_k^i$, and $W_k^{i+1}$, where each region is divided into respective foreground and background subregions. More specifically, the first classifier is divided into a foreground F1 and a background B1, and the second classifier is divided into a foreground F2 and a background B2, as shown. The sampled pixels from the first classifier may be denoted by $\{F_1; B_1\}$. In some embodiments, to make a richer color model, colors in the second classifier may also be sampled. Note that because the predicted contour is not always accurate, the uncertainty band in the second classifier is wider than that of the first classifier, and thus the sampled pixels, denoted by $\{F_2; B_2\}$, are further from the contour, where their FG/BG status is more reliable. More specifically, $$F_2 = \{x | d_x > \max\{d_x\}/2\}$$

and $$B_2 = \{x | d_x < \min\{d_x\}/2\}$$

where $d_x$ is the signed distance transform from the contour, with foreground being the positive side. Note that the particular criteria for the sampled pixels and uncertainty bands presented herein are meant to be as example only, and that other values, constants, and relationships may be used as desired.

In the case of very large inter-frame motion, the tentative sampling in $W_k^{i+1}$ may be inaccurate. For example, the pixels demarcated as $\{F_2, B_2\}$ may both be on the foreground or the background side of the region, i.e., the contour prediction the pixels are segregated by may be so inaccurate that the actual contour is not even in the region, in which case the $\{F_2, B_2\}$ pixels should not be used. Thus, criteria may be set or specified to determine whether or not to include $\{F_2, B_2\}$ in the determination of the color model. Two candidate color models may be built:

Simple model: $\{F_1, B_1\}$
Mixture model: $\{F_1, B_1; F_2, B_2\}$.

Assuming the foreground does not considerably change (foreground bias), one may expect that adding $\{F_2; B_2\}$ will reduce the misclassification in $W_k^{i+1}$ (e.g., background pixels classified as foreground or vice versa). This can be verified simply by counting the number of pixels whose probabilities are larger than 0.5. for each model, and the model that results in a smaller number adopted for use.

In one embodiment, 6-components (e.g., 3 for foreground colors and 3 for background colors) may be used to train the GMM. The final foreground probabilities may be normalized via a log scale, i.e.:

$$P_C(x) = \frac{\log P_B(x)}{\log P_F(x) + \log P_B(x)}, x \in W_k^{i+1}.$$

Figure 15:
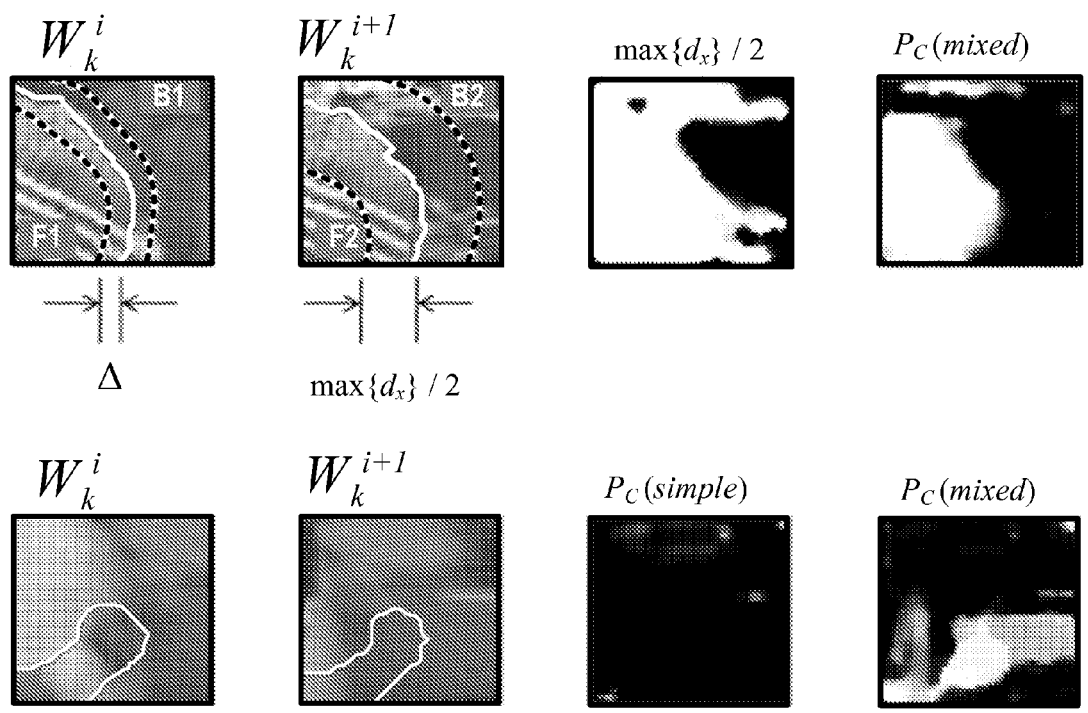
FIG. 15 illustrates use and results of the two candidate color models of FIG. 14, according to one embodiment.

FIG. 15 illustrates example differences resulting from the use of the two candidate color models, e.g., the mixed color model, based on pixels from both classifiers $\{F_1, B_1; F_2, B_2\}$, and the simple color model, based only on pixels from the first classifiers $\{F_1, B_1\}$. In the upper row, the classifier regions of FIG. 14 are used, where as may be seen, the probability map generated by the mixed model is significantly less ambiguous than that generated by the simple model, i.e., the foreground and background are more clearly separated, and also correspond more closely to the second image. Thus, in this case, the mixed color model should be used. In the bottom row, the second frame doesn't have a foreground portion, but the predicted contour still indicates one. Note that the probability map using the mixed color model doesn't correspond with the second image (because the foreground changed so much), whereas the probability map using the simple color model correctly reflects the absence of foreground pixels, and so in this case, the simple color model should be used.

Summarizing the above, in some embodiments, generating a local segmentation color model may include generating a local segmentation simple color model based on color information for the respective region of the at least one previous image included in the local classifier for the at least one previous image, and generating a local segmentation mixed color model based on color information for the respective region of the at least one previous image included in the local classifier for the at least one previous image and color information for the respective region of the current image included in the local classifier for the current image. Discriminability of the local segmentation mixed color model and the local segmentation simple color model may be determined. Generating a local segmentation color model based at least on color information for the respective region of the at least one previous image included in the local classifier may then include selecting the local segmentation simple color model as the local segmentation color model if the local segmentation simple color model has greater discriminability than the local segmentation mixed color model, and selecting the local segmentation mixed color model as the local segmentation color model if the local segmentation mixed color model has greater discriminability than the local segmentation simple color model.

Shape Prior

As discussed above, in addition to the color model, a shape prior, i.e., a predicted shape, may also be used to generate the probability or feature map for a classifier region. More specifically, the contribution from the predicted shape (as part of a weighted sum) may be based on the discriminability of the color model, where if the color model makes a clear distinction between foreground colors and background colors, the color model is relied on to classify the pixels of the region, and if the color model does not make a clear distinction, the shape prior is relied on to classify the pixels, with intermediate situations addressed by weights applied to each, e.g., where the weights sum to some normalized value, e.g., 1. In other words, in some embodiments, the weights are coefficients in a linear sum of the color and shape contributions. Note, however, that in other embodiments, the shape and color contributions may be determined by a non-linear combination.

Figure 16:
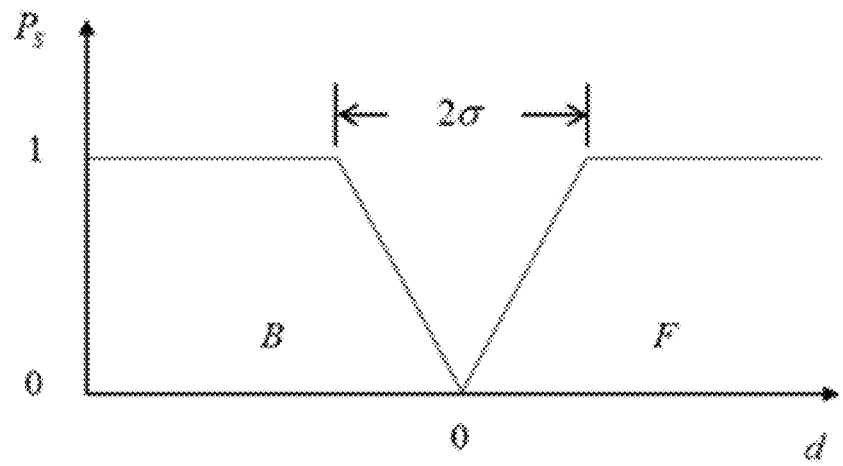
FIG. 16 illustrates shape prediction confidence, according to one embodiment.

FIG. 16 illustrates shape prediction confidence, according to one embodiment. More specifically, FIG. 16 illustrates an example relationship between the confidence of pixel classifications based on the predicted contour and the contribution of the predicted shape probability map to the integrated probability map discussed above, e.g., in a weighted linear sum of the color and shape contributions. As FIG. 16 shows, in this embodiment, for each pixel, the weight applied the shape contribution, represented by the $P_s$ axis, ranges from zero to 1, i.e., ranging from no contribution to being the only contribution, depending on the distance of the pixel from the estimated contour, represented by the d axis. As discussed above, the contributions from the color model and the predicted shape may be complementary, such that as one increases, the other decreases. Note that according to the plot of FIG. 16, a d value of 0 means that the pixel is (at least approximately) on the contour, and thus there may be maximum uncertainty as to which side (FG or BG) of the (actual) contour the pixel is on based on the predicted shape, and so the weight applied to the shape prediction will be zero. Moreover, the classification of pixels with positions sufficiently removed from 0 (in either direction), i.e., deep in the FG or BG portions of the region, may be reliably made via the predicted shape, giving a weight of 1. Expressed mathematically:

Let $M_k$ be the binary (foreground) mask enclosed by $C_{i+1}$, i.e.:

$$M_k(x) = \begin{cases} 1, & d_x \geq 0 \\ 0, & d_x < 0. \end{cases}$$

A shape confidence term (weight) $P_S$ may be defined as:

$$P_S(x) = \begin{cases} \frac{|d_x|}{\sigma}, & |d_x| \leq \sigma \\ 1, & |d_x| > \sigma, \end{cases}$$

where $\sigma$ is the parameter controlling the blurry width of the shape, i.e., an uncertainty band with respect to the predicted shape, i.e., the estimated contour, where, as noted above, $\sigma$ denotes the discriminability of the color model. In other words, the value of $\sigma$ depends on the separation or discriminability of foreground and background in the color model, and this value is used to blur the contour of the predicted shape, such that the more reliable the color model is, the less clear the predicted shape is regarding the contour. Thus, as one considers pixels further from the estimated contour, the predicted shape is increasingly relied on to classify the pixels as FG or BG pixels, and conversely, for pixels increasingly near the estimated contour, the color map is increasingly relied upon, where the width and rate of the switchover is specified by $\sigma$, as FIG. 16 shows. Of course, it should be noted that other embodiments may integrate the color and shape contributions in different ways, as desired.

Color and Shape Integration

Figure 17:
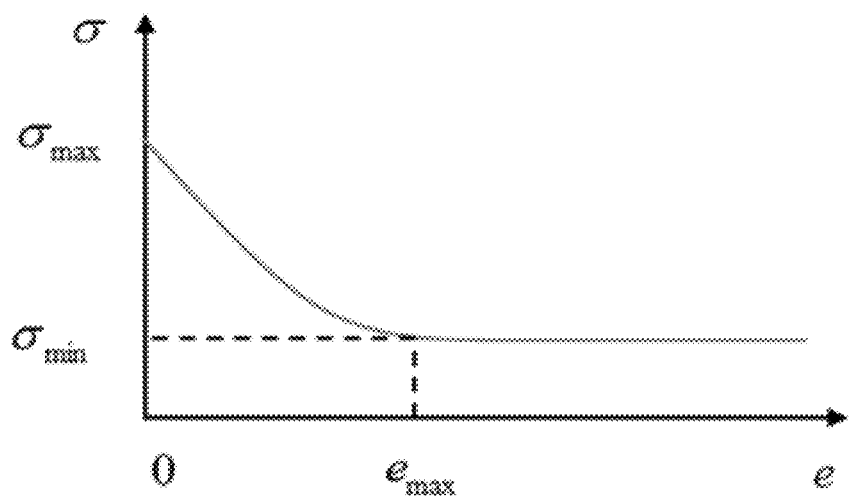
FIG. 17 illustrates shape prediction constraints based on discriminativity of the color model, according to one embodiment.

FIG. 17 illustrates shape prediction constraints based on discriminativity of the color model, according to one embodiment. As noted above with respect to FIG. 16, the blurry width $\sigma$ is related to the discriminativity of the color model. When foreground and background colors are separable, $\sigma$ is large and the shape constraint is loose, i.e., the blurred band in the predicted shape probability map is wider; when FG and BG colors are mixed, $\sigma$ becomes small and the shape constraint is tight, i.e., the blurred band in the predicted shape probability map is thinner.

In one embodiment, classification error may be used as the measure of color discriminativity. For example, let $L_k$ be the predicted label (F=1, B=0) of $W_k^i$ from the color model. The classification error e is the sum of misclassifications, weighted by the distance to the contour:

$$e = \frac{\int_{W_k^i} |L_k(x) - M_k(x)| \cdot \omega(x) dx}{\int_{W_k^i} \omega(x) dx},$$

where $$\omega(x) = \exp\left(-\frac{d_x^2}{2\sigma_d^2}\right).$$

As shown in FIG. 17, $\sigma$ is a decreasing function of e:

$$\sigma = \begin{cases} \sigma_{\min} + a(e - e_{\max})^r, & 0 \leq e \leq e_{\max} \\ \sigma_{\min}, & e > e_{\max} \end{cases},$$

where $$a = \frac{\sigma_{\max} - \sigma_{\min}}{e_{\max}^r}.$$

Said another way, once the color map for frame i+1 is determined (as described above), it may be used to (re)classify the pixels of frame i (whose actual classifications are already known, since that image has already been segmented), and by determining the errors due to the color model, determine the confidence or reliability of the color model, i.e., to determine $\sigma$. In other words, once the error e is computed, $\sigma$ may be computed therefrom. Note that per the expression above, bounds may be put on the values of $\sigma$, specifically, $\sigma_{min}$ and $\sigma_{max}$.

In one example implementation, $e_{max}$=0.12, $\sigma_{max}$=1, $\sigma_{min}$=2, and r=2. l is the size of $W_k^i$, and, as mentioned above, the final probability is a weighted linear combination of color and shape priors:

$$P_{int}(x) = P_S(x) M_k(x) + (1 - P_S(x)) P_C(x).$$

Thus, as indicated in FIG. 17, the minimum discriminability of the color model $\sigma_{min}$ may correlate with the maximum error with respect to the color model, and may define the point at which the shape prediction is the dominant contributor.

Figure 18:
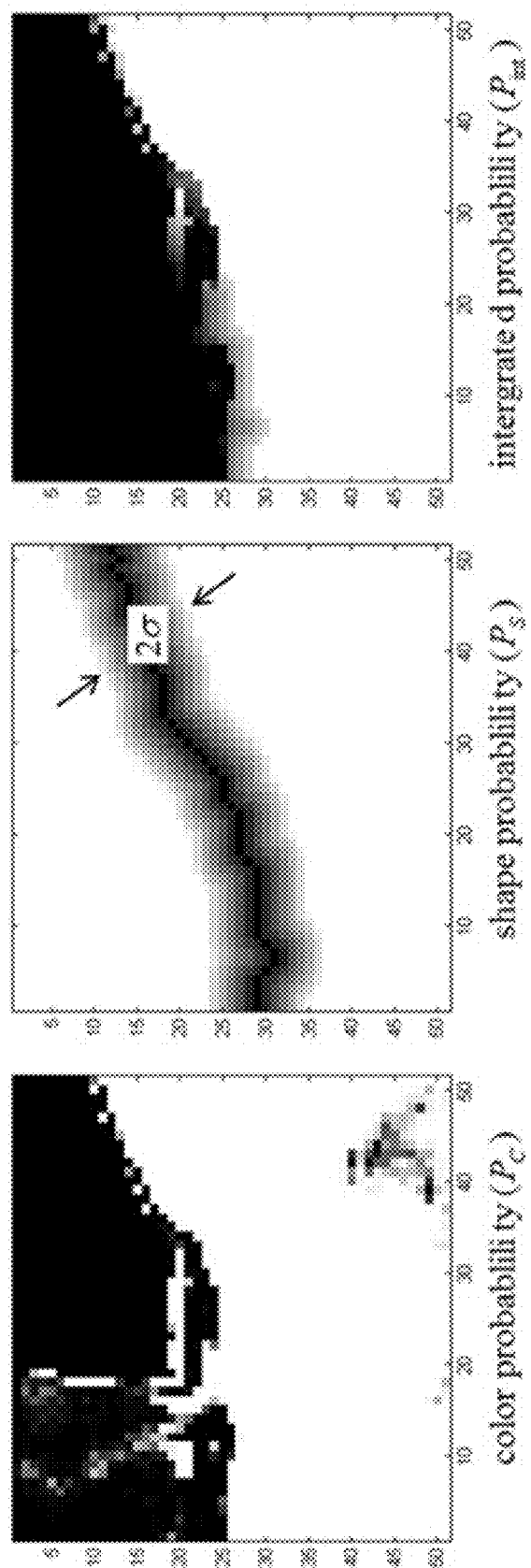
FIG. 18 illustrates color and shape integration, according to one embodiment.

FIG. 18 illustrates color and shape integration, according to one embodiment. More specifically, FIG. 18 illustrates example color and shape probability maps (i.e., feature maps), $P_c$ and $P_s$, and a corresponding integrated probability map $P_{int}$ for a classifier (region). Note that the integrated probability or feature map is a more accurate and precise estimate of the contour than either of the color or shape maps. Thus, by using embodiments of the above techniques, each classifier may determine a probability or feature map for a respective portion of the image proximate to the estimated contour.

Combined Feature Map

In one embodiment, the probabilities (i.e., probability or feature maps) in all local windows, i.e., from all local classifiers, may be combined to form a combined feature map. For example, for each local classifier of the plurality of classifiers, a local feature map estimation may be generated based on a weighted combination of the local segmentation shape and the local segmentation color model for the local classifier, where the local feature map estimation classifies pixels in the respective region as background or foreground pixels. Then, a feature map estimation for the current image may be generated by combining the local feature map estimations.

If a pixel is covered by multiple windows, its respective probability (classification) may be determined from a weighted linear combination of values in different windows, i.e., from different classifiers, e.g.,:

$$P(x) = \frac{\sum_k P_{int}(x - c_k) \omega_k}{\sum_k \omega_k} \quad \omega_k = (|x - c_k| + \varepsilon)^{-1},$$

where $c_k$ is the center of $W_k^{i+1}$, k sums over all the windows that cover x, and $\varepsilon$ is a small constant. In other words, for a pixel or point x, the weights applied to the corresponding probability values from each of the overlapping probability or feature maps from the classifiers in the linear sum may be based on the distance of x from the center point of each classifier window. Of course, this above combination scheme is given as an example only, and is not intended to limit the techniques used to combine the local feature maps to any particular approach.

Thus, a combined probability or feature map for the image (e.g., of frame i+1) may be determined using both color models and shape predictions for each of a plurality of local classifiers. Said another way, a plurality of local feature maps, e.g., foreground masks, may be stitched together to form a global or combined feature map or mask.

In 704, a segmentation of the current image may be automatically generated based on a weighted combination of the segmentation shape prediction and the segmentation color model, as described below.

Segmentation

In one embodiment, the combined feature (probability) map may be used to segment the image (into foreground and background portions). For example, in one embodiment, the combined feature map (i.e., the generated feature map estimation for the current image) may be used to segment the image using an image processing algorithm such as Graph Cut, where the probability values may be set as data cost, after which a GAC (Geodesic Active Contour) algorithm may be performed to further regularize the boundary, e.g., implemented by level sets. Note, however, that any other algorithms and/or tools may be used as desired.

In an alternative embodiment, rather than generating a combined feature map, then segmenting the image according to the combined feature map, the local feature maps may each be used to perform a local segmentation for each classifier window, after which these local segmentations (segmented image portions) may be stitched together to form the segmented image.

Iterative Refinement

Figure 19:
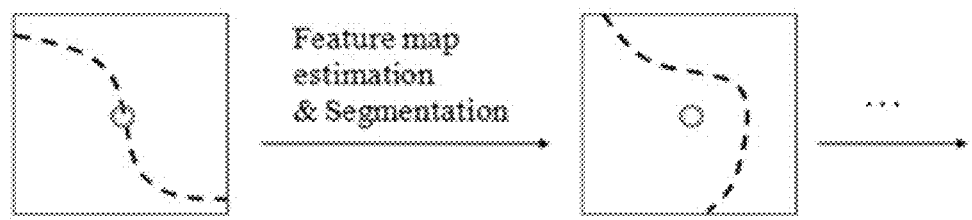
FIG. 19 illustrates contour iteration with respect to feature map estimation and segmentation, according to one embodiment.

In some embodiments, portions of the above techniques may be repeated in an iterative manner to further refine the segmentation. For example, using the segmentation boundary as an initial contour, the feature map estimation and segmentation process described above may be repeated to produce a more accurate result. In one embodiment, during iterations, the windows or classifier regions may be fixed, i.e., only the contour inside (the local foreground portion of the classifier region) may be updated. For each iteration, different color samples may be selected, and the current contour may be used as the shape prior or predicted shape. Local results may then be combined for segmentation. The iterations may terminate when the local classifier's contour does not change any more, e.g., within some specified tolerance, e.g., up to a few (10-20) pixels. FIG. 19 illustrates contour iteration with respect to feature map estimation and segmentation, according to one embodiment. As may be seen, after the feature map estimation and segmentation, the original (estimated) contour, which passes through the center point of the classifier region, is moved to the right of the center. This contour may then be used for the next iteration, i.e., for the next feature map estimation and segmentation. Said another way, automatically generating a segmentation of the current image produces a shape contour for the current image, and the method may include iteratively performing the above-described determining the segmentation shape prediction and segmentation color model and automatically generating a segmentation of the current image, until the shape contour for the current image converges, where the segmentation of the current image for each iteration is used as the segmentation information for the next iteration.

Typically, different classifiers (windows) converge at different speeds. Thus, at the end of each iteration, the converged classifiers may be marked, and only the unmarked classifiers may be updated in future iterations. As noted above, the iterations may be performed until all classifiers converge, or until it is determined that convergence will not occur, in which case the user may intervene, e.g., by manually segmenting the image, as will be discussed below in more detail.

In 706, the segmentation of the current image may be stored, e.g., in a memory medium of the computer system 100, and/or a memory medium coupled to the computer system, e.g., over a network, e.g., a SAN. The method may then repeat the above-described method elements for subsequent images or frames of the video sequence, as described below in more detail. In other words, the determining a segmentation shape prediction and a segmentation color model for a current image of a video sequence, the automatically generating a segmentation of the current image, and the storing of the segmentation of the current image, may be repeated for one or more contiguous images in the video sequence.

In one embodiment, storing the segmentation of the current image may include storing the information describing or specifying the segmentation of the image, e.g., for subsequent use in processing the image, e.g., for special effects, etc. In other embodiments, the segmented image itself may be stored.

Multi-Frame Propagation

A simple concatenation of the single-frame-propagation techniques described above may result in significant inaccuracies, since the error accumulates from frame to frame. Two approaches to effectively control or ameliorate the error divergence are described below. The first approach is to constantly rely on the color samples in the first frame. Thus, while the single-frame propagation approach forms the fundamental basis of the automatic segmentation techniques disclosed herein, in some embodiments, this approach may be extended and modified to form a multi-frame propagation process where color information for an initial frame is used to automatically perform segmentation for multiple subsequent frames.

Figure 20:
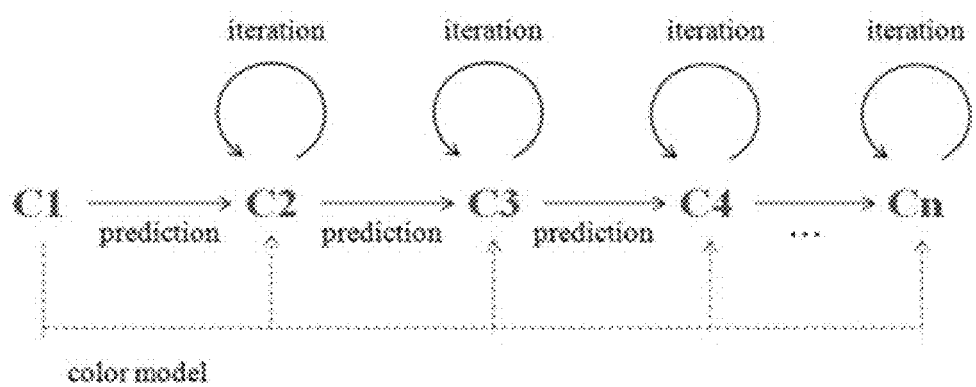
FIG. 20 illustrates multi-frame propagation of segmentation using a color model of an initial frame, according to one embodiment.

FIG. 20 illustrates multi-frame propagation of segmentation using a color model of an initial frame, according to one embodiment. As FIG. 20 indicates, a first frame C1 is used to generate a sequence of subsequent contours or segmentations, specifically, for subsequent frames C2-Cn. As may be seen, the color model for the initial frame (C1) is used for each of the subsequent frames, while shape information, e.g., a shape prediction, for each frame is used for the next frame. In other words, the automatic segmentation of each frame uses the color model from the initial frame (and possibly the current frame in the "mixed model" case), but uses the predicted shape of the immediately previous frame. In other words, for determining segmentation for a frame Ci+1, instead of building a color model from Ci and Ci+1, the color model is determined from C1 (and possibly Ci+1). This scheme keeps the segmentation error at a constant level for every frame, as opposed to the simple concatenation approach where the error diverges or increases with the propagation. Note that for each subsequent frame the automatic segmentation is an iterative process, similar to the iterative refinement described above.

Said in a slightly different way, in some embodiments, for each iteration of the above iteratively performing (of the determining the segmentation shape prediction and segmentation color model and automatically generating a segmentation of the current image), upon convergence of the shape contour, the local classifier may be repositioned onto the shape contour. This repositioning may include determining a normal distance from the local classifier's center to the shape contour, and moving the local classifier onto the shape contour based at least in part on the normal distance. The determining a normal distance and the moving the local classifier may ameliorate propagation and divergence of errors. In one embodiment, local averages of the normal distance may be used to reposition each window.

Figure 21:
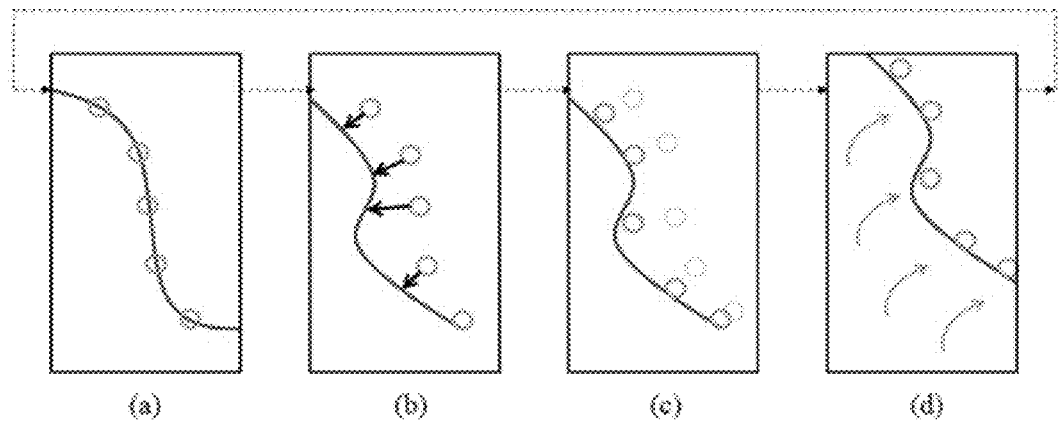
FIG. 21 illustrates multi-frame propagation of segmentation using a feedback correction approach with respect to window/classifier positions, according to one embodiment.

In a second approach to error confinement, a feedback correction may be added to classifier window positions, which may enable the classifiers to keep robust track of the contour or boundary. FIG. 21 illustrates multi-frame propagation of segmentation using a feedback correction approach with respect to window/classifier positions, according to one embodiment. More specifically, FIG. 21 illustrates an example embodiment of such a process, where, as may be seen, initial window positions are indicated in element (a) where the contour passes through the center points of multiple classifier windows. This may represent the situation resulting from the rough alignment of the classifiers (and respective contour segments) via shape prediction. In element (b), a new boundary or contour is formed upon convergence of the iterative refinement process. Then, for each window center, its displacement to the nearest point on the new contour or boundary may be determined. In other words, once the new contour is determined, the normal displacement (vector) from each classifier center point to the new contour may be determined. Then, as indicated in element (c), the classifier window centers may be moved based on the displacement. For example, in one embodiment, the classifier window centers may be moved according to an average displacement around the region, e.g., based on an average of the displacement vectors of neighboring or nearby classifiers, e.g., those that overlap the current classifier, e.g., vectors for windows i−2, i−1, i, i+1, and i+1 may be averaged to move window I, or vectors for classifiers within some distance of the current window may be averaged, etc., as desired. In an alternative embodiment, the classifier window centers may simply be moved to the contour based on their respective displacements. Finally, as illustrated in element (d) of FIG. 21, the boundary or contour and the classifier window centers may be moved or propagated to the next frame via shape prediction, as described above. Thus, once the contour or boundary is moved, the windows centers may subsequently be moved to (or near) the contour.

Thus, one or both of the above approaches to error confinement may be used to limit or ameliorate the propagation and divergence of errors in the automatic segmentation process, although it should be noted that any other error management techniques may be used as desired.

User Interaction

As noted above with reference to FIG. 2 and elsewhere, in some embodiments, in some embodiments, a graphical user interface (GUI) may be provided that allows the user to modify segmentation results, e.g., whereby the user may interact with and intervene in the automatic segmentation process. For example, in situations where an automatically determined contour/segmentation fails to converge, or where the contours are determined to be inaccurate, the user may edit the segmentation results, e.g., in a forward progressive fashion.

Given a well-segmented frame, the method may automatically propagate the segmentation to the next N frames, and the user may play the video forward to check the results until an error is found. Two modes of user correction are now presented.

Local Correction

For minor mistakes, the user may correct only a small part of the contour. In other words, only a limited number of windows may be manually updated. The correction may then propagate to the future frames.

Reset Starting Frame

Figure 22:
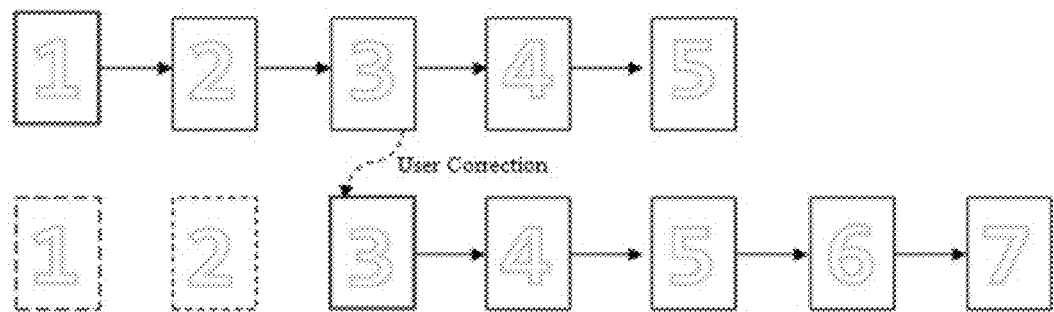
FIG. 22 illustrates user interaction to correct or reset multi-frame propagation of segmentation in a video sequence, according to one embodiment.

In cases where more significant corrections are required, e.g., in number and/or kind, e.g., in cases where, for example, the contour is drifting away from boundary, the foreground object is moving out/into the scene, foreground occlusion, etc., the user may manually correct the current frame, and the current frame may be set as the first or initial frame for the automatic segmentation process, and the method proceeds from this frame, propagating forward until another error occurs. The entire video sequence is segmented when the last frame is reached. FIG. 22 illustrates user interaction to correct or reset multi-frame propagation of segmentation in a video sequence, according to one embodiment, where the top sequence of frames (1 through 5) are automatically segmented based on initial frame 1, but where an error is detected in frame 3 and corrected by the user. Then, as FIG. 22 indicates, corrected frame 3 is reset or designated as an initial frame for continued (recomputed) segmentation of successive frames (4 through 7).

Described in more detail, in some embodiments, performing the above-described determining a segmentation shape prediction and a segmentation color model for a current image of a video sequence, automatically generating a segmentation of the current image, and storing the segmentation of the current image, for one or more contiguous images in the video sequence may include performing the determining a segmentation shape prediction and a segmentation color model for a current image of a video sequence, automatically generating a segmentation of the current image, and storing the segmentation of the current image, for a first plurality of contiguous images in the video sequence, including an ultimate (i.e., last) image in the first plurality of contiguous images, then editing segmentation of the ultimate image in response to input, thereby generating edited segmentation information, then performing the determining a segmentation shape prediction and a segmentation color model for a current image of a video sequence, automatically generating a segmentation of the current image, and storing the segmentation of the current image, for a second plurality of contiguous images in the video sequence, including a first image in the second plurality of contiguous images which is contiguous with the ultimate image in the first plurality of contiguous images in the video sequence. The existing segmentation information used in the determining a segmentation shape prediction and a segmentation color model for the first image in the second plurality of contiguous images may thus include the edited segmentation information.

It should be noted that while the above techniques have been describe as a forward propagation of segmentation in a video sequence, in some embodiments, the techniques may also or instead be propagated in the reverse direction. In other words, the techniques described herein are agnostic or generic with respect to the particular direction of the video sequence.

In some embodiments, this aspect may be used to possibly improve the segmentation process. For example, in one embodiment, embodiments of the methods described above may be performed on a video sequence (possibly a small sub-sequence within the larger video sequence) from either end, e.g., concurrently and/or sequentially, e.g., until the contours for each image converge. For example, in one embodiment, the user may manually segment two key frames bounding a sequence, then propagate inward from both ends, possibly stopping in the middle (at least temporarily) to reconcile competing contours for that image, then optionally continuing to opposite ends, refining the previously computed segmentation (by the opposite propagation). Other variations of this bi-directional technique are also contemplated.

Thus, various embodiments of the above techniques may be used to automatically propagate foreground/background image segmentation in a video sequence.

Example Results

Figure 23:
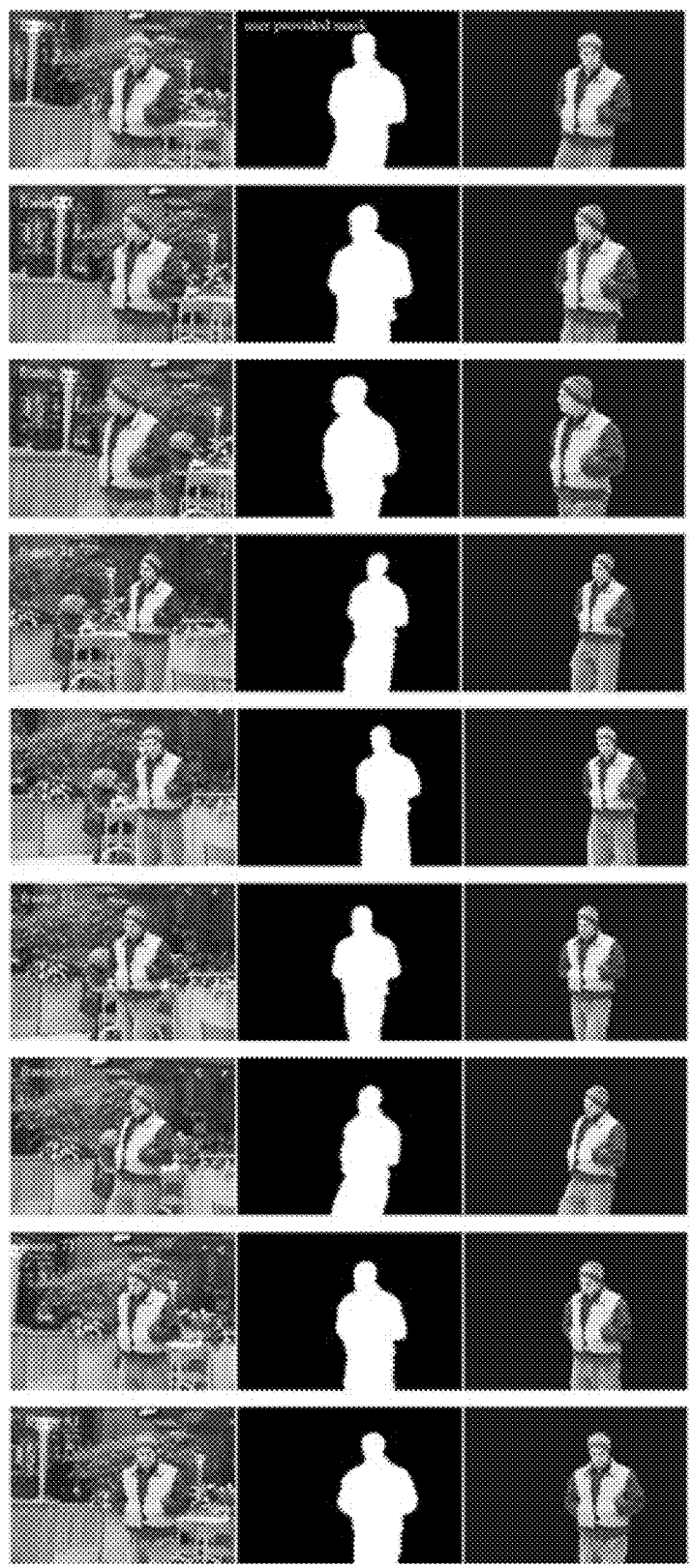
FIGS. 23 and 24 illustrate example video sequences resulting from application of embodiments of the method of FIG. 7.
Figure 24:
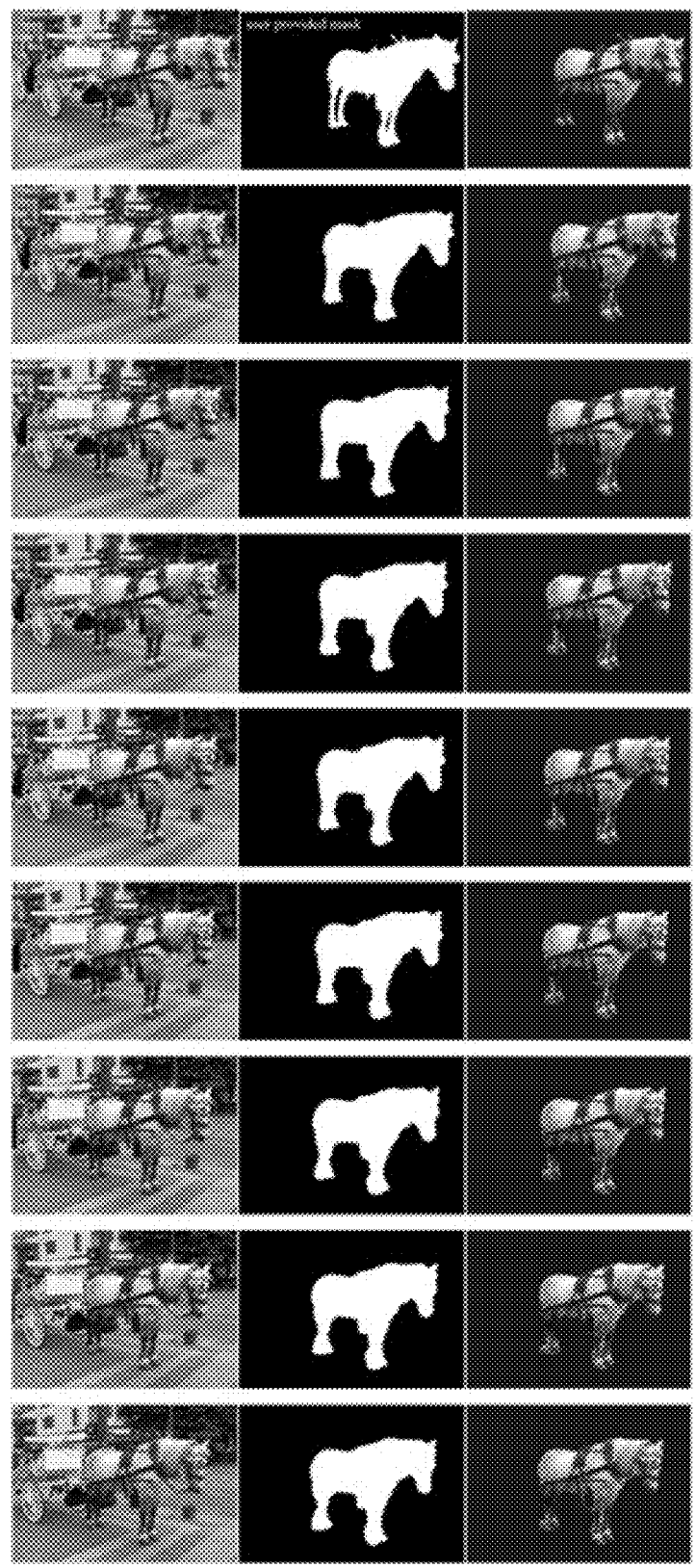

FIGS. 23 and 24 illustrate example video sequences resulting from application of embodiments of the above techniques, where original images of a video sequence are presented vertically on the left (top to bottom), corresponding segmentation masks or feature maps are presented in the middle of the figures, and corresponding images with segmented foreground composited on blue backgrounds are presented vertically on the right. As may be seen, in both sequences, the first (top) segmentation mask is provided by the user. Note that in the sequence of FIG. 23, every $10^{th}$ frame is shown, as indicated by the frame numbers labeling each original frame image.

Thus, various embodiments of the systems and methods disclosed herein may be used to automatically perform image segmentation in a digital video image sequence.

Figure 25:
FIG. 25 illustrates overlapping local windows around a foreground object contour.

Applying Gaussian Mixture Models to Local Image Patches Using an Adaptive Color Lookup Table Embodiments of the method for automatically determining segmentation in a digital video image sequence described above may implement a patch-based video frame segmentation algorithm. In summary, for each video frame, the method constructs overlapping local windows (patches) around the foreground object contour, and then builds a Gaussian Mixture Model (GMM) color model inside each local window for local classification. Finally, the local classification results are integrated together to generate the final object mask. FIG. 25 illustrates overlapping local windows around a foreground object contour. A local window may be viewed as a region of an image. Note that local windows may be referred to as local image patches or simply image patches.

However, in the above-described methods, a speed bottleneck potentially exists in probability estimation when calculating the foreground probabilities for the pixels in a propagated classifier $W_k^{i+1}$ via a Gaussian Mixture Model (GMM). (See the section titled Determining the Color Model.) Estimating probabilities for the local image patches is a computationally expensive process. To obtain the foreground probability of a patch $W^i$ covering the object boundary, a local GMM color model may be applied to each pixel inside the local patch. The following is an example local GMM color model that may be applied in some embodiments:

$$p^i(x) = \sum_{k=1}^{K} a_k \phi(x \mid \mu_k, \Sigma_k), \quad x \in W^i$$

$$\phi(x \mid \mu_k, \Sigma_k) = \frac{1}{\sqrt{(2\pi)^3 |\Sigma_k|}} \exp\left(-\frac{(x-\mu_k)^T \Sigma_k^{-1}(x-\mu_k)}{2}\right)$$

In the above GMM color model, x is the color vector of a pixel in $W^i$, and $p^i(x)$ is the weighed combination of K Gaussian components with mean $\mu_k$ and full covariance matrix $\Sigma_k$. Directly applying such a Gaussian Mixture Model to an image patch involves expensive computation, as it needs to calculate K exponential terms for each pixel. The computation could be redundant as well; to avoid redundancy, two pixels having the same color should be computed only once instead of being computed separately.

A solution to reduce computation is to build a lookup table to store a computed probability value for any single color, so that the probability value will not be computed twice for the same color. However, for 8-bit, 3-channel color images, e.g. RGB images, this would require a huge lookup table of size 256×256×256. In addition, computation may not be significantly reduced due to the potential for a large number of unique colors, since many pixels will have similar but slightly different color values.

However, it may be observed that a local image patch (for example, of size 60×60) generally contains many fewer colors than the whole image does. Therefore, a local image patch's color space can be quantized into a relatively small set of colors. Using a lookup table on such a reduced color space may be more efficient than using a lookup table that covers the entire color space of z-bit (e.g., 8-bit) color images. Embodiments of a method for applying Gaussian Mixture Models to local image patches using an adaptive color lookup table are described that leverage the above observations.

In some embodiments of the method, per-channel color quantization is performed to find representative colors in a local image patch. For each color channel, the quantization process finds m representative values. Each possible combination of n representative values, one from each color channel (e.g., one R, one B, and one G value for RGB images), corresponds to a representative color. For example, there are m×m×m representative colors for a 3-channel image patch. More generally, there are $m^n$ representative colors for an n-channel image patch. The probabilities of the representative colors may then be computed using the local GMM color model and stored to corresponding entries in the $m^n$ adaptive color lookup table. Then, for every pixel in the image patch, the closest representative color is found, and the corresponding probability is used for the pixel.

In some embodiments, the probabilities for all possible combinations of the representative values from the color channels are pre-computed up-front and stored to the lookup table before processing the pixels in the image patch. In some embodiments of the method, the entries in the lookup table are not filled until corresponding colors are processed; that is, the probabilities for all possible combinations of the representative values are not pre-computed. Instead, the lookup table is initialized to empty; that is, each entry in the lookup table is initialized to a state that indicates that the entry has not been assigned a value such as a probability. The pixels in the image patch are then processed. For each pixel, a corresponding representative color is determined. If the entry in the lookup table for that representative color is filled, the probability for that entry is used for the pixel. If the entry in the lookup table for that representative color is empty, the probability for the representative color is computed using the local GMM color model, stored to the entry in the adaptive lookup table, and used for the pixel. Not computing the probabilities until a color is encountered when processing the pixels in the patch may be more efficient than pre-computing the probabilities for all possible combinations of the representative values because image patches will generally not contain pixels with colors corresponding to all the possible combinations, and thus fewer probabilities may be calculated.

Embodiments of the method for applying Gaussian Mixture Models to local image patches using an adaptive color lookup table may, for example, be applied in some embodiments of the method for automatically determining segmentation in a digital video image sequence described above when calculating the foreground probabilities for the pixels in a propagated classifier $W_k^{i+1}$ via a Gaussian Mixture Model (GMM). It is to be noted that embodiments of the method for applying Gaussian Mixture Models to local image patches using an adaptive color lookup table are not limited to such an application; embodiments may be applied in many different situations where a GMM is applied to a subregion of an image. Furthermore, the per-color channel quantization technique described below, the adaptive color lookup table, and the method for applying the adaptive color lookup table described below in reference to applying a GMM to image patches when calculating probabilities, are not limited to the particular example application for which they are described. For example, embodiments may be used to calculate other pixel metrics than foreground probabilities. Furthermore, while embodiments are described in reference to processing multi-channel digital image data, embodiments may be adapted to process other types of multi-channel data than digital image data.

In the following description and examples, 3-channel, 8-bit color images, specifically RGB color images, are generally assumed by way of example. However, embodiments of the method for applying Gaussian Mixture Models to local image patches using per-color channel quantization and an adaptive color lookup table may be applied to n-channel images with z-bit color channels, and may be applied to other image types than RGB images. Furthermore, while embodiments are described in reference to processing digital image data, embodiments may be adapted to process other types of data than image data.

Figure 26:
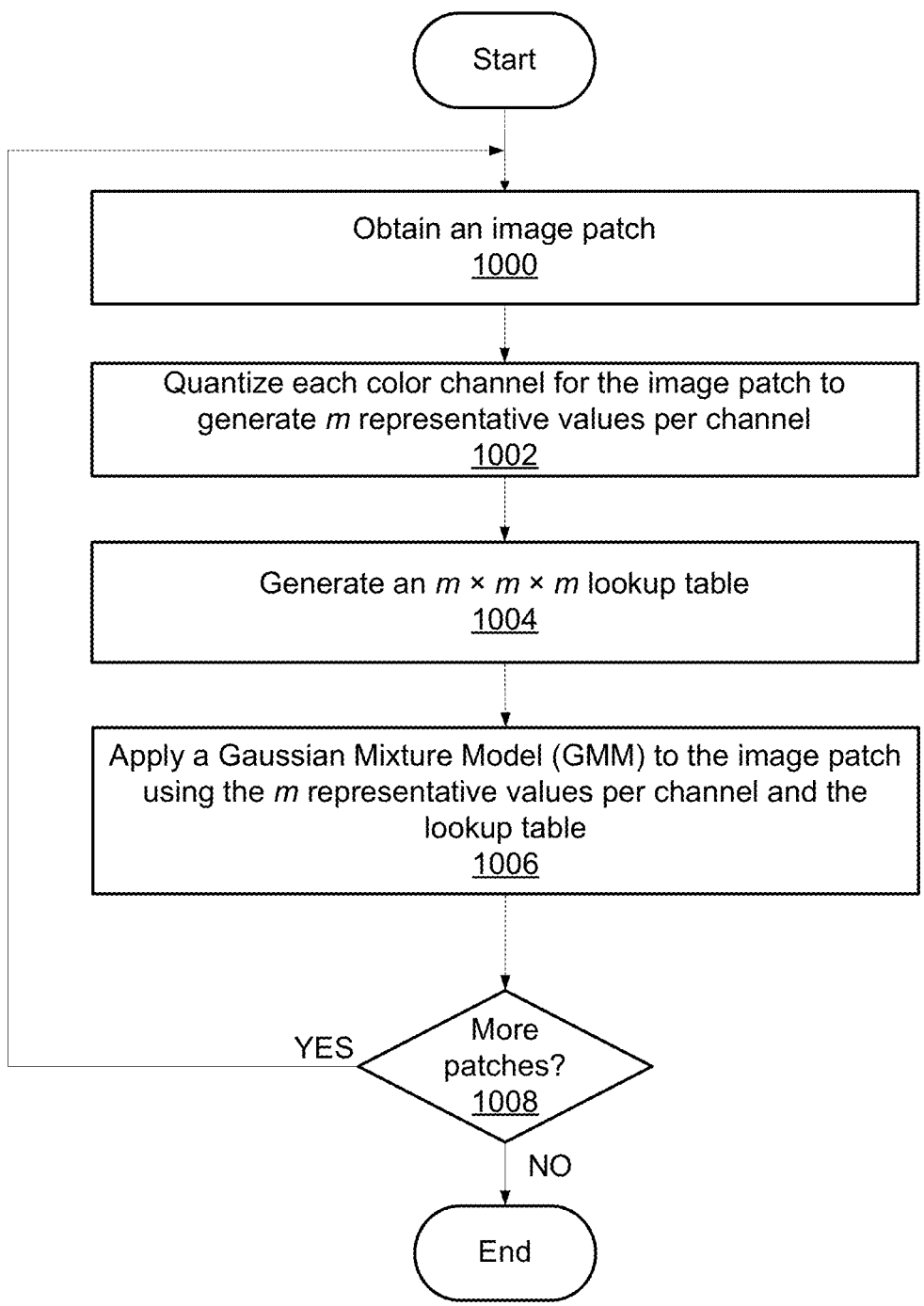
FIG. 26 is a flowchart illustrating a method for applying Gaussian Mixture Models to local image patches using an adaptive color lookup table, according to some embodiments.
Figure 27:
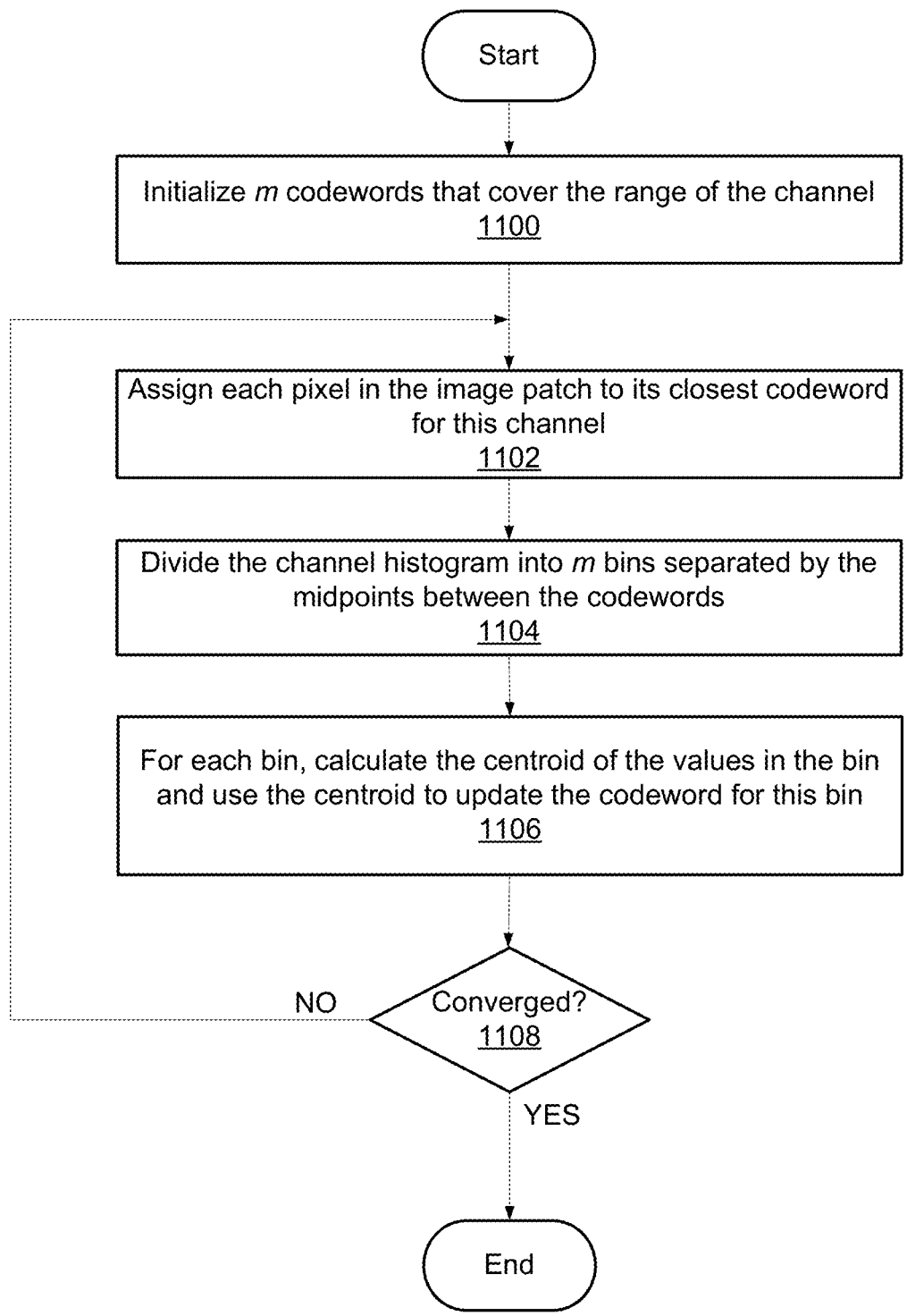
FIG. 27 is a flowchart illustrating a quantization method, according to some embodiments.
Figure 32:
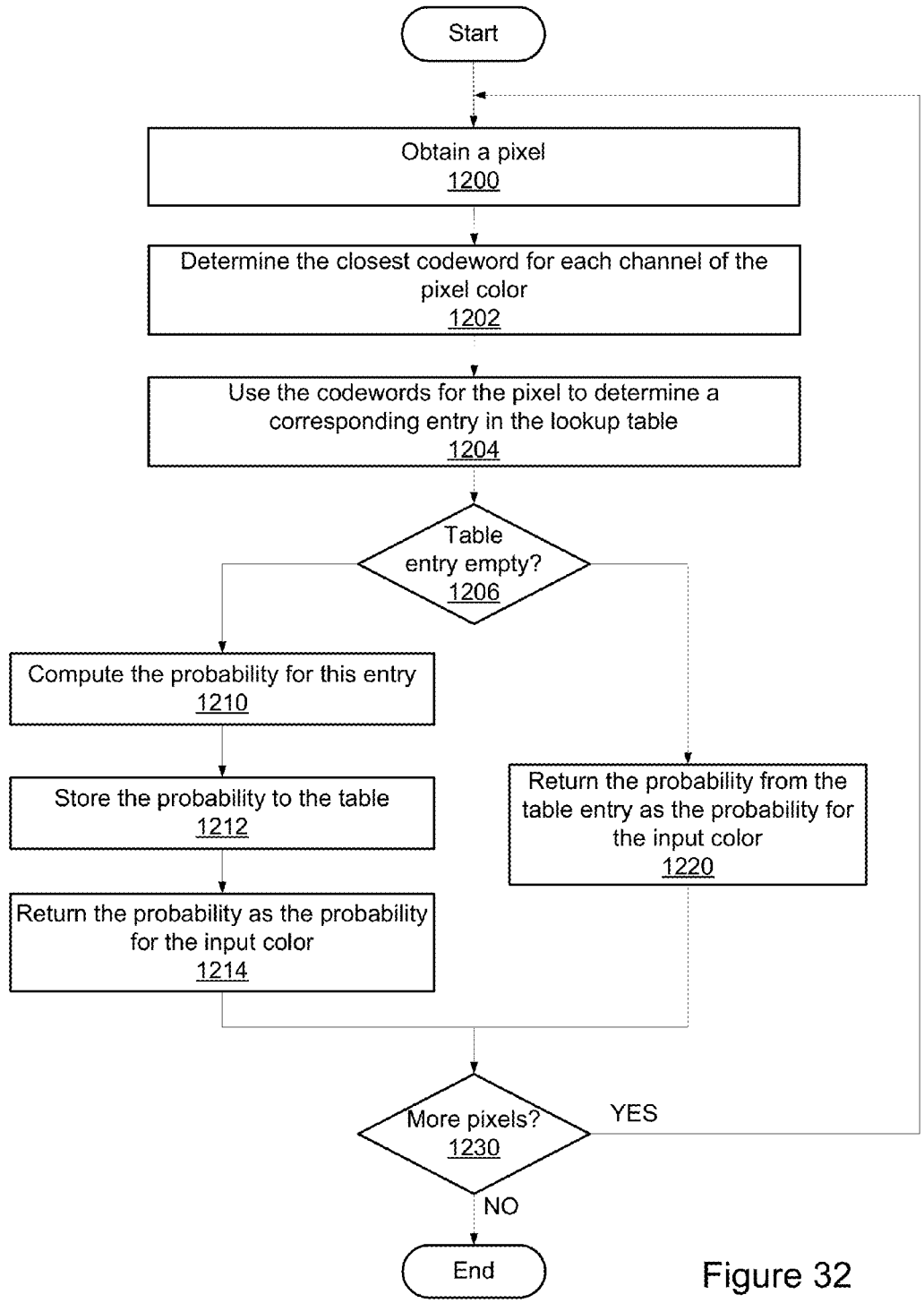
FIG. 32 is a flowchart of a method for applying a Gaussian Mixture Model (GMM) using an adaptive lookup table to a given image patch, according to some embodiments.

FIG. 26—Flowchart of a Method for Applying Gaussian Mixture Models to Local Image Patches Using an Adaptive Color Lookup Table FIG. 26 is a flowchart illustrating a method for applying Gaussian Mixture Models to local image patches using an adaptive color lookup table, according to some embodiments. Embodiments of the method shown in FIG. 26 may, for example, be applied in some embodiments of the method shown in FIG. 7 when calculating the foreground probabilities for the pixels in a propagated classifier $W_k^{i+1}$ via a Gaussian Mixture Model (GMM). The method illustrated in FIG. 26 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows. Note that FIG. 26 is a relatively high-level flowchart of the method, and that FIGS. 27 and 32 illustrate flowcharts that expand on elements 1002 and 1006 of FIG. 26, respectively.

As indicated at 1000 of FIG. 26, an image patch may be obtained. For example, a local window (or image patch) as illustrated in FIG. 25 may be obtained when automatically generating a segmentation of a current image based on a weighted combination of the segmentation shape prediction and the segmentation color model, as described for element 704 of FIG. 7. The image patch may, for example, be of size 60×60 pixels. However, the image patch may be of other sizes, for example 61×61, or 30×30, or 51×51. While the given example sizes are all square patches, embodiments are not restricted to square patches; rectangular, non-square patches may also be used in some embodiments, e.g. a 50×60 patch. Furthermore, non-rectangular patches may be used in some embodiments. In some embodiments, the image patch size may be a user-specified parameter.

As indicated at 1002 of FIG. 26, each color channel for the image patch may be quantized to generate m representative values (which may be referred to herein as codewords) per channel, where m is a positive integer that is less than the number of possible color values per channel (which may be designated as M). For example, in a typical RGB image, there are eight bits per channel, yielding an M of 256 values (colors) per channel. For processing an RGB image according to the described methods, example values for m may include, but are not limited to, 8, 10, 12, 16, 20, 25, 30, 40, 50, 60, 70, 80, and 128. Note that any value less than M may be used for m; however, as discussed later in this document, some values or ranges of values for m may yield better performance and/or quality than others. In some embodiments, m may be a user-specified parameter. FIG. 27, described later in this document, illustrates a method for color channel quantization that may be used in some embodiments. Note that other methods for color channel quantization may be used in other embodiments.

As indicated at 1004 of FIG. 26, a lookup table of size m×m×m (more generally, a table of size $m^n$, where n is the number of color channels) may be generated. In some embodiments, generating the lookup table may include allocating memory for the lookup table, if necessary. In some embodiments, generating the lookup table may include initializing each entry in the lookup table to an empty state; that is, to a state that indicates that the entry has not been assigned a value such as a probability for the pixel. In some embodiments, instead of initializing each entry to an empty state, each entry in the lookup table may be initialized to indicate a value for the entry, such as a foreground probability, for the pixel.

In some embodiments, the probabilities for all possible combinations of the representative values are pre-computed and stored to the lookup table before processing the pixels in the image patch. In some embodiments of the method, the entries in the lookup table are not filled until corresponding colors are processed; that is, the probabilities for all possible combinations of the representative values are not pre-computed.

As indicated at 1006 of FIG. 26, a Gaussian Mixture Model (GMM) may be applied to the image patch using the m representative values per channel and the $m^n$ (e.g., m×m×m) color lookup table. FIG. 32, described later in this document, illustrates a method that may be applied to generate a probability map according to a GMM using the m representative values per channel and the lookup table, according to some embodiments.

Embodiments of the method illustrated in FIG. 26 may, for example, be applied to each local window in embodiments of the method for automatically determining segmentation in a digital video image sequence described above to calculate the foreground probabilities for the pixels in a propagated classifier $W_k^{i+1}$ via a Gaussian Mixture Model (GMM). (See the section titled Determining the Color Model.)

FIG. 27—Flowchart of a Method for Color Channel Quantization

In color channel quantization, for each color channel, m representative values (referred to as codewords) may be extracted. In some embodiments, quantization may be performed on each channel using a quantization method as illustrated in FIG. 27. Embodiments of the method shown in FIG.

27 may, for example, be applied in some embodiments of the method shown in FIG. 26 when quantizing each color channel for the image patch to generate m representative values per channel. The method illustrated in FIG. 27 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

Figure 28:
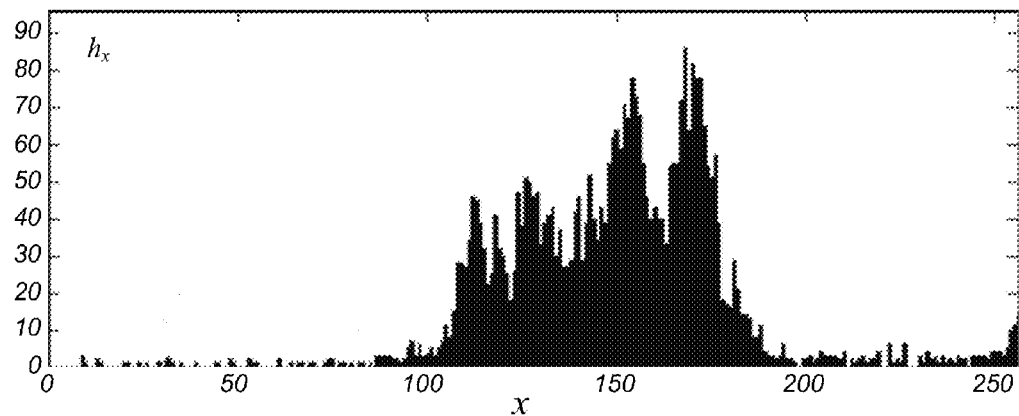
FIG. 28 illustrates an example histogram for a channel.

In some embodiments, quantization may be performed on the histogram of each color channel. The method assumes a histogram has been generated for each channel in the image patch. See FIG. 28 for an example of a histogram for a channel. For an 8-bit color channel, the histogram has 256 entries (0-255 decimal, 0x00-0xFF hexadecimal); in FIG. 28, this is represented by the x axis. The value of each entry in the histogram represents the number of occurrences of that entry for that channel in the pixels of the image patch. In FIG. 28, this is represented by the y axis; the vertical bars are graphical representations of the values. For example, if the value 127 (0x7F) occurs 40 times in this channel for the pixels of the image patch, then the value for the 128$^{th}$ entry in the histogram will be 40 (note that the 1$^{st}$ entry is for 0x00, and the 256$^{th}$ entry is for 0xFF); and if the value 128 (0x80) occurs 45 times, then the value for the 129$^{th}$ entry in the histogram will be 45.

Figure 29:
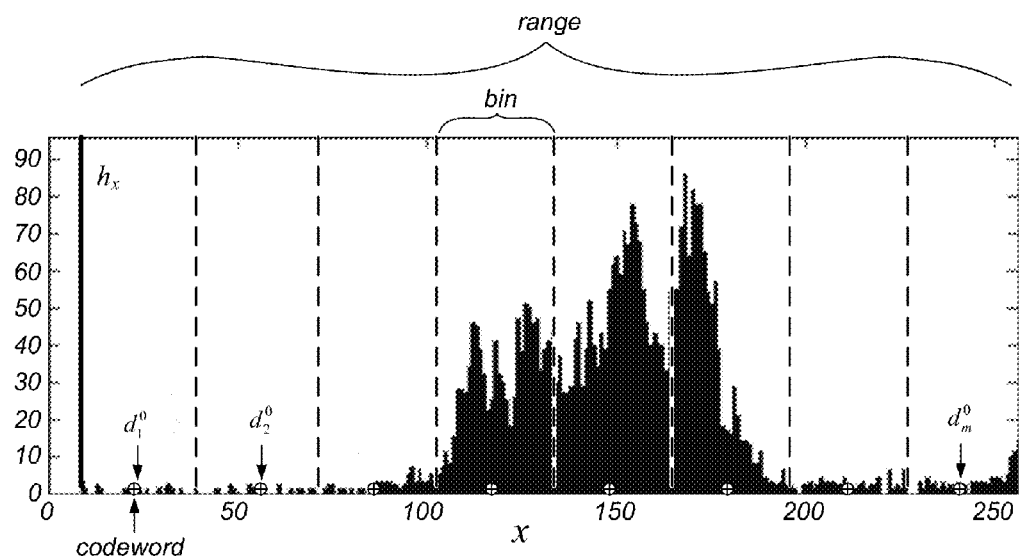
FIG. 29 illustrates the histogram of FIG. 28 with m initial codewords, according to some embodiments.

As indicated at 1100 of FIG. 27, the codewords for the channel may be initialized. Some embodiments may equally initialize m codewords that cover the range of the channel, according to:

$$d_i^0 = x_{min} + (i-1)\frac{x_{max} - x_{min}}{m-1}, i = 1, 2, \ldots, m$$

where $d_i^0$ is the i$^{th}$ codeword. $x_{min}$ and $x_{max}$ are the min and max values in the histogram $h_x$. FIG. 29 illustrates the histogram of FIG. 28 with m initialized codewords, where m=8. The codewords are represented by the crossed circles (⊕). Note that the m codewords are evenly distributed over the range of the values on the x axis of the histogram. Other embodiments may use other techniques to initialize the codewords.

As indicated at 1102 of FIG. 27, each pixel in the image patch is assigned to its closest codeword for this channel. In some embodiments, each pixel is assigned its closest codeword (crossed circles) by the metric of color difference in the channel. In some embodiments, since the quantization method is working on a histogram, assigning the closest codewords to the pixels may be accomplished by assigning the vertical bars in the histogram to their closest codewords. In a histogram for a channel, all pixels in each bar have the same color for the channel; each pixel in the image patch is associated, via its color for this channel, with a particular one and only one of the bars in the histogram for this channel. Thus, each bar can be assigned its closest codeword.

As indicated at 1104 of FIG. 27, the histogram is divided into m bins bounded by the midpoints between the codewords (for the first and last codewords (1 and m), the first and last points of the range for the channel bound one side the respective bins). In FIG. 29, the vertical dashed lines represent the boundaries between the bins, which are initially of equal (or nearly equal) size. Each bin includes one codeword. All the vertical bars between the boundaries of a given bin are assigned to the codeword for that bin. Thus, the histogram is divided into bins, with a codeword at the middle of each bin.

As indicated at 1106 of FIG. 27, the codewords are updated, or adjusted. In some embodiments, for each bin, the centroid of the values in the bin is calculated. The centroid is then used to update the codeword for the bin. In some embodiments, the following may be used to update the codewords:

$$d_i^{k+1} = \frac{\Sigma_x x \cdot h_x}{\Sigma_x h_x}, \frac{d_{i-1}^k + d_i^k}{2} < x \le \frac{d_i^k + d_{i+1}^k}{2}$$

At 1108 of FIG. 27, a test for convergence may be performed. If converged, then the quantization is done, and the m current codewords are used as the representative values for this channel. If not converged, then the method returns to 1102. Thus, elements 1102 through 1106 may be iterated until convergence. In some embodiments, elements 1102 through 1106 may be iterated until $|d_i^k - d_i^{k-1}| < \epsilon$ for all i's.

This quantization process may minimize the quantization error:

$$E^k = \Sigma_x (x - d_i^k)^2$$

where $d_i^k$ is the corresponding codeword of x. All the colors inside the same bin are approximated by the codeword of that bin.

Figure 30:
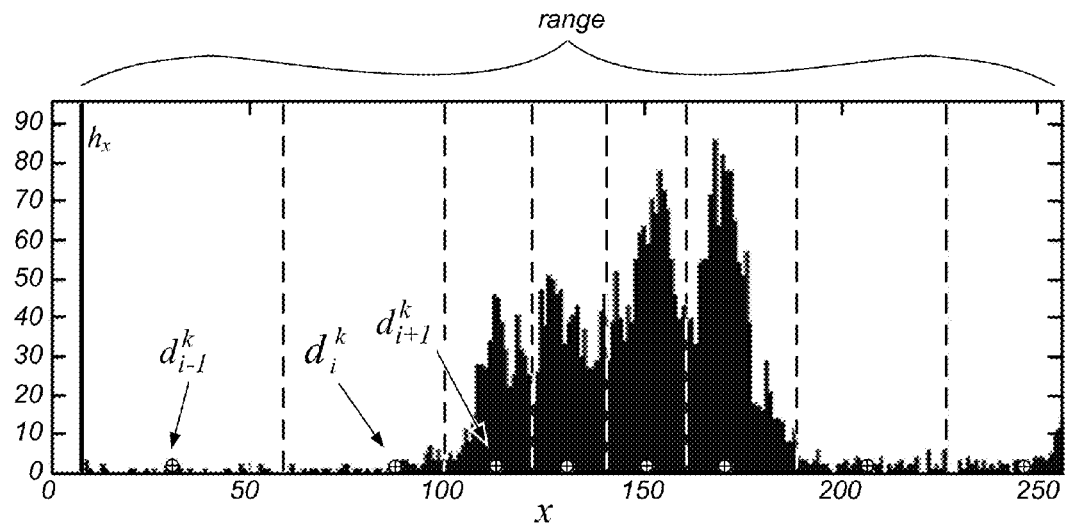
FIG. 30 illustrates dividing a histogram into m bins, according to some embodiments.
Figure 31:
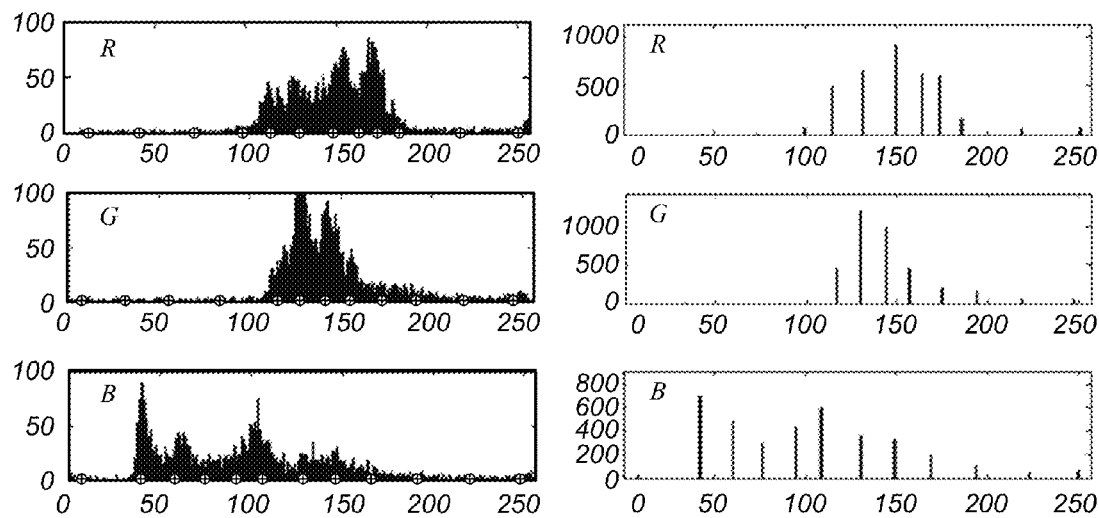
FIG. 31 shows an example of quantizing an image patch into twelve colors per channel, according to some embodiments.

FIGS. 30 and 31 graphically illustrate a quantization method using histograms, according to some embodiments. Some embodiments may iteratively divide the histograms and recompute the codewords until convergence, for example as illustrated in FIG. 27. As shown in FIG. 30, on a 1-D histogram, assigning each color its closest codeword divides the histogram into m bins. In this example, m=8. The codewords (the locations of which are indicated by the crossed circles (⊕) in FIGS. 30 and 31) are the centroids of these bins. FIG. 31 shows an example of quantizing an image patch into twelve colors per channel (in RGB). In FIG. 29, the left three images show the histograms of the R, G, and B channels of an image patch before quantization, and the right three images show the histograms of the R, G, and B channels of the image patch after quantization.

FIG. 32—Flowchart of a Method for Applying GMM Using the Adaptive Lookup Table

FIG. 32 is a flowchart of a method for applying a Gaussian Mixture Model (GMM) using an adaptive lookup table as described herein to a given image patch, according to some embodiments. Embodiments of the method shown in FIG. 32 may, for example, be applied in some embodiments of the method shown in FIG. 26 when applying a Gaussian Mixture Model (GMM) to an image patch using the m representative values per channel and the lookup table. The method illustrated in FIG. 32 may be used in conjunction with embodiments of the computer system shown in FIG. 1, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

Referring to FIG. 26, as indicated at 1004, a lookup table of size m$^n$ may first be generated, where n is the number of color channels. In some embodiments, generating a lookup table may include initializing each entry in the lookup table to an empty state; that is, to a state that indicates that the entry has not been assigned a value such as a probability for the pixel. Alternatively, in some embodiments, the probabilities for all possible combinations of the representative values are pre-computed and stored to the lookup table before processing the pixels in the image patch. In some embodiments of the method, as in the embodiment described in FIG. 32, the entries in the lookup table are not filled until corresponding colors are processed; that is, the probabilities for all possible combinations of the representative values are not pre-computed.

As indicated at 1200 of FIG. 32, a pixel is obtained from the image patch. As indicated at 1202 of FIG. 32, the closest codeword for each channel of the pixel color is found. Given an example input 3-channel RGB pixel color x=(r,g,b), embodiments may look at each color channel to find the closest codewords $x=(d_r^i, d_g^j, d_b^k)$, where $d_r^i$ is the codeword that is the closest to r in the red color channel, $d_g^j$ is the codeword that is the closest to g in the green color channel, and $d_b^k$ is the codeword that is the closest to b in the blue color channel. See FIG. 30.

As indicated at 1204 of FIG. 32, the codewords for the pixel $(d_r^i, d_g^j, d_b^k)$ are used to find a corresponding entry $T(x^*)$ in the lookup table. At 1206 of FIG. 32, the entry $T(x^*)$ in the lookup table is examined.

At 1206, if $T(x^*)$ is empty, the probability $p(x^*)$ is computed using a Gaussian Mixture formulation as indicated at 1210 of FIG. 32. In some embodiments, the example local GMM color model given above may be used to calculate the probability $p(x^*)$:

$$p^i(x) = \sum_{k=1}^{K} a_k \phi(x \mid \mu_k, \Sigma_k), \quad x \in W^i$$

$$\phi(x \mid \mu_k, \Sigma_k) = \frac{1}{\sqrt{(2\pi)^3 |\Sigma_k|}} \exp\left(-\frac{(x-\mu_k)^T \Sigma_k^{-1}(x-\mu_k)}{2}\right)$$

As indicated at 1212 of FIG. 32, the computed probability value is stored in $T(x^*)$. As indicated at 1212 of FIG. 32, the computed probability value is returned as the probability for the input color.

At 1206, if $T(x^*)$ is not empty (has been previously calculated and filled), the probability value at $T(x^*)$ is returned as the probability for the input color, as indicated at 1220 of FIG. 32. Thus, the probability for an RGB color in the table may be calculated only once, for the first pixel of that color (according to its closest codewords). Subsequent pixels with identical color (according to their closest codewords) are assigned the probability from the table entry for that color, which has already been computed for the first pixel of that color.

At 1230 of FIG. 32, if there are more pixels in the image patch to be processed, the method returns to element 1200. Otherwise, the method is done. Thus, elements 1202 through 1220 may be performed for each pixel in the local image patch.

It is clear that by using the adaptive lookup table in performing the probability calculations for an image patch, similar input colors will share the same entry in the table, and thus the computational cost may be reduced since the GMM color model does not have to be executed at each pixel.

Empirical Performance Testing and Examples

As previously noted, some values or ranges of values for m (quantization levels) may yield better performance and/or quality than others. It is to be noted that higher values for m may generate results that are closer to results generated using conventional methods that apply the GMM model independently to every pixel in an image patch. However, higher values for m may also reduce the performance advantage gained by using the adaptive color table. Thus, there is a tradeoff between performance and quality. Empirical testing may be performed with different values for m to examine the effects of various values for m on both performance and quality.

Figure 33:
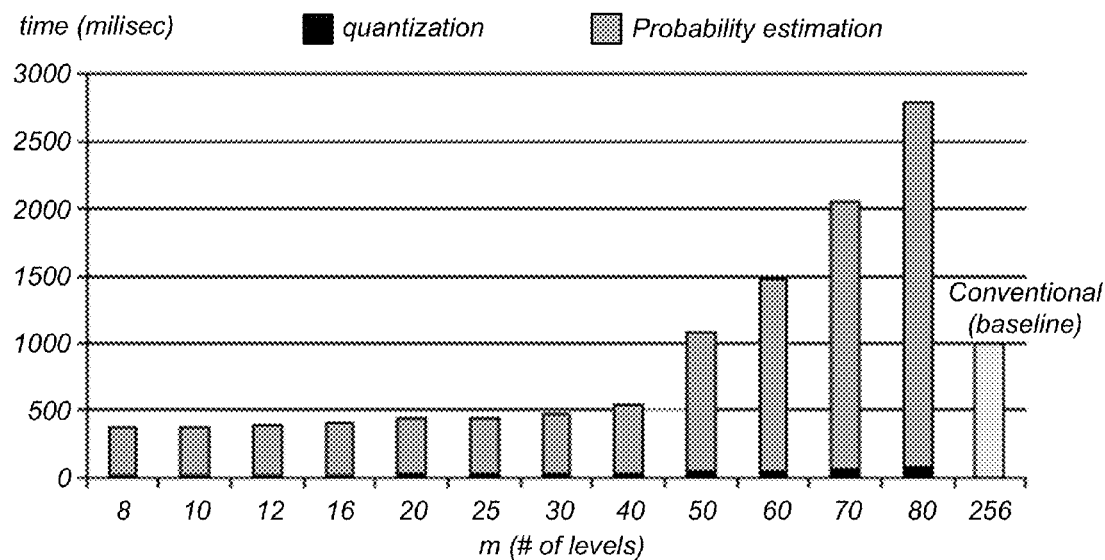
FIG. 33 is a graph of results of an empirical test performed to compare time costs at different levels of quantization, according to some embodiments.

FIG. 33 is a graph of results of an empirical test performed to compare time costs at different levels of quantization (i.e., at different values for m), according to some embodiments. Many examples were tested at different quantization levels (m=[8, 10, 12, 16, 25, 30, 40, 50, 60, 70, 80]), the computational time for both quantization and probability estimation was measured, and the results compiled. In performing the test, sixty-six (66) GMM models were applied to 66 image patches of size 61×61 pixels. FIG. 33 graphs the computational time of both quantization and probability estimation at each of the different quantization levels for one of the tests. The last column shows a baseline computational time generated without using the adaptive lookup table. As can be seen, the quantization time (time to construct the adaptive lookup table) is relatively small. The probability estimation time increases with the number of quantization levels. The time cost is relatively stable when the levels are less than about 40, but rapidly grows at around 50 and above. At 50 levels, the total computational time for this test using the adaptive lookup table is greater than the baseline computational time generated without using quantization and the adaptive lookup table. Thus, according to this empirical testing at least, a quantization level of around 40 or below may be used to provide better performance in regards to computational time.

Figure 34:
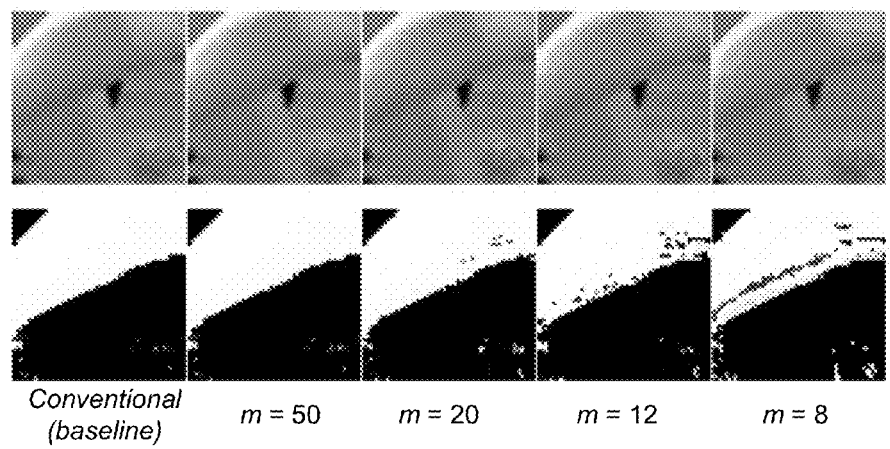
FIG. 34 illustrates image patches and estimated probability maps for several different level of quantization, according to some embodiments.

FIG. 34 illustrates example image patches and estimated probability maps for several different level of quantization, according to some embodiments. Note that these images have been converted to grayscale images from original color images. In FIG. 34, the images in the first row show the original image patch and four patches quantized at four different levels. The leftmost image in the first row shows a baseline image patch reproduced in "full color" (without quantization). The second image in the first row shows the image patch reproduced at m=50, the third at m=20, the fourth at m=12, and the last at m=8. Visual inspection should reveal a gradual degradation in quality, when compared to the "full color" baseline image, as m is reduced.

The second row of images in FIG. 34 show probability maps corresponding to the images in the first row. Although more errors tend to appear when the number of quantization levels decreases, in this test, the resulting probability maps are acceptable for all of the quantization levels with the possible exception of m=8.

Taking into account both time cost and the quality of results resulting from these empirical tests, an "optimal" quantization level of m=~20 may be derived. However, it is to be noted that other quantization levels may be used, and the results may still be satisfactory. Moreover, other empirical tests may generate different results. A general result of these tests is that a quantization level may be determined that provides an acceptable balance between time cost and quality of results. Also note that, in some embodiments, m may be a user-adjustable parameter, and thus users may tune the quantization level to their own preferences.

Figure 35:
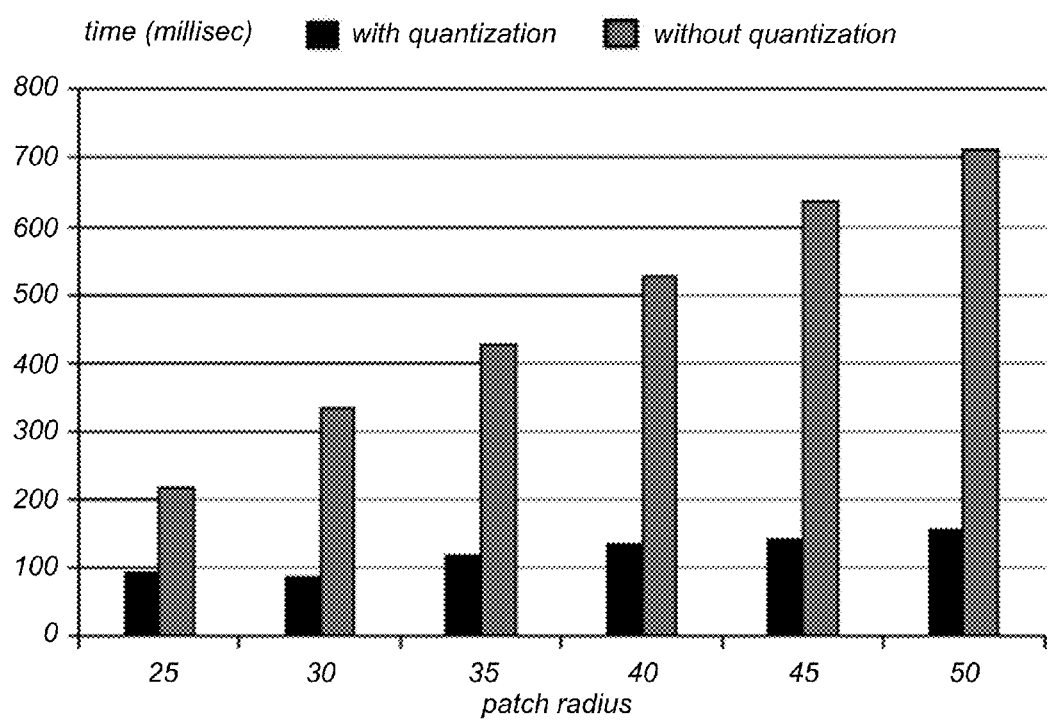
FIG. 35 is a graph that shows the amount of computational time when generating probabilities according to a GMM at a quantization level of 20 compared to generating probabilities according to a GMM without using quantization at various patch sizes.

Patch size may also contribute to performance. FIG. 35 is a graph that shows the amount of computational time when generating probabilities according to a GMM at a quantization level of 20 (m=20) compared to generating probabilities according to a GMM without using quantization at various patch sizes. The number of patches is fixed at 30. The horizontal axis indicates the patch radius. In this embodiment, each dimension of the patch is twice the patch radius plus one. Thus, for example, a patch radius of 25 corresponds to a patch size of 51×51. Note that the time cost when using quantization is clearly less dependent on the patch size than the time cost when not using quantization, while the time of conventional computation linearly increases with the patch radius. For a patch radius of 50, for example, the time is reduced by a factor of 4.6, yet produces very close results in regards to quality. This indicates that using quantization and the adaptive lookup table saves redundant computation.

Figure 36:
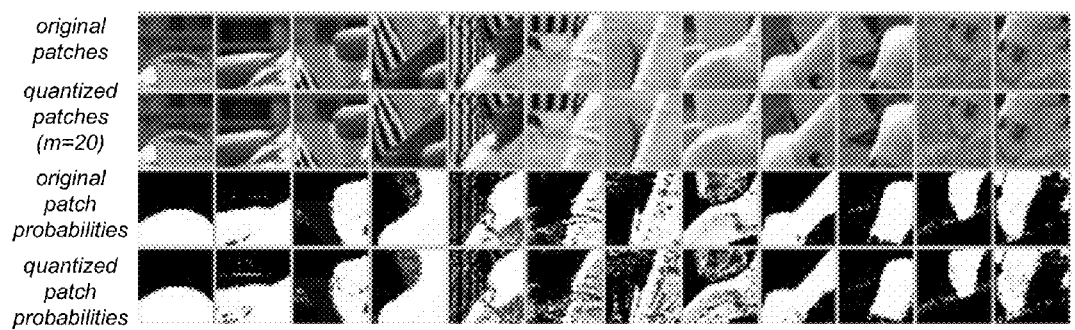
FIGS. 36 and 37 provide additional examples that compare results of using quantization and the adaptive lookup table to results without using quantization and the lookup table.
Figure 37:
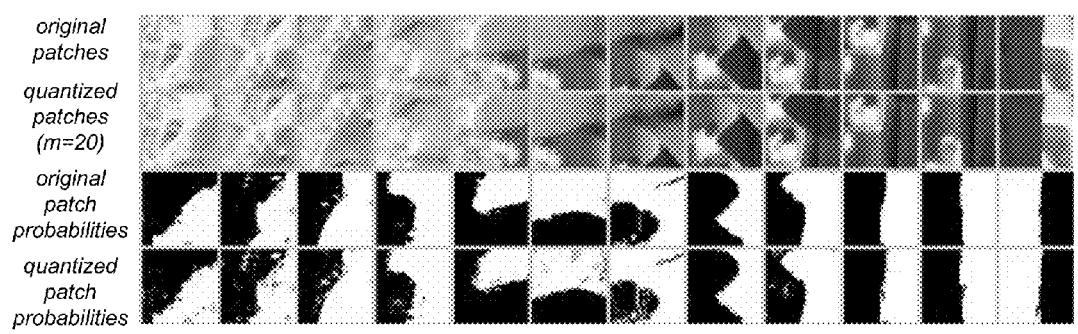

FIGS. 36 and 37 provide additional examples that compare results of using quantization (with m=20) and the adaptive lookup table to results without using quantization and the lookup table. In both Figures, the first row of images are the original patches, the second row of images are the quantized patches (m=20), the third row of images are probability maps generated from the original patches without using quantization and the adaptive lookup table, and the fourth row of images are probability maps generated using quantization and the adaptive lookup table.

Methods and Apparatus for Chatter Reduction in Video Object Segmentation

Embodiments of the methods for automatically determining segmentation in a digital video image sequence described above may propagate an existing segmentation in a current frame to future frame(s). However, when a segmented sequence (e.g., a foreground object composited on a clean background) is played at a normal speed, it may present temporal chattering, a visual artifact to which human eyes are sensitive.

Embodiments of systems, methods, and computer-readable storage media for chatter reduction in video object segmentation are described. The chatter reduction methods may implement two techniques, as described below. A first technique implements a variable bandwidth search region generation method. The second technique implements an optical flow assisted gaussholding method. While these two techniques may be used in combination for reducing chatter, either one may be used separately.

Embodiments of the methods for chatter reduction in video object segmentation may, for example, be applied in some embodiments of the method for automatically determining segmentation in a digital video image sequence described above. However, it is to be noted that embodiments of the methods for chatter reduction in video object segmentation as described below are not limited to such an application. Either one or both of the described techniques may be applied in other video image sequence segmentation methods than the methods described herein, and either one or both of the described techniques may be applied in other image processing tasks than video object segmentation.

Variable Bandwidth Search Region for Video Object Segmentation

Figure 38:
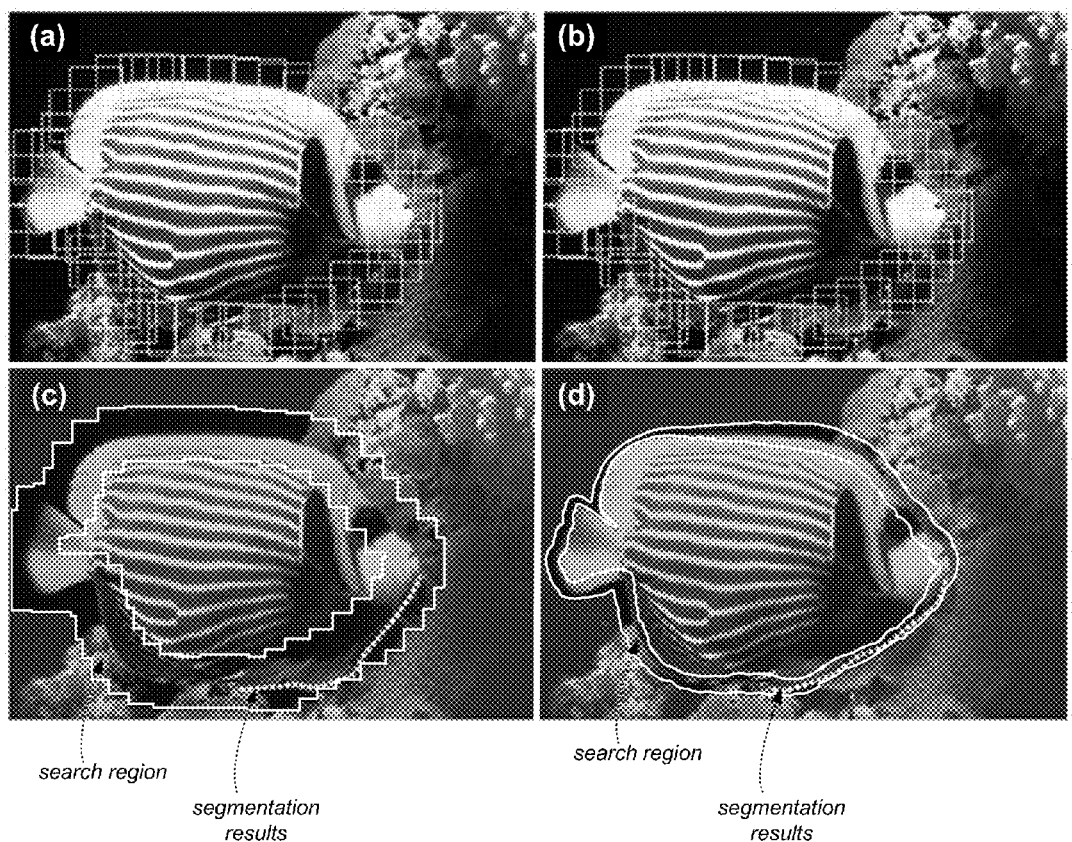
FIG. 38 compares segmentation results without using a variable bandwidth search region method to segmentation results using a variable bandwidth search region method.

Embodiments of the method for automatically determining segmentation in a digital video image sequence described above may propagate an existing segmentation in a current frame to future frame(s), as shown in FIG. 38, images (a) through (c). In FIG. 38, image (a), given the segmentation in frame t, the method creates a set of overlapping local windows around the object boundary. Each local window includes a portion of a contour of an object in the image, and two or more local windows may overlap; collectively, the local windows cover the contour of the object. In FIG. 38, image (b), these windows are propagated to frame t+1. The method predicts the object contour and window positions in frame t+1 by motion estimation (the contour and windows are pushed by motion vectors). In FIG. 38, image (c), the area of the image that is covered by these windows becomes a uniform active band (since all the windows have the same size), referred to herein as a search region, which is indicated by the solid white lines; this is the region in which segmentation is to be performed. Segmentation, for example graph cut segmentation, may be applied inside the search region that is covered by the local windows. However, due to the large search region defined by the local windows, the segmentation may include errors (e.g., including portions of background and/or excluding portions of foreground). Part of the segmentation is shown as a white dashed line in FIG. 38, image (c). Note that a portion of the background is included in the foreground object (the fish). FIG. 38, image (d) illustrates results of a variable bandwidth search region method for video object segmentation applied to the search region shown in FIG. 38, image (c), according to some embodiments. As can be seen in FIG. 38, image (d), the variable bandwidth search region method generates a tighter search region with variable bandwidth, indicated by the solid white lines, which may reduce or eliminate errors that may occur during segmentation given the larger search region as shown in FIG. 38, image (c). Part of the segmentation is shown as a white dashed line in FIG. 38, image (d); note that the portion of the background that would be included by the segmentation as indicated in FIG. 38, image (c) is not included.

In embodiments of the method for automatically determining segmentation in a digital video image sequence, the size of the local windows may be set to be relatively large (e.g., 61×61, or 51×51) to account for motion estimation errors. This may produce an oversized band in the search region, which may increase the chance that the graph cut algorithm will find another strong edge near the true boundary, as shown in FIG. 38, image (c). When working with videos with slowly moving objects, the user often needs to repetitively specify a large number of correction strokes on each frame to stabilize the contours, and the results may still present considerable temporal flickering (chatter) when played at normal speed.

To obtain more stable contours, at least some embodiments of the variable bandwidth search region method may implement the following method that reduces the search range of the graph cut algorithm. This method may be referred to as a variable bandwidth search region method. Embodiments of this method may identify parts of the contour that are moving slowly, and reduce the search region bandwidth in those places to stabilize the segmentation. While embodiments of the variable bandwidth search region method are generally described in relation to embodiments of the method for automatically determining segmentation in a digital video image sequence as described herein, the variable bandwidth search region method may be applied in other segmentation techniques to reduce search region bandwidth.

Figure 39:
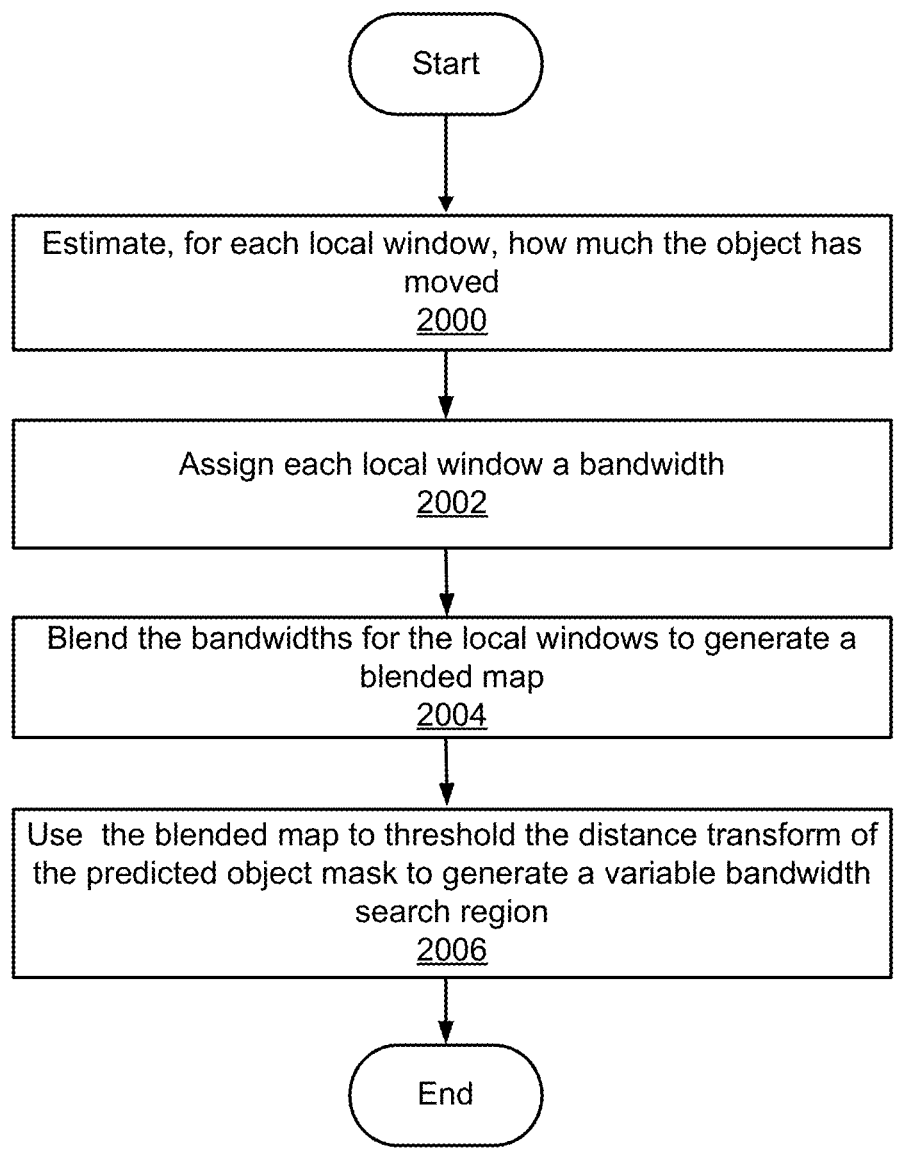
FIG. 39 is a flowchart illustrating a variable bandwidth search region method, according to some embodiments.

FIG. 39—Flowchart of a Variable Bandwidth Search Region Method

FIG. 39 is a flowchart illustrating a variable bandwidth search region method, according to at least some embodiments. Embodiments of the method shown in FIG. 39 may, for example, be applied in some embodiments of the method for automatically determining segmentation in a digital video image sequence as described herein to reduce the region of uncertainty (referred to herein as the search region) used in the graph cut method, for example as illustrated in FIG. 7. The method illustrated in FIG. 39 may be used in conjunction with embodiments of the computer system shown in FIG. 1, among other devices. The method illustrated in FIG. 39 may be implemented in an image analysis module such as image analysis module shown in FIG. 2. In various embodiments, some of the method elements shown may be performed concurrently, in a different order than shown, or may be omitted. Additional method elements may also be performed as desired. Any of the method elements described may be performed automatically (i.e., without user intervention).

While FIG. 39 is directed to applying the variable bandwidth search region method to a video frame, note that the variable bandwidth search region method may be applied to multiple frames in a video sequence to generate variable bandwidth search regions for each of the multiple frames.

Motion Detection

As indicated at 2000 of FIG. 39, embodiments of the variable bandwidth search region method may estimate, for each local window in a current image, how much the object has moved in relation to the object in a corresponding local window in a previous (or next) image. The optical flow in the local window is a natural measurement, but not always reliable. Therefore the method may add the SSD (sum of square distances) as another metric. Specifically, $$SSD_i = \frac{1}{N} \sum_x D^2(I^t(x), I^{t+1}(x)), x \in W_i^t$$

where $SSD_i$ is the normalized SSD for $i^{th}$ window $W_i^t$ in frame t, x is the pixel position in the image, and $I^t(x)$ and $I^{t+1}(x)$ are the RGB color vectors at x in frame t and t+1 respectively (in at least some embodiments, the frames may be low pass filtered for robustness). $D^2$ (.,.) gives the square distance between two color vectors. N is the number of pixels in $W_i^t$.

Figure 40:
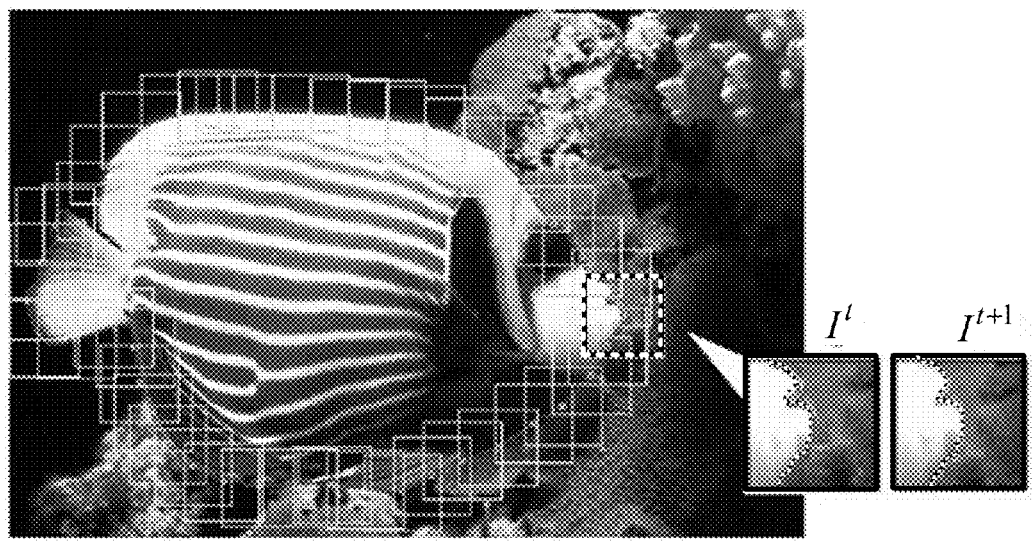
FIG. 40 illustrates that sum of square distances (SSD) may be defined as the patch difference between the frame t and frame t+1, according to some embodiments.

As illustrated in FIG. 40, SSD may be defined as the patch difference between the frame t and frame t+1. Note that the patches are cropped at the same location within the windows in frame t.

Some embodiments may use other methods than those described above to estimate, for each local window, how much the object has moved.

Reducing the Search Range

As indicated at 2002 of FIG. 39, each local window is assigned a bandwidth $d_i$. In some embodiment, $d_i$ may be determined from the optical flow and SSD, as estimated in the previous section.

Figure 41:
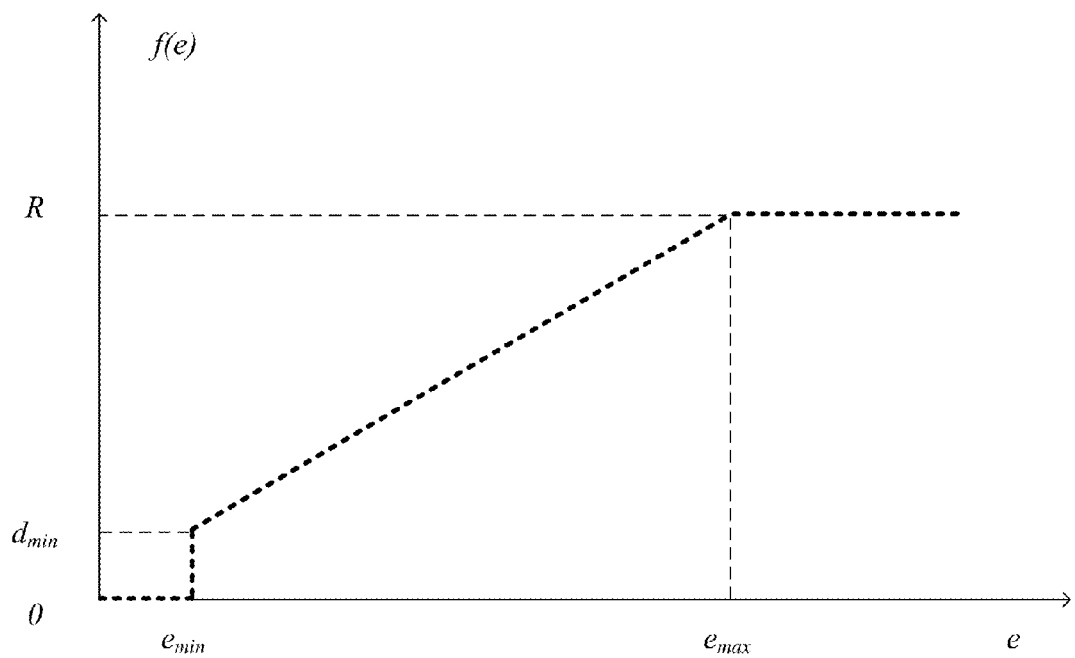
FIG. 41 illustrates the relationship between the bandwidth and the local SSD according to some embodiments.

FIG. 41 illustrates the relationship between the bandwidth and the local SSD according to some embodiments. When $SSD_i$ is sufficiently small (below a minimum threshold $e_{min}$), the method considers the image as not changing inside the local window; thus, the segmentation will be identical to the previous frame. As shown in FIG. 41, in at least some embodiments, $d_i$ is modulated by $e=\sqrt{SSD_i}$ as a piecewise linear function $f(e)$:

$$f(e) = \begin{array}{l} 0, \qquad\qquad\qquad\qquad\qquad e \leq e_{min} \\ d_{min} + \frac{R - d_{min}}{e_{max} - e_{min}}(e - e_{min}), \ e_{min} < e \leq e_{max} \\ R, \qquad\qquad\qquad\qquad\qquad e_{max} < e \end{array}$$

A large $SSD_i$ indicates that the object is moving fast in the local region; thus, a larger search range (upper bounded by window radius R) may be required to capture the boundary. When $SSD_i$ is very small ($e<e_{min}$), the bandwidth shrinks down to zero so that the contour is completely stabilized. In at least some embodiments, when $SSD_i$ is large ($e>e_{max}$), the bandwidth is set to the window radius R. In some embodiments, $e_{min}$ may be set at 3.0 and $e_{max}$ at 50.0. Other embodiments may use other values for $e_{min}$ and/or $e_{max}$. In some embodiments, $e_{min}$ and $e_{max}$ may be user-specified values.

In at least some embodiments, a local optical flow value $F_i$ for the window may also be computed. $d_i$ then takes the value 0 if $e<e_{min}$ or the larger value of f(e) and the magnitude $|F_i|$ of local optical flow if $e \geq e_{min}$:

$$d_i = \begin{cases} 0, & e < e_{min} \\ \max\{f(e), |F_i|\} & e \geq e_{min} \end{cases}$$

Figure 42:
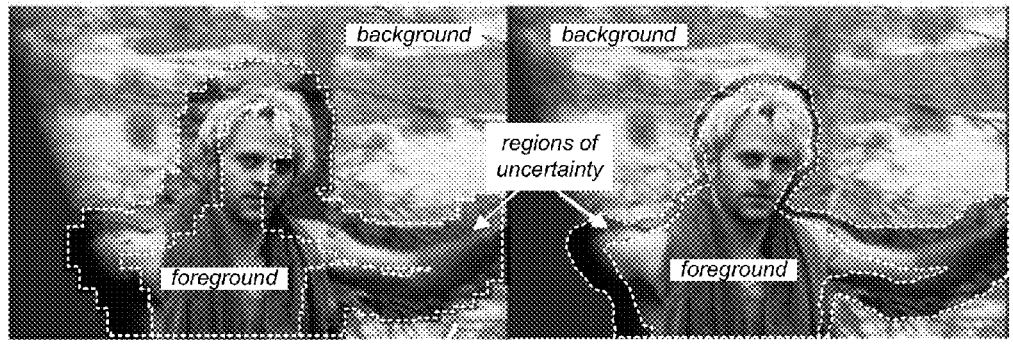
FIGS. 42 and 43 compare search regions generated without applying the variable bandwidth search region method to search regions generated according to an embodiment of the variable bandwidth search region method.
Figure 43:
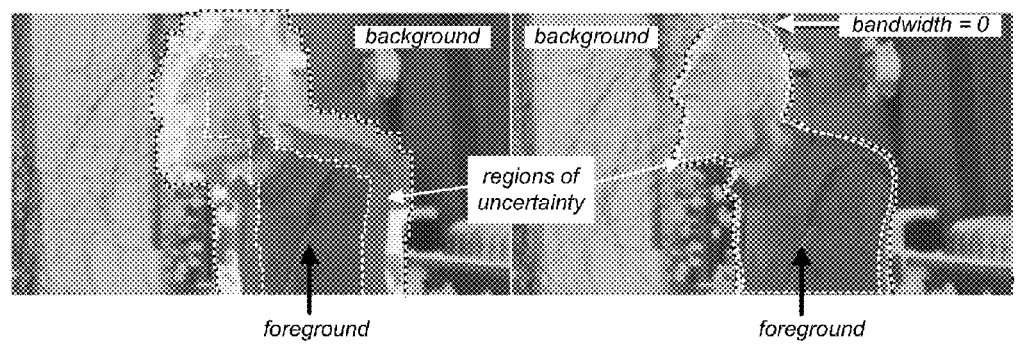

As indicated at 2004 of FIG. 39, the computed bandwidths are blended together across windows to generate a blended map that provides a smooth transition between windows, as shown in the right-hand frames in FIGS. 42 and 43. In some embodiments, the following function may be applied to blend the bandwidths:

$$T(x) = \frac{\sum_i \omega_i(x) d_i}{\sum_i \omega_i(x)},$$

where $\omega_i(x)$ is a weight function that weights each pixel x according to its distance to the center of window i:

$$\omega_i(x) = (|x - c_i| + 1)^{-1}$$

and i iterates over all windows that cover pixel x. c is the center of window i.

As indicated at 2006 of FIG. 39, in at least some embodiments, the method uses the blended map to threshold the distance transform of the predicted object mask, which produces the final variable width band as the region of uncertainty, or search region. In some embodiments, the following may be applied to threshold the distance transform of the predicted object mask to produce the region of uncertainty U, which is the variable width search region, and which may be used in a video segmentation technique such as the method for automatically determining segmentation in a digital video image sequence described herein:

$$U = \{x | -T(x) < DT(x) < T(x)\}$$

where DT(x) is the value of a signed distance transform of the predicted object mask at location x. The predicted object mask is the binary mask created by warping the contour of the known binary mask on the previous frame, using the optical flow field computed between the two frames.

Example Results

FIGS. 42 and 43 illustrate examples comparing regions of uncertainty produced without applying the variable bandwidth search region method and regions of uncertainty when applying the variable bandwidth search region method. The left image in FIG. 42 illustrates a search region (the region of uncertainty) generated without applying the variable bandwidth search region method. The right image in FIG. 42 illustrates a variable bandwidth search region (the region of uncertainty) produced by the variable bandwidth search region method. As shown in the right image, the local bandwidth of the region of uncertainty adapts to local motion, and creates a wider band where the object is moving fast.

The left image in FIG. 43 illustrates a search region (the region of uncertainty) generated without applying the variable bandwidth search region method. The right image in FIG. 43 illustrates a variable bandwidth search region (the region of uncertainty) produced by the variable bandwidth search region method. The bandwidth of region of uncertainty may be zero if the motion is very small (as indicated by the arrow at the top right). In such a region, the segmentation may duplicate the result from the previous frame.

Optical Flow Assisted Gaussholding for Chatter Reduction in Video Object Segmentation Embodiments of the method for automatically determining segmentation in a digital video image sequence described above may produce a binary segmentation mask for each video frame. With the interactive tools provided by the system, the user is able to achieve fairly accurate segmentation on each individual frame. However, when the segmented sequence (a foreground object composited on clean backgrounds) is played at a normal speed, it may present temporal chattering, a visual artifact to which human eyes are sensitive. Embodiments of an optical flow assisted gaussholding method are described that may be used as a post-processing technique to reduce such temporal chattering by smoothing the contours of segmentation masks in video frames.

In general, gaussholding is a boundary-smoothing operation which uses a convolution followed by a threshold operation. In at least some embodiments, gaussholding may be applied across both time and space. This may be done by computing a (weighted) average of the segmentation masks for a sequence of frames including a current frame, and then applying a spatial Gaussian convolution kernel, followed by a thresholding operation, to generate a smoothed segmentation mask for the current frame. In the optical flow assisted gaussholding method, for each frame of at least some frames in a video sequence including a plurality of frames, for each of one or more other frames prior to and one or more other frames subsequent to the current frame, optical flow is computed for the other frame in relation to the current frame and used to warp the contour of the segmentation mask of the other frame. To warp the contour, for each point on the contour, the locally smoothed flow vector is found, and the contour point is moved to follow the motion vector. After the contours for the other frames are warped, the regions enclosed by the warped contours are the warped segmentation masks for the other frames. The weighted average of the warped segmentation masks and the segmentation mask of the current frame is then computed. The weighted average may be blurred spatially to generate a smoothed mask for the current frame. For example, a spatial Gaussian convolution kernel or other spatial convolution technique may be applied to the weighted average to generate an initial smoothed mask for the current frame. Since an average was taken, some values along the contour of the initial smoothed mask (e.g., an alpha channel mask in an RGBA image) may be between binary true background and true foreground values, for example between 0.0 and 1.0, or between 0 and 255, assuming an 8-bit alpha channel. Thus, in at least some embodiments, the initial smoothed mask may be thresholded to produce a binary smoothed mask (i.e., a mask where background pixels are 0 and foreground pixels are 255, assuming an 8-bit alpha channel.) In at least some embodiments, the initial smoothed mask may be thresholded at 0.5, assuming values between 0.0 and 1.0. As an example of thresholding at 0.5, assuming an 8-bit alpha channel mask where background values are 0 and foreground values are 255, alpha channel values from 0 to 127, inclusive, would be set to 0, and alpha channel values between 128 and 255, inclusive, would be set to 255.

In some embodiments, as an alternative to applying a spatial convolution technique (e.g., a spatial Gaussian) to the weighted average of the warped segmentation masks and the segmentation mask for the current frame, the spatial convolution technique may be applied to each warped segmentation mask and to the segmentation mask for the current frame before computing the weighted average of the masks.

As noted above, the optical flow assisted gaussholding method may be applied to multiple frames in a video sequence. In at least some embodiments, the original segmentation masks of the frames are used when applying the method to each frame. That is, the smoothed or warped masks generated for one frame are not used as input to the method for another frame.

While embodiments of the optical flow assisted gaussholding method are described herein as a post-processing technique for video frame masks generated by a method for automatically determining segmentation in a digital video image sequence described herein, it is to be noted that the optical flow assisted gaussholding method may be applied to video frame masks generated by other automated or manual methods.

Gaussholding

In general, gaussholding is a boundary-smoothing operation which uses a convolution followed by a threshold operation. In at least some embodiments, gaussholding may be applied across both time and space. This may be done by computing a (weighted) average of the segmentation masks for a sequence of frames including a current frame, and then applying a spatial Gaussian convolution kernel, followed by a thresholding operation, to generate a smoothed segmentation mask for the current frame. Given the masks on three consecutive frames $M_{t-1}$, $M_t$ and $M_{t+1}$, the new mask on frame t is computed as:

$$\overline{M}_t = \frac{1-w}{2}(M_{t-1} + M_{t+1}) + w \cdot M_t$$

where:

$$w = \frac{r}{r+2}$$

In at least some embodiments, $M_t(x)=255$ for pixel x inside the object and $M_t(x)=0$ for x outside the object. r is a parameter controlling how much the center frame is favored against the neighboring frames. It may be derived that the ratio of the weights assigned to the three frames is 1:r:1. After the averaging, $\overline{M}_t$ may be further smoothed by a spatial Gaussian filter. The result is then used to create a hard or soft mask depending on the application.

Figure 44:
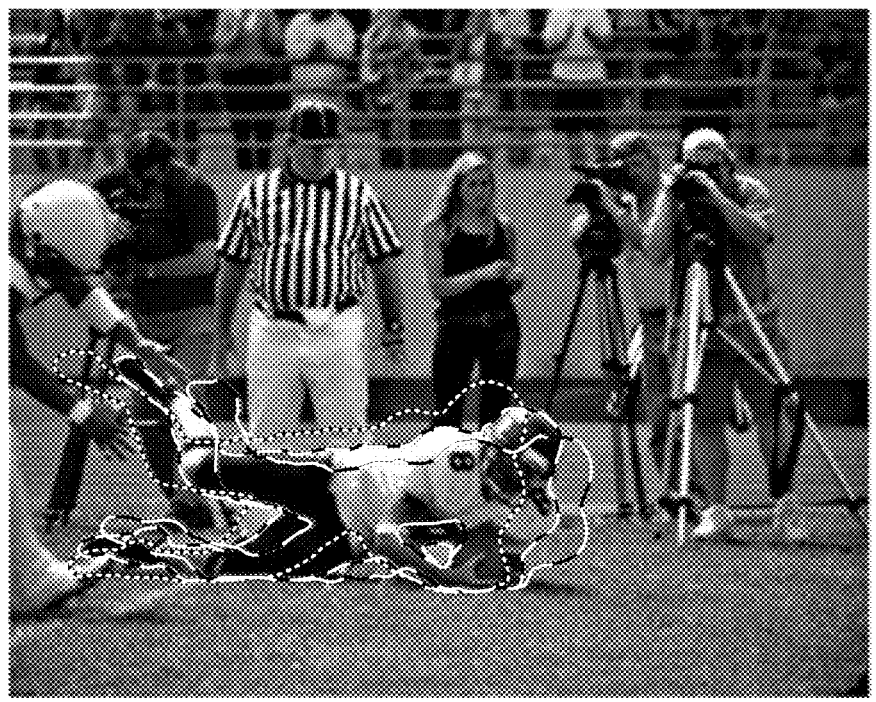
FIG. 44 shows a video frame with segmentation contours superimposed on frame t.
Figure 45:
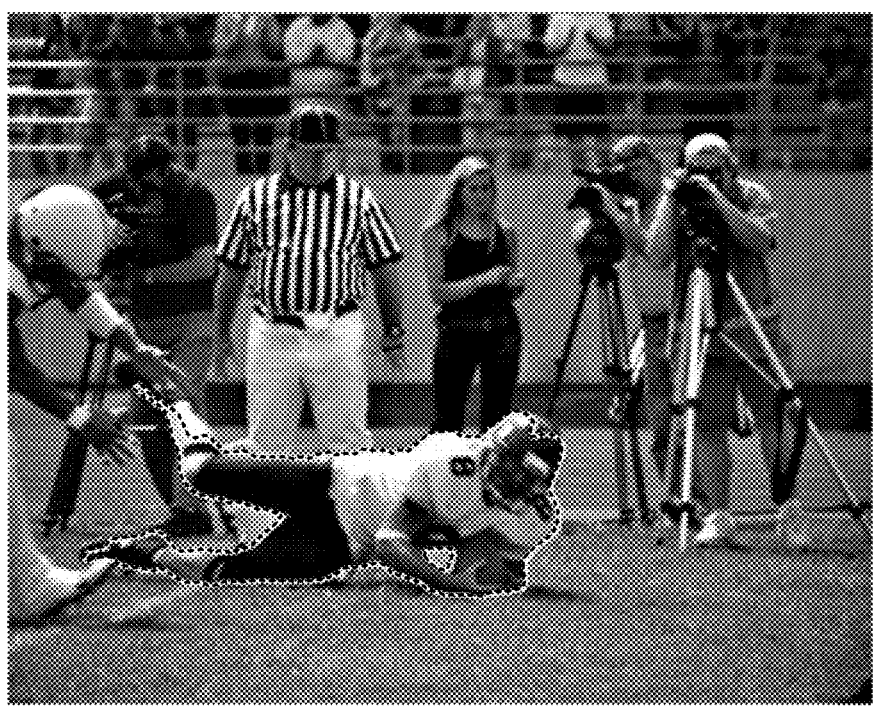
FIG. 45 shows the mask contour of frame t after gaussholding without optical flow alignment.

However, directly averaging the masks of adjacent frames may result in severe errors in cases of intensive nonlinear motion. FIG. 44 shows a video frame with segmentation contours superimposed on frame t. The three curves correspond to the contour of segmentation mask on frames t−1 (short dashes/dots), t (medium dashes) and t+1 (long dashes), respectively. In FIG. 44, the smoothed mask $\overline{M}_t$ is computed as a weighted average of segmentation masks $M_{t-1}$, $M_t$, and $M_{t+1}$. FIG. 45 shows the mask contour of frame t after gaussholding is applied. Note the errors around the player's helmet and right leg. The result clearly contains significant errors, as can be seen in FIG. 45.

Figure 46:
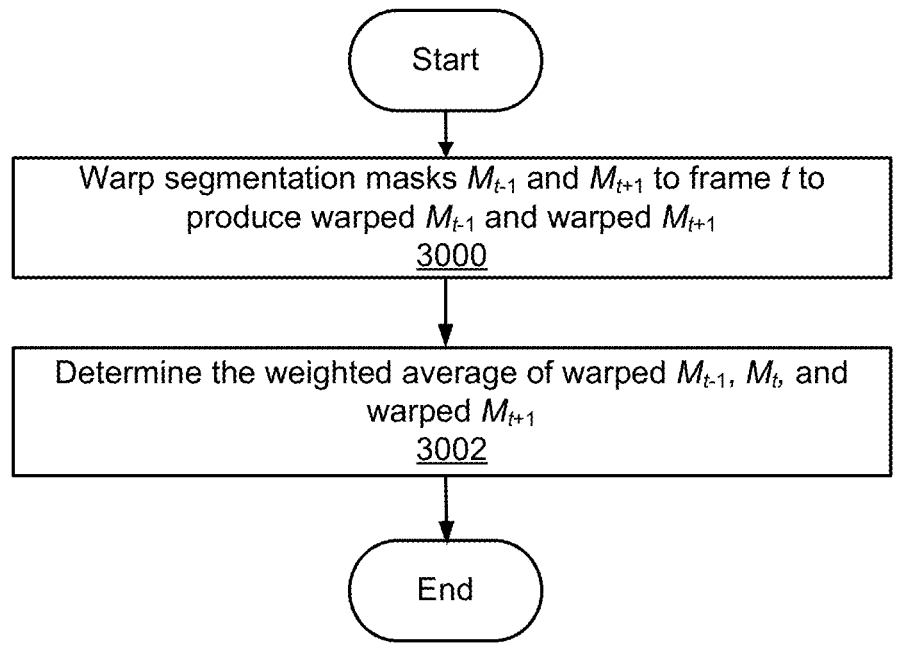
FIGS. 46 and 47 are flowcharts illustrating an optical flow assisted gaussholding method, according to some embodiments.
Figure 47:
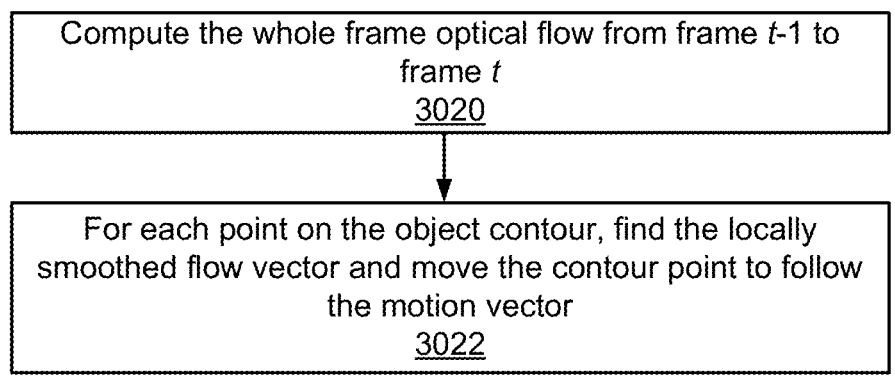

FIGS. 46 and 47—Flowchart of an Optical Flow Assisted Gaussholding Method

FIGS. 46 and 47 are flowcharts illustrating an optical flow assisted gaussholding method, according to at least some embodiments. Embodiments of the methods shown in FIGS. 46 and 47 may, for example, be applied in some embodiments of the method for automatically determining segmentation in a digital video image sequence as described herein to smooth a segmentation mask generated according to the graph cut method, for example as illustrated in FIG. 7. The method illustrated in FIGS. 46 and 47 may be used in conjunction with embodiments of the computer system shown in FIG. 1, among other devices. The methods illustrated in FIGS. 46 and 47 may be implemented in an image analysis module such as image analysis module shown in FIG. 2. In various embodiments, some of the method elements shown may be performed concurrently, in a different order than shown, or may be omitted. Additional method elements may also be performed as desired. Any of the method elements described may be performed automatically (i.e., without user intervention).

While FIGS. 46 and 47 are directed to applying the optical flow assisted gaussholding method to a video frame, note that the optical flow assisted gaussholding method may be applied to multiple frames in a video sequence to reduce or eliminate chatter in each of the multiple frames.

As indicated at 3000 of FIG. 46, segmentation masks $M_{t-1}$ and $M_{t+1}$ may both be warped to frame t. Embodiments of an optical flow assisted gaussholding method may use optical flow to align the segmentation masks towards the center frame t before applying the averaging operation. Specifically, the mask contour on a neighboring frame ($C_{t-1}$ or $C_{t+1}$) is pushed by the locally smoothed optical flow fields ($f_{t-1 \to t}$ or $f_{t+1 \to t}$).

In some embodiments, the process of warping $M_{t-1}$ to frame t may be performed as illustrated in FIG. 47. As indicated at 3020 of FIG. 47, the whole frame optical flow may be computed from frame t−1 to frame t. As indicated at 3022 of FIG. 47, for each point on the object contour, the locally smoothed flow vector is found (taking the average of the flow vectors around that point inside the object region), and then the contour point is moved to follow the motion vector. The region enclosed by the new contour is now the warped mask $M^*_{t-1}$.

A similar method as that illustrated in FIG. 47 may be applied for $M_{t+1}$ to produce warped mask $M^*_{t+1}$, except that the optical flow field is computed from frame t+1 to frame t.

As indicated at 3002 of FIG. 46, the method then determines the weighted average of $M^*_{t-1}$, $M_t$, and $M^*_{t+1}$ to generate a smoothed contour as the result. In some embodiments, the following may be used to determine the weighted average:

$$\overline{M}_t = \frac{1-w}{2}(M^*_{t-1} + M^*_{t+1}) + w \cdot M_t$$

where w is a weight function:

$$w = \frac{r}{r+2}$$

and where r is the amount of favoring the center frame against the neighboring frames, which means that the weights assigned to the three frames are 1, r, 1. Note that a value for r that is close to 1.0 tends to weight all frames equally, giving the strongest de-chatter effect, but can suffer from artifacts when narrow objects are moving faster than their width on every frame and the optical flow fails to detect this motion; larger values for r tend to weight the center frame more, gradually reducing the strength of the effect, therefore tending to reduce such artifacts.

Note that other weight functions may be used in various embodiments.

While the optical flow assisted gaussholding method as described in FIGS. 46 and 47 operates on three frames, embodiments of the optical flow assisted gaussholding method may be adapted to operate on more than three frames, for example five frames, seven frames, and so on. In addition, the method may be adapted to make multiple passes operating on a different number of frames each pass, for example on three frames on the first pass, five frames on the second pass, and so on.

Figure 48:
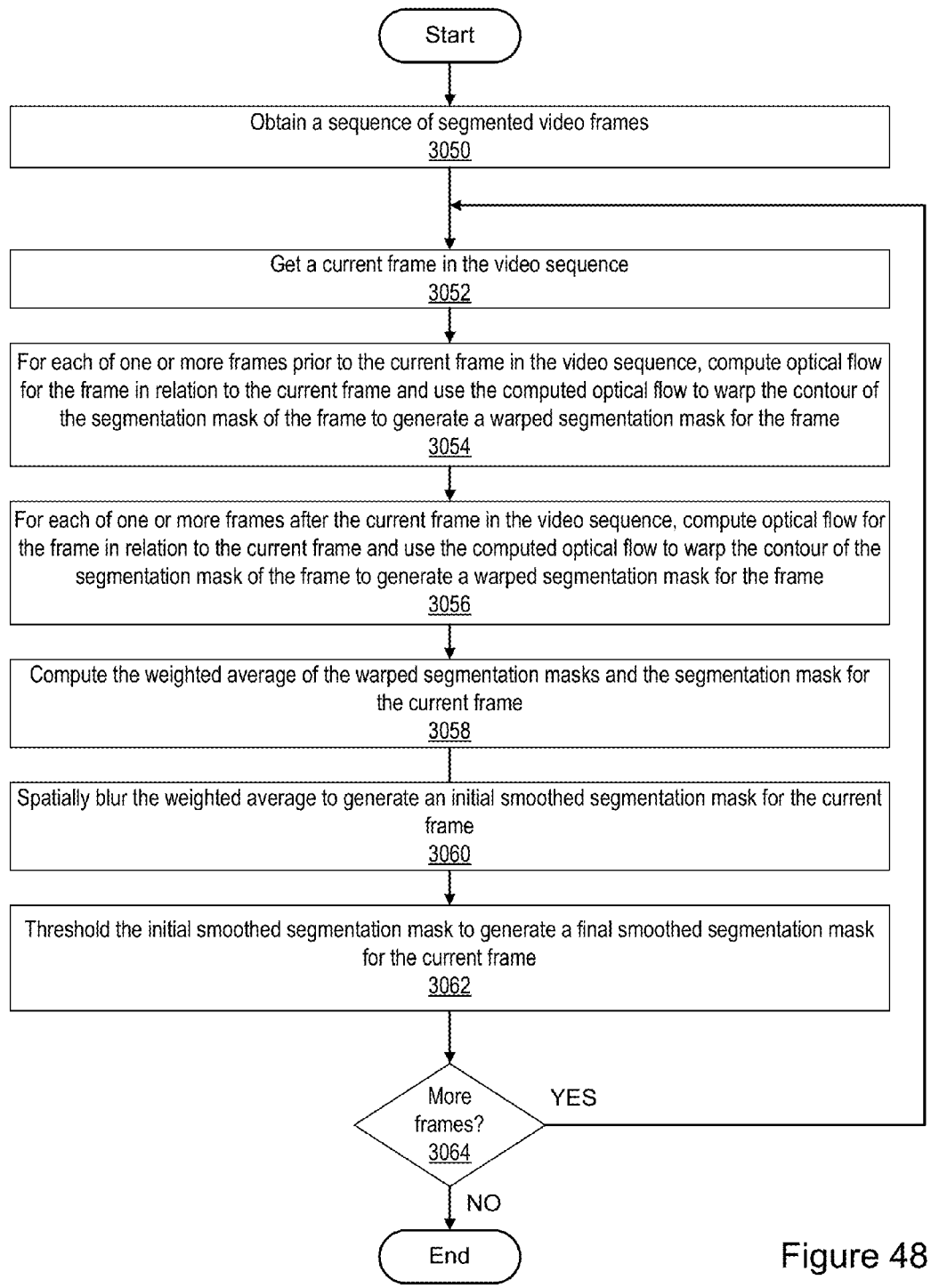
FIG. 48 is a flowchart illustrating a generalized optical flow assisted gaussholding method, according to some embodiments.

FIG. 48—Generalized Flowchart of an Optical Flow Assisted Gaussholding Method

FIG. 48 is a flowchart illustrating a generalized optical flow assisted gaussholding method, according to at least some embodiments. Embodiments of the method shown in FIG. 48 may, for example, be applied in some embodiments of the method for automatically determining segmentation in a digital video image sequence as described herein to reduce the search region used in the graph cut method, for example as illustrated in FIG. 7. The method illustrated in FIG. 48 may be used in conjunction with embodiments of the computer system shown in FIG. 1, among other devices. The method illustrated in FIG. 48 may be implemented in an image analysis module such as image analysis module shown in FIG. 2. In various embodiments, some of the method elements shown may be performed concurrently, in a different order than shown, or may be omitted. Additional method elements may also be performed as desired. Any of the method elements described may be performed automatically (i.e., without user intervention).

As indicated at 3050, a sequence of segmented video frames may be obtained. For example, each frame may be a four-channel RGBA (Red, Green, Blue, Alpha) image. The alpha channel may represent the segmentation mask for the frame. For example, assuming an 8-bit channel, background may be represented in the mask by the value 0 in the alpha channel, and foreground may be represented in the mask by the value 255 in the alpha channel. Note that these values may be inverted, that is 0 may represent foreground and 255 may represent background. Also note that the segmentation mask may be represented in other ways than as an alpha channel mask.

As indicated at 3050, a current frame in the video sequence may be obtained. As indicated at 3052, for each of one or more frames prior to the current frame, optical flow is computed for the frame in relation to the current frame. The computed optical flow is then used to warp the contour of the segmentation mask of the frame to generate a warped segmentation mask for the frame. As indicated at 3054, for each of one or more frames after the current frame, optical flow is computed for the frame in relation to the current frame. The computed optical flow is then used to warp the contour of the segmentation mask of the frame to generate a warped segmentation mask for the frame.

As indicated at 3058, the weighted average of the warped segmentation masks and the segmentation mask for the current frame is computed to generate an initial smoothed segmentation mask for the current frame. As indicated at 3060, the weighted average may be blurred spatially to generate a smoothed mask for the current frame. For example, a spatial Gaussian convolution kernel or other spatial convolution technique may be applied to the weighted average to generate a smoothed mask for the current frame. As indicated at 3062, the initial smoothed segmentation mask may be thresholded to generate a final smoothed segmentation mask for the current frame.

At 3064, if there are more frames in the video sequence to be processed, the method returns to 3052 to obtain another frame as the current frame. Otherwise, the method is done.

In some embodiments, as an alternative to applying a spatial convolution technique (e.g., a spatial Gaussian) to the weighted average of the warped segmentation masks and the segmentation mask for the current frame, the spatial convolution technique may be applied to each warped segmentation mask and to the segmentation mask for the current frame before computing the weighted average of the masks.

Figure 49A:
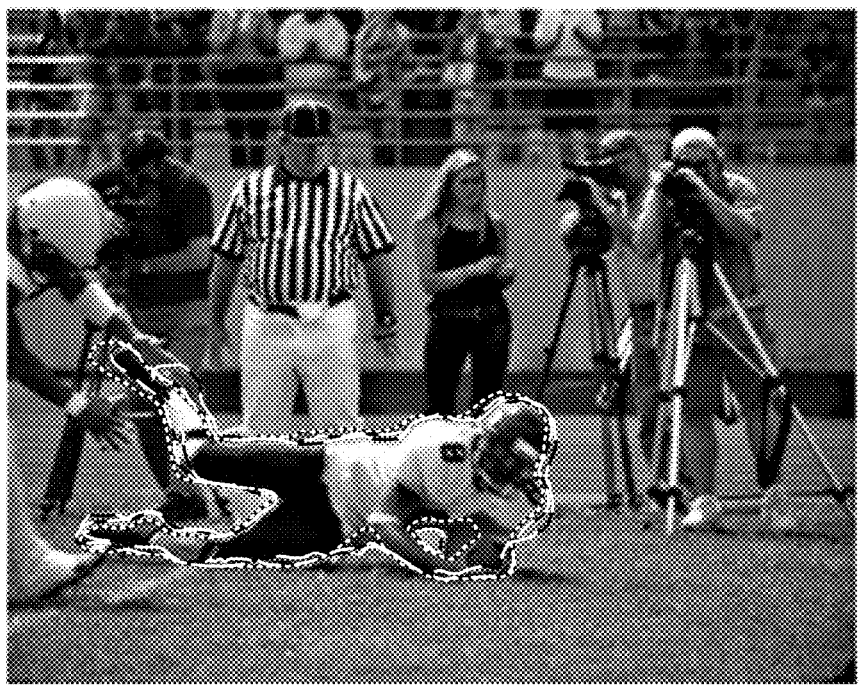
FIG. 49A shows mask contours after optical flow warping, according to some embodiments.
Figure 49B:
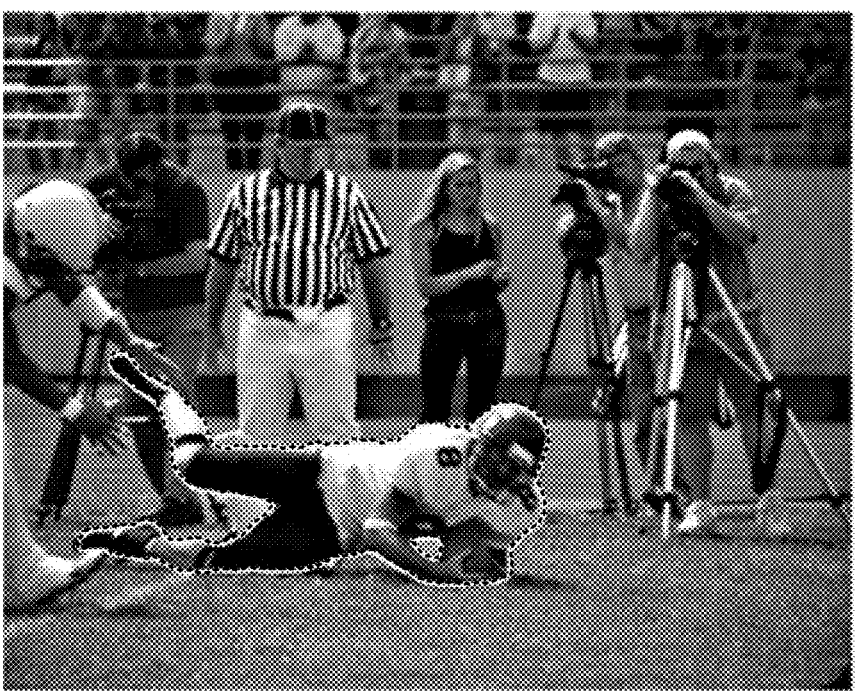
FIG. 49B shows a mask contour of frame t after optical flow assisted gaussholding is applied, according to some embodiments.

FIGS. 49A and 49B show examples of warped contours, for example as generated at 3000 of FIG. 46, and the final smoothed result, respectively. FIG. 49A shows the mask contours after optical flow warping. The dashed curves correspond to the warped contours of the segmentation mask on frames t−1 (short dashes/dots), t (medium dashes) and t+1 (long dashes), respectively. FIG. 49B shows the mask contour of frame t after optical flow assisted gaussholding is applied. Note that the smoothed contour shown in FIG. 49B may be more accurate than the contour shown in FIG. 49A.

Example Results and Comparisons

Figure 50A:
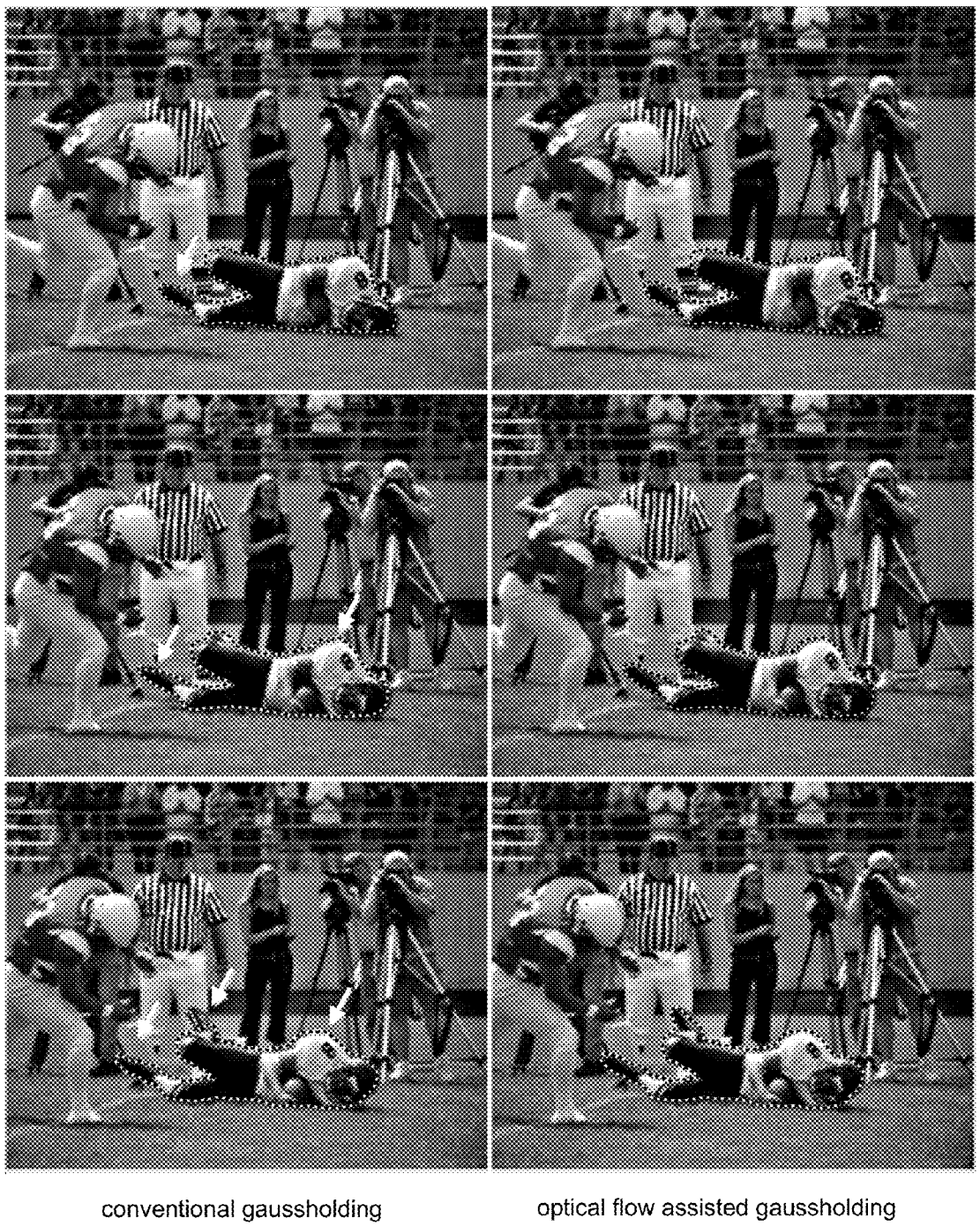
FIGS. 50A through 50C show results of applying optical flow alignment in gaussholding according to some embodiments, and compares these results to results of gaussholding without optical flow alignment.
Figure 50B:
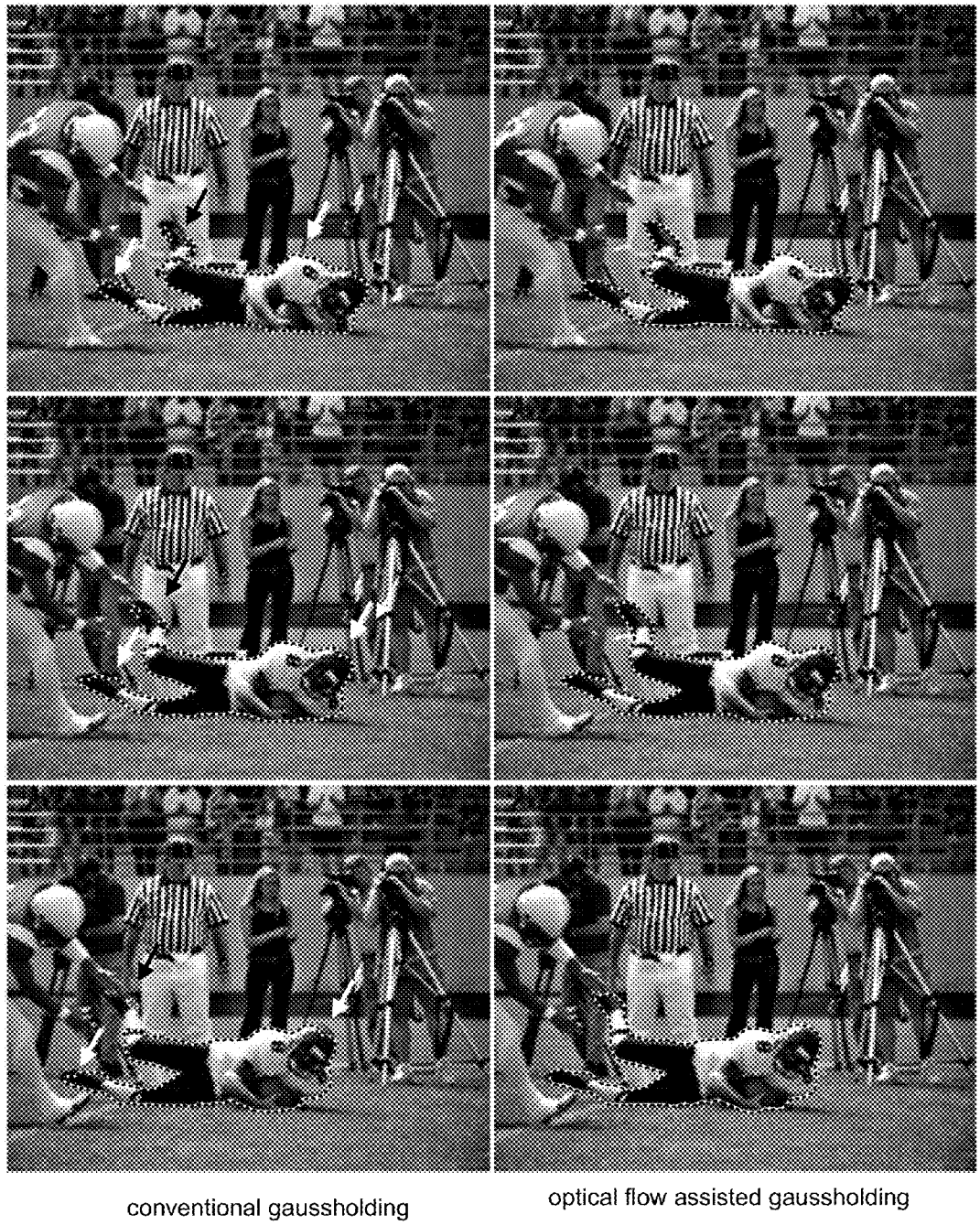
Figure 50C:
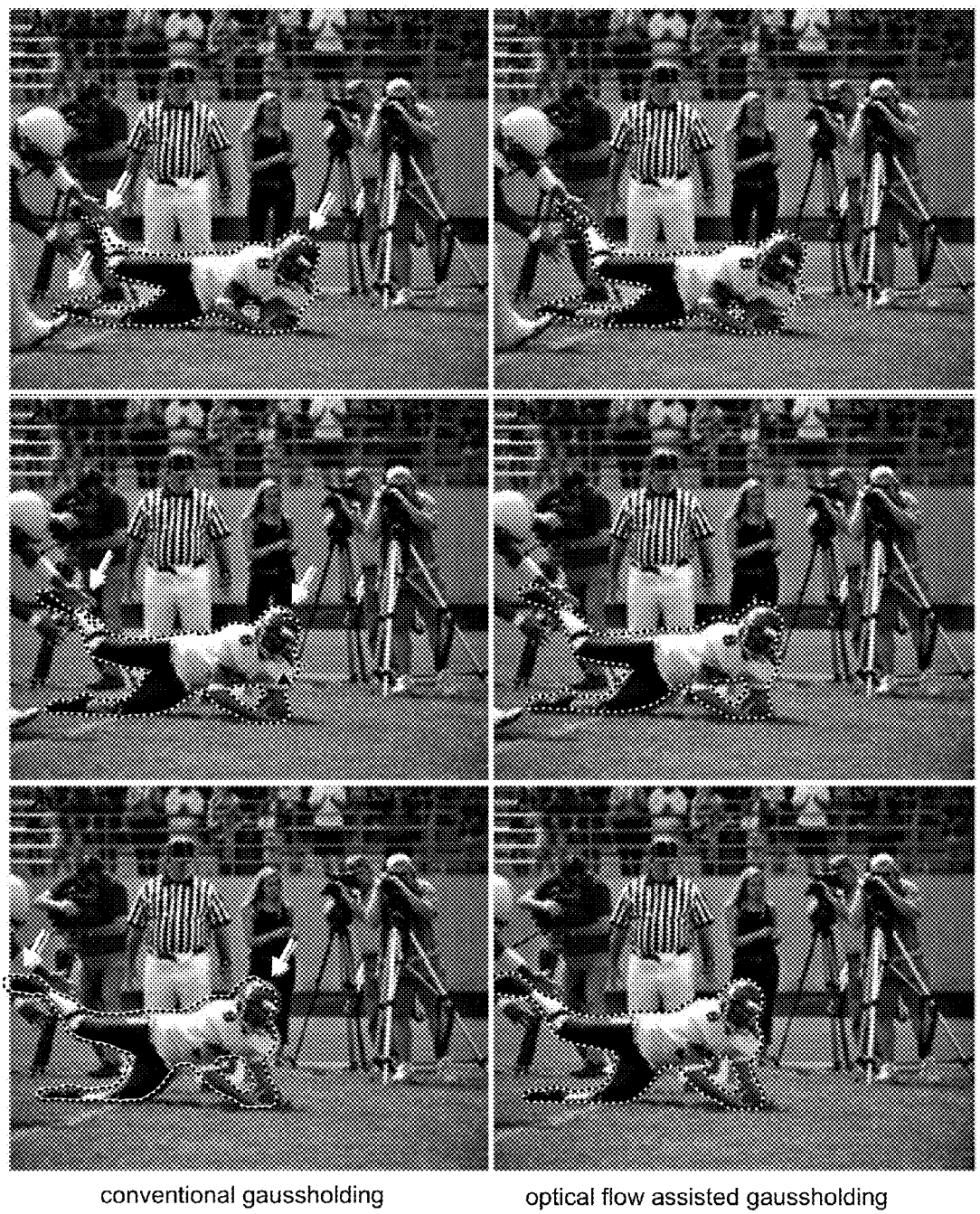

FIGS. 50A through 50C show example results of applying optical flow alignment in gaussholding according to some embodiments, and compares these results to results of gaussholding without optical flow alignment. The frames in the left column of each of these Figures show the smoothed segmentation sequence generated according to gaussholding without optical flow alignment. The frames in the right column of each of these Figures show the smoothed segmentation sequence with optical flow assisted gaussholding. In each of these Figures, the arrows in the left column indicate smoothing artifacts resulting from gaussholding without optical flow alignment, which are successfully removed by the optical flow assisted gaussholding method, as shown by corresponding frames in the right column.

Figure 51:
FIG. 51 compares results of gaussholding without optical flow alignment to results of optical flow assisted gaussholding according to some embodiments.

FIG. 51 compares results of gaussholding without optical flow alignment (left column of frames) to results of optical flow assisted gaussholding (right column of frames) according to some embodiments. The smoothed contours are shown as dashed lines. The arrows in the frames of the left column indicate smoothing artifacts resulting from gaussholding without optical flow alignment, which are successfully removed by the optical flow assisted gaussholding method, as shown by corresponding frames in the right column.

Figure 52:
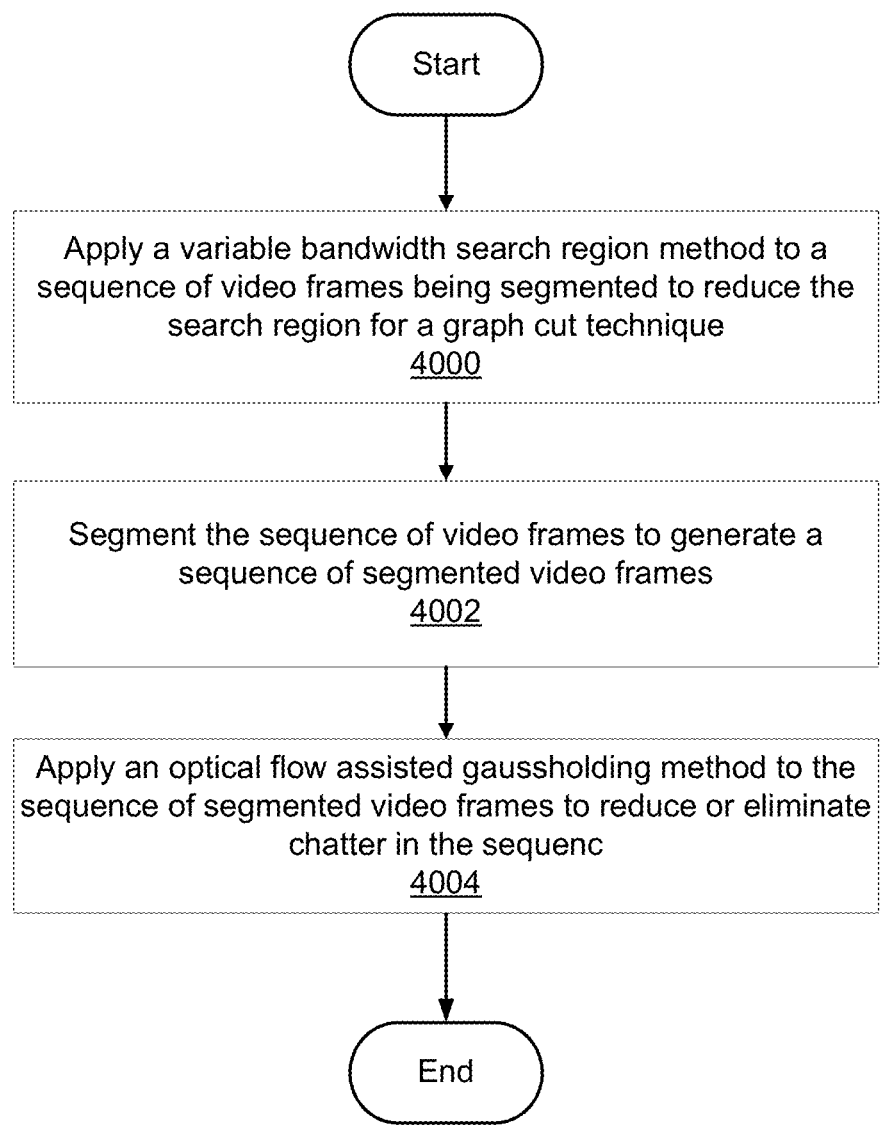
FIG. 52 is a flowchart that illustrates applying the variable bandwidth search region method and the optical flow assisted gaussholding method as described herein to reduce chatter in a sequence of segmented video frames according to some embodiments.

Using the Variable Bandwidth Search Region and Optical Flow Assisted Gaussholding in Combination to Reduce Chatter FIG. 52 is a flowchart that illustrates applying the variable bandwidth search region method and the optical flow assisted gaussholding method as described herein to reduce chatter in a sequence of segmented video frames according to some embodiments. As indicated at 4000, a variable bandwidth search region method, for example as illustrated in FIGS. 38 through 43, may be applied to a sequence of video frames being segmented to reduce the search region for a graph cut technique implemented by a video image segmentation technique such as embodiments of the automatic video image segment technique described in FIGS. 1 through 37. As indicated at 4002, the sequence of video frames may be segmented, for example according to a graph cut technique, to generate a sequence of segmented video frames. In a post-processing step, an optical flow assisted gaussholding method, for example as illustrated in FIGS. 44 through 51, may be applied to the sequence of segmented video frames to reduce or eliminate chatter in the sequence, as indicated at 4004.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A method, comprising:
    obtaining a video sequence comprising a plurality of frames and a plurality of segmentation masks each corresponding to one of the plurality of frames; and
    generating a smoothed segmentation mask for at least one frame in the video sequence, said generating a smoothed segmentation mask for a current frame in the video sequence comprises:
    warping the segmentation mask of each of one or more prior frames and of each of one or more subsequent frames to the current frame to produce a warped segmentation mask for each of the prior frames and each of the subsequent frames;
    computing a weighted average between the warped segmentation masks and the
    segmentation mask of the current frame; and
    spatially blurring the weighted average to generate the smoothed segmentation mask for the current frame.

2. The method as recited in claim 1, further comprising applying a thresholding operation to the smoothed segmentation mask for the current frame to generate a final smoothed segmentation mask for the current frame.

3. The method as recited in claim 1, wherein said warping the segmentation mask of each of one or more prior frames and of each of one or more subsequent frames to the current frame to produce a warped segmentation mask for each of the prior frames and each of the subsequent frames comprises:
    for each of the one or more prior frames, computing optical flow for the prior frame relative to the current frame and warping a contour of the segmentation mask of the prior frame according to the computed optical flow to generate a warped segmentation mask for the prior frame; and
    for each of the one or more subsequent frames, computing optical flow for the subsequent frame relative to the current frame and warping a contour of the segmentation mask of the subsequent frame according to the computed optical flow to generate a warped segmentation mask for the subsequent frame.

4. The method as recited in claim 3, wherein warping a contour of a segmentation mask comprises, for each point on the contour, computing a locally smoothed flow vector and moving the contour point according to the computed locally smoothed flow vector.

5. The method as recited in claim 1, wherein said spatially blurring the weighted average comprises applying a spatial Gaussian convolution kernel to the weighted average.

6. The method as recited in claim 1, wherein said obtaining a video sequence comprising a plurality of frames and a plurality of segmentation masks each corresponding to one of the plurality of frames comprises:
    generating a uniform search region for each of the plurality of frames, wherein the uniform search region for a respective frame covers a contour of an object in the respective frame;
    for each of the plurality of frames, generating a variable bandwidth search region from the respective uniform search region, wherein the variable bandwidth search region for the respective frame covers the contour of the object in the respective frame; and applying an automatic segmentation technique to the variable bandwidth search region of each of the plurality of frames to generate the segmentation mask for the respective frame.

7. The method as recited in claim 6, wherein said generating a variable bandwidth search region from a uniform search region of a given frame comprises:

determining a bandwidth for each of a plurality of local windows of the uniform search region according to an estimate of how much the object in the given frame has moved in the window in relation to the object in a corresponding window of a temporally adjacent frame of the video sequence, wherein the plurality of local windows cover the shape contour of the object in the given frame;

blending the bandwidths for the plurality of local windows to generate a blended map; and generating a variable bandwidth search region for the object according to the blended map.

8. A system, comprising:

at least one processor; and a memory coupled to the at least one processor, wherein the memory stores program instructions, the program instructions are executable by the at least one processor to:

obtain a video sequence comprising a plurality of frames and a plurality of segmentation masks each corresponding to one of the plurality of frames; and generate a smoothed segmentation mask for at least one frame in the video sequence, wherein, to generate a smoothed segmentation mask for a current frame in the video sequence, the program instructions are executable by the at least one processor to:

warp the segmentation mask of each of one or more prior frames and of each of one or more subsequent frames to the current frame to produce a warped segmentation mask for each of the prior frames and each of the subsequent frames;

compute a weighted average between the warped segmentation masks and the segmentation mask of the current frame; and spatially blur the weighted average to generate the smoothed segmentation mask for the current frame.

9. The system as recited in claim 8, wherein the program instructions are executable by the at least one processor to apply a thresholding operation to the smoothed segmentation mask for the current frame to generate a final smoothed segmentation mask for the current frame.

10. The system as recited in claim 8, wherein, to warp the segmentation mask of each of one or more prior frames and of each of one or more subsequent frames to the current frame to produce a warped segmentation mask for each of the prior frames and each of the subsequent frames, the program instructions are executable by the at least one processor to:

for each of the one or more prior frames, compute optical flow for the prior frame relative to the current frame and warp a contour of the segmentation mask of the prior frame according to the computed optical flow to generate a warped segmentation mask for the prior frame; and for each of the one or more subsequent frames, compute optical flow for the subsequent frame relative to the current frame and warp a contour of the segmentation mask of the subsequent frame according to the computed optical flow to generate a warped segmentation mask for the subsequent frame.

11. The system as recited in claim 10, wherein, to warp a contour of a segmentation mask the program instructions are executable by the at least one processor to, for each point on the contour, compute a locally smoothed flow vector and move the contour point according to the computed locally smoothed flow vector.

12. The system as recited in claim 8, wherein, to spatially blur the weighted average, the program instructions are executable by the at least one processor to apply a spatial Gaussian convolution kernel to the weighted average.

13. The system as recited in claim 8, wherein, to obtain a video sequence comprising a plurality of frames and a plurality of segmentation masks each corresponding to one of the plurality of frames, the program instructions are executable by the at least one processor to:

generate a uniform search region for each of the plurality of frames, wherein the uniform search region for a respective frame covers a contour of an object in the respective frame;

for each of the plurality of frames, generate a variable bandwidth search region from the respective uniform search region, wherein the variable bandwidth search region for the respective frame covers the contour of the object in the respective frame; and apply a segmentation technique to the variable bandwidth search region of each of the plurality of frames to generate the segmentation mask for the respective frame.

14. The system as recited in claim 13, wherein, to generate a variable bandwidth search region from a uniform search region of a given frame, the program instructions are executable by the at least one processor to:

determine a bandwidth for each of a plurality of local windows of the uniform search region according to an estimate of how much the object in the given frame has moved in the window in relation to the object in a corresponding window of a temporally adjacent frame of the video sequence, wherein the plurality of local windows cover the shape contour of the object in the given frame;

blend the bandwidths for the plurality of local windows to generate a blended map; and generate a variable bandwidth search region for the object according to the blended map.

15. A computer-readable storage device storing program instructions that, responsive to execution by a computer, causes the computer to perform operations comprising:

obtaining a video sequence comprising a plurality of frames and a plurality of segmentation masks each corresponding to one of the plurality of frames; and generating a smoothed segmentation mask for at least one frame in the video sequence, wherein said generating a smoothed segmentation mask for a current frame in the video sequence comprises:

warping the segmentation mask of each of one or more prior frames and of each of one or more subsequent frames to the current frame to produce a warped segmentation mask for each of the prior frames and each of the subsequent frames;

computing a weighted average between the warped segmentation masks and the segmentation mask of the current frame; and spatially blurring the weighted average to generate the smoothed segmentation mask for the current frame.

16. The computer-readable storage device as recited in claim 15, wherein the program instructions are further computer-executable to implement applying a thresholding operation to the smoothed segmentation mask for the current frame to generate a final smoothed segmentation mask for the current frame.

17. The computer-readable storage device as recited in claim 15, wherein, in said warping the segmentation mask of each of one or more prior frames and of each of one or more subsequent frames to the current frame to produce a warped segmentation mask for each of the prior frames and each of the subsequent frames, the program instructions are computer-executable to implement:

for each of the one or more prior frames, computing optical flow for the prior frame relative to the current frame and warping a contour of the segmentation mask of the prior frame according to the computed optical flow to generate a warped segmentation mask for the prior frame; and for each of the one or more subsequent frames, computing optical flow for the subsequent frame relative to the current frame and warping a contour of the segmentation mask of the subsequent frame according to the computed optical flow to generate a warped segmentation mask for the subsequent frame.

18. The computer-readable storage device as recited in claim 17, wherein, in said warping a contour of a segmentation mask, the program instructions are computer- executable to implement, for each point on the contour, computing a locally smoothed flow vector and moving the contour point according to the computed locally smoothed flow vector.

19. The computer-readable storage device as recited in claim 15, wherein said spatially blurring the weighted average comprises applying a spatial Gaussian convolution kernel to the weighted average.

20. The computer-readable storage device as recited in claim 15, wherein, in said obtaining a video sequence comprising a plurality of frames and a plurality of segmentation masks each corresponding to one of the plurality of frames, the program instructions are computer-executable to implement:

generating a uniform search region for each of the plurality of frames, wherein the uniform search region for a respective frame covers a contour of an object in the respective frame;

for each of the plurality of frames, generating a variable bandwidth search region from the respective uniform search region, wherein the variable bandwidth search region for the respective frame covers the contour of the object in the respective frame; and applying an automatic segmentation technique to the variable bandwidth search region of each of the plurality of frames to generate the segmentation mask for the respective frame.

* * * * *

UNITED STATES PATENT AND TRADEMARK OFFICE
CERTIFICATE OF CORRECTION

| | |
|---|---|
| PATENT NO. | : 8,520,975 B2 |
| APPLICATION NO. | : 12/871719 |
| DATED | : August 27, 2013 |
| INVENTOR(S) | : Jue Wang et al. |

Page 1 of 1

It is certified that error appears in the above-identified patent and that said Letters Patent is hereby corrected as shown below:

On the title page item [57], Line 12, "warpedsegmentation" should read -- warped segmentation --.

Signed and Sealed this
Twenty-sixth Day of November, 2013

Margaret A. Focarino
*Commissioner for Patents of the United States Patent and Trademark Office*